US012194730B2

(12) United States Patent
Itoh et al.

(10) Patent No.: US 12,194,730 B2
(45) Date of Patent: Jan. 14, 2025

(54) RECORDING APPARATUS

(71) Applicant: CANON KABUSHIKI KAISHA, Tokyo (JP)

(72) Inventors: Yoshinori Itoh, Kanagawa (JP); Yusuke Imahashi, Kanagawa (JP); Hiroshi Arimizu, Chiba (JP); Motomi Tsuyuki, Kanagawa (JP); Arihito Miyakoshi, Tokyo (JP); Yasushi Iijima, Tokyo (JP); Hideo Sugimura, Tokyo (JP); Takashi Horiba, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 227 days.

(21) Appl. No.: 17/852,598

(22) Filed: Jun. 29, 2022

(65) Prior Publication Data

US 2022/0410599 A1 Dec. 29, 2022

(30) Foreign Application Priority Data

Jun. 29, 2021 (JP) ................................ 2021-107922

(51) Int. Cl.
*B41J 11/00* (2006.01)
*B41J 29/17* (2006.01)
*B41J 29/377* (2006.01)

(52) U.S. Cl.
CPC ......... *B41J 11/00222* (2021.01); *B41J 29/17* (2013.01); *B41J 29/377* (2013.01)

(58) Field of Classification Search
CPC ....... B41J 2/165; B41J 2/17; B41J 2/01; B41J 2/185; B41J 29/377; B41J 29/17; B29C 64/393; B33Y 30/00
See application file for complete search history.

(56) References Cited

U.S. PATENT DOCUMENTS

| | | | | |
|---|---|---|---|---|
| 7,794,035 | B2 | 9/2010 | Imahashi et al. | |
| 8,132,879 | B2 | 3/2012 | Imahashi et al. | |
| 8,262,192 | B2 * | 9/2012 | Matsumoto | B41J 2/04 347/22 |
| 8,622,538 | B2 | 1/2014 | Miyakoshi et al. | |
| 9,150,022 | B2 | 10/2015 | Miyakoshi et al. | |
| 9,199,472 | B2 | 12/2015 | Ishida et al. | |

(Continued)

FOREIGN PATENT DOCUMENTS

| | | |
|---|---|---|
| JP | 2015-083372 A | 4/2015 |
| WO | 2017009722 A1 | 1/2017 |

*Primary Examiner* — John Zimmermann

(74) *Attorney, Agent, or Firm* — Venable LLP

(57) ABSTRACT

A recording apparatus includes a supply portion for supplying an airflow, a blowing port that is formed in a slit-like form following a width direction orthogonal to a conveying direction of a discharged medium, for blowing out the airflow supplied from the supply portion, the blowing port being formed with a channel, through which the airflow flows, extending in a direction substantially perpendicular to a conveyance region of the discharged medium, from an inlet side at which the airflow is introduced, to an outlet side, and a supporting member provided on the inlet side of the blowing port to support opposing wall faces of the blowing port, while allowing passage of the airflow. The blowing port has a narrow portion that partially narrows a width of the channel, father on the outlet side than the supporting member of the wall faces forming the channel.

30 Claims, 29 Drawing Sheets

(56) References Cited

U.S. PATENT DOCUMENTS

| | | | |
|---|---|---|---|
| 9,469,114 B2 | 10/2016 | Miyakoshi et al. | |
| 9,579,896 B2 * | 2/2017 | Imahashi | B41J 2/165 |
| 10,029,496 B2 | 7/2018 | Arimizu et al. | |
| 10,071,572 B2 | 9/2018 | Kurata et al. | |
| 10,232,644 B2 | 3/2019 | Wada et al. | |
| 10,259,245 B2 | 4/2019 | Karlinski et al. | |
| 10,549,554 B2 | 2/2020 | Kurata et al. | |
| 11,884,010 B2 * | 1/2024 | Soto | B29C 64/393 |
| 2016/0031218 A1 * | 2/2016 | Ishida | B41J 2/1714<br>347/34 |
| 2017/0341399 A1 * | 11/2017 | Arimizu | B41J 2/16517 |
| 2019/0009567 A1 * | 1/2019 | Miyakoshi | B41J 2/18 |

* cited by examiner 1001
1002
1003
1011
1101
1005
1004
H
W
T

B1
C1
B2
C2
1003
1011
1101
1004

1003
1004

1003
1101

RECORDING APPARATUS

BACKGROUND OF THE INVENTION

Field of the Invention

The present invention relates to, in an ink jet recording apparatus that includes a mechanism for supplying a fluid flow of air or the like to the vicinity of a discharged medium and a recording head, such as for example, a condensation drying mechanism, an ink mist removing mechanism, or a mist collecting mechanism, a technology for straightening a fluid flow that is blown out from the mechanism.

Description of the Related Art

In a liquid discharge apparatus that performs recording by discharging a liquid such as ink or the like, there are cases in which, at the time of main droplets of ink being discharged, satellite droplets smaller than the main droplets that are generated associated with the main droplets, or even finer spray-like ink mist, are generated and float around the liquid discharge apparatus. In a case of this ink mist adhering to a face on which discharge orifices of the recording head are formed, faulty discharge, in which landing precision of the ink deteriorates, may occur. Also, the ink mist may become adhered to other component parts of the liquid discharge apparatus, and may become a factor in reduced durability of the liquid discharge apparatus.

Also, in transfer system ink jet recording apparatuses, in cases in which the discharged medium is a heated transfer medium or the like, vapor vaporizing from solvent of ink droplets discharged onto the transfer medium may need to be prevented from aggregating and condensing on the recording head or the like.

There is known a mechanism that blows a fluid such as air or the like from a slit-like blowing port near the discharged medium and recording head, thereby serving as a mechanism for removing, and so forth, ink mist and ink solvent vapor, without contaminating printed materials (Japanese Patent Application Publication No. 2015-83372, WO 2017/009722). In a configuration that uses a slit-like blowing port, the larger the size of printed materials that can be handled, the greater the ratio of the long side relative to the short side at slit-like opening portion becomes, and accordingly a configuration to maintain the shape of the slit-like opening portion becomes necessary. That is to say, typically, a structure is provided that is disposed inserted between opposing wall faces of the slit-like opening portion, and that supports the opposing wall faces in the opposing direction thereof by maintaining the width of the gap between the opposing wall faces. However, such a structure affects the flow of the airflow passing through the slit-like opening portion, and occurrence of variance in windspeed may affect the ink mist removing capabilities and so forth.

SUMMARY OF THE INVENTION

It is an object of the present invention to provide, in a recording apparatus provided with a mechanism that blows out a fluid from slit-like blowing ports, a technology that enables making uniform a fluid flow blown out from the blowing ports.

To solve the above problem, a recording apparatus according to the present invention includes:

a recording head that discharges a liquid;

a conveyance portion that conveys a discharged medium so as to pass a position facing the recording head;

a supply portion for supplying an airflow;

a blowing port that is formed in a slit-like form following a width direction orthogonal to a conveying direction of the discharged medium, for blowing out the airflow supplied from the supply portion, the blowing port being formed with a channel, through which the airflow flows, extending in a direction substantially perpendicular to a conveyance region of the discharged medium, from an inlet side at which the airflow supplied from the supply portion is introduced, to an outlet side; and a supporting member provided on the inlet side of the blowing port to support, in the conveying direction, opposing wall faces of the blowing port that face each other in the conveying direction, while allowing passage of the airflow, wherein the blowing port has a narrow portion that partially narrows a width of the channel in the conveying direction of the channel, farther on the outlet side than the supporting member of the wall faces forming the channel.

According to the present invention, in a recording apparatus provided with a mechanism that blows out a fluid from slit-like blowing ports, a fluid flow blown out from the blowing ports can be made uniform.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

First Embodiment

Recording System

Figure 1:
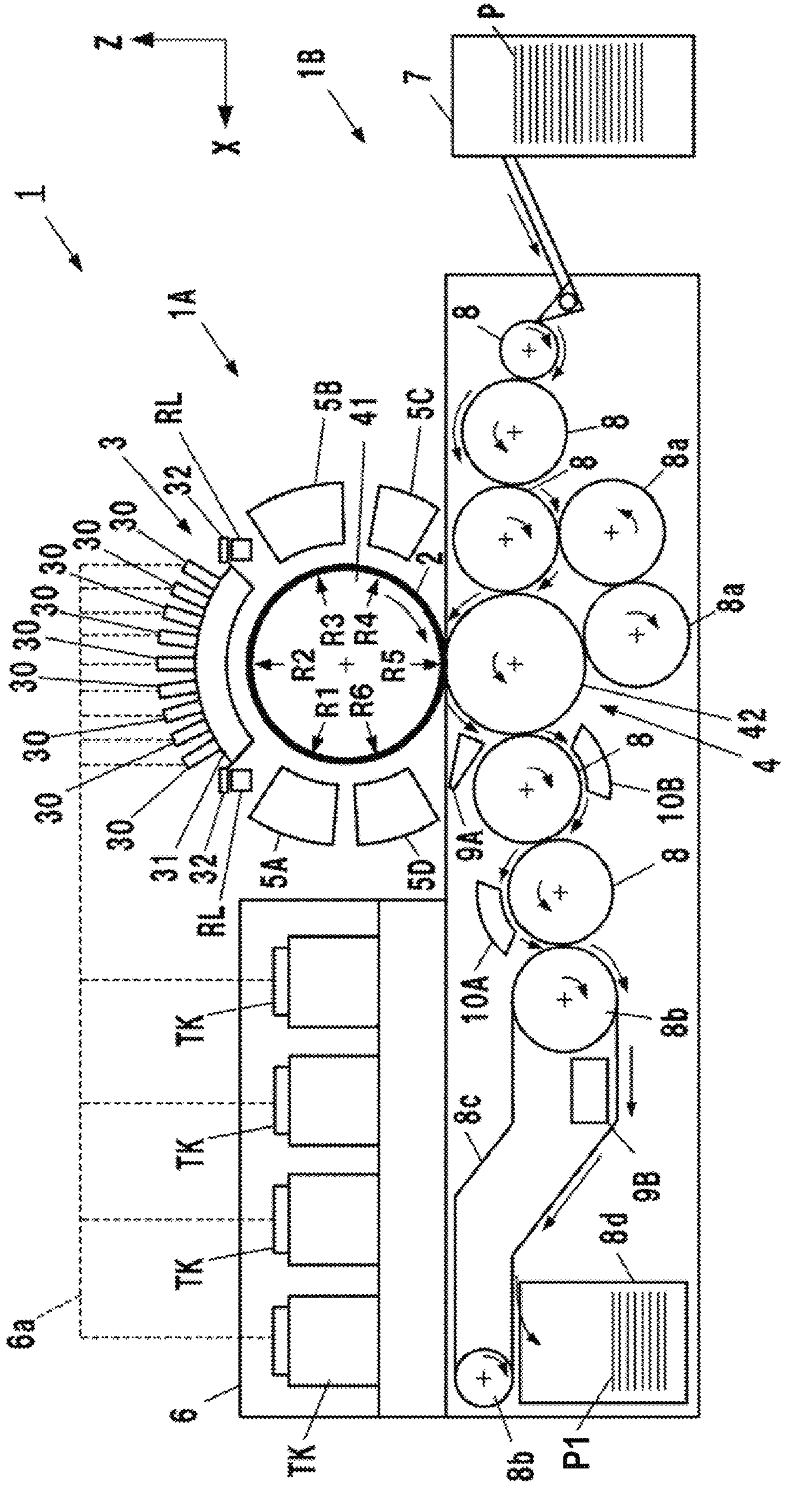
FIG. 1 is a schematic diagram of a recording system.

FIG. 1 is a frontal view schematically illustrating a recording system 1 according to a first embodiment of the present invention. The recording system 1 is a sheet-fed ink jet printer (liquid discharge type recording apparatus) that manufactures a recorded article P1 by transferring an ink image to a recording medium P via a transfer member 2. The recording system 1 includes a recording apparatus 1A and a conveying apparatus 1B. In the present example, an X direction, a Y direction, and a Z direction respectively indicate a width direction (full length direction), a depth direction, and a height direction (up-down direction) of the recording system 1. The recording medium P is conveyed in the X direction. The X direction and the Y direction represent lateral directions, and are orthogonal to (intersect) each other.

Note that "recording" is not limited to cases of forming meaningful information such as text, shapes, and so forth, and also broadly includes cases of forming images, designs, patterns, and so forth, on the recording medium, or processing the medium, regardless of whether or not manifested so as to be visually recognizable by humans. Also, although sheets of paper are assumed as the "recording medium" in the present example, this may be cloth, plastic film, or the like.

Ink is exemplified as a representative liquid used for recording. The component of ink is not limited in particular, but a case of using a water-based pigment ink including a pigment that is a color material, water, and resin, is assumed in the present example.

Recording Apparatus

The recording apparatus 1A includes a recording unit 3, a transfer unit 4, peripheral units 5A to 5D, and a supply unit 6.

Recording Unit

Figure 2:
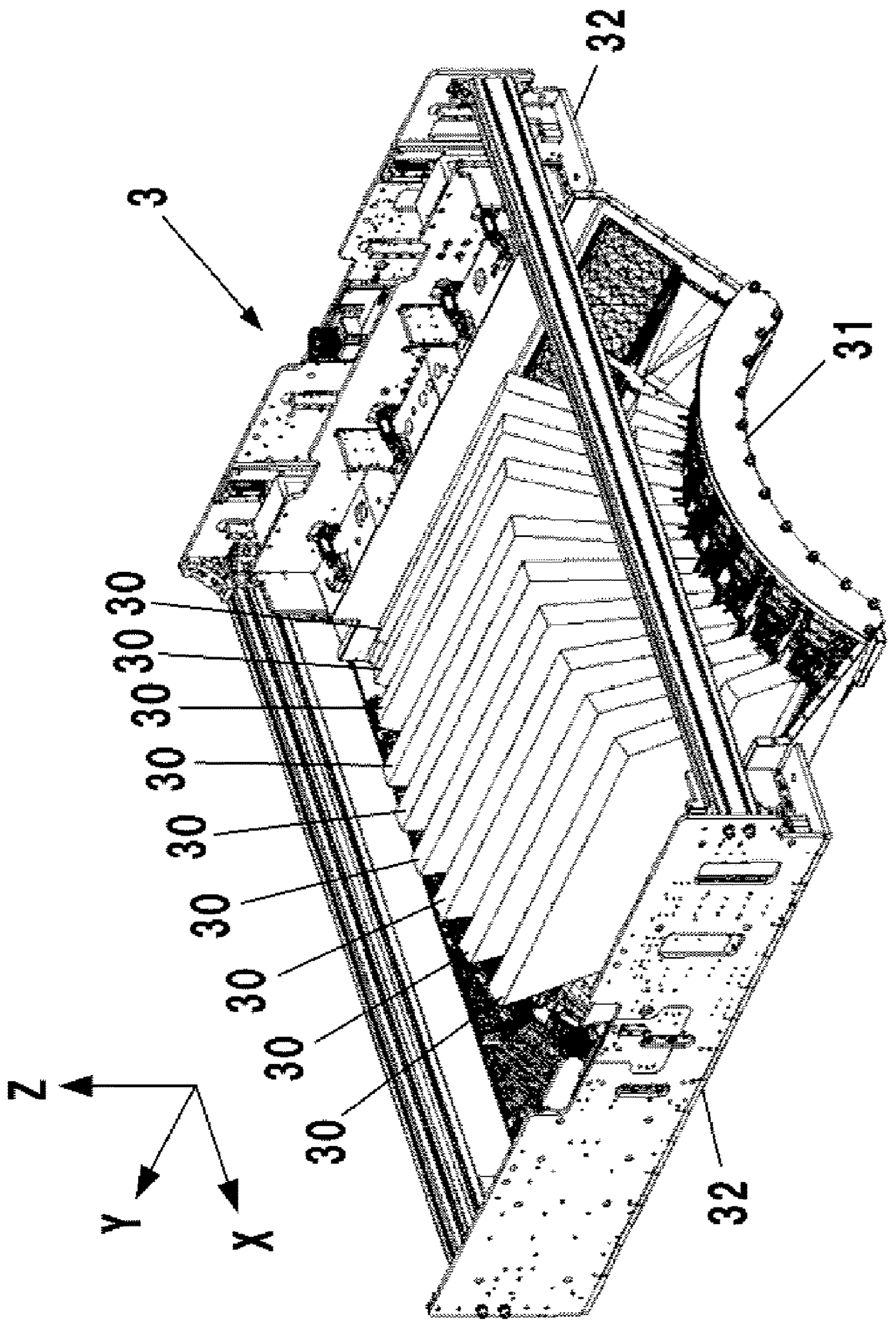
FIG. 2 is a perspective view of a recording unit.
Figure 8:
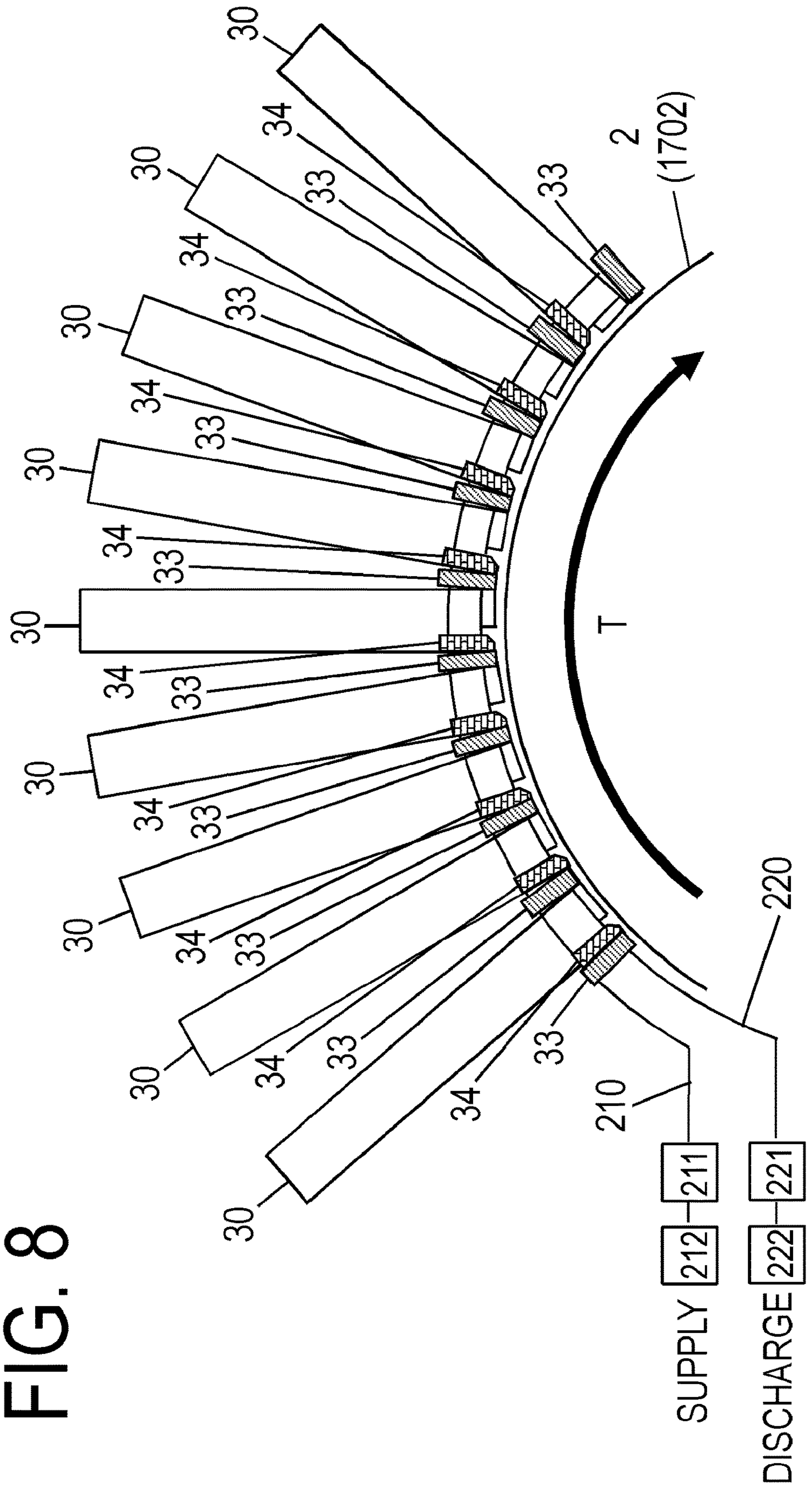
FIG. 8 is a side view illustrating a disposed relation of removal units, recording heads, and collecting mechanisms.

The recording unit 3 will be described with reference to FIGS. 1, 2, and 8. FIG. 2 is a perspective view of the recording unit 3, and FIG. 8 is a cross-sectional view of the recording unit 3. The recording unit 3 includes a plurality of recording heads 30 and a carriage 31. The recording heads 30 discharge liquid ink onto the transfer member 2 to form an ink image of a recording image upon the transfer member 2.

In the case of the present example, each recording head 30 is a full-line head (line recording head) extending in the Y direction, with nozzles being arrayed in a range that covers the width of an image recording region of the largest size recording medium that is usable. Each recording head 30 has an ink discharge face where nozzles are opened on a lower face thereof, and the ink discharge face faces a surface of the transfer member 2 across a minute gap (e.g., several millimeters). In the case of the present example, the transfer member 2 is provided on an outer circumferential face of a later-described transfer drum 41 that serves as a conveyance portion, and is configured to cyclically move over a circular path as viewed along the rotational axis of the transfer drum 41, by rotation of the transfer drum 41. Accordingly, the plurality of recording heads 30 are disposed radially along an outer circumference of the transfer member 2.

Each nozzle provided to the recording head 30 includes a discharging element. The discharging element is an element that generates pressure within the nozzle and causes ink within the nozzle to be discharged, for example, and known technology regarding ink jet heads in ink jet printers is applicable thereto. Examples of discharging elements include elements that discharge ink by causing film boiling of ink and forming bubbles by electrothermal converters, elements that discharge ink by electromechanical converters, elements that discharge ink utilizing static electricity, and so forth, for example. Discharging elements utilizing electrothermal converters can be used from the perspective of high-speed and high-density recording.

Nine of the recording heads 30 are provided in the case of the present example. The recording heads 30 each discharges ink of a type that is different from the others. Examples of inks of different types include inks of different color materials, which are inks such as yellow ink, magenta ink, cyan ink, black ink, and so forth. A configuration may be made in which each recording head 30 discharges one type of ink, or a configuration may be made in which each recording head 30 discharges a plurality of types of ink. Also, in a case of providing a plurality of the recording heads 30, a configuration may be made in which part thereof dischargers ink that does not contain any color material (e.g., clear ink).

As illustrated in FIG. 8, provided on an upstream side of each of the nine recording heads 30 is a mist and vapor removal unit (hereinafter, "removal unit") 34 that serves as a blowing mechanism to blow air into the space between the recording head 30 and the transfer member 2. Also, provided on a downstream side of each of the nine recording heads 30 is a collecting mechanism 33 that collects ink mist and vapor generated at the time of discharging ink from the recording head 30. That is to say, a configuration is made in which, in eight positions between two adjacent recording heads 30 of the nine recording heads 30, the collecting mechanism 33 for the upstream side recording head 30, and the removal unit 34 for the downstream side recording head 30, are each provided. Note that a collecting mechanism 33 is also provided at a position adjacent to the removal unit 34 of the recording head 30 that is farthest upstream, on the upstream side thereof. Thus, the removal units 34, the recording heads 30, and the collecting mechanisms 33 are alternatingly and radially disposed along an outer circumferential face of the transfer member 2 that is cylindrical in shape.

Figure 9:
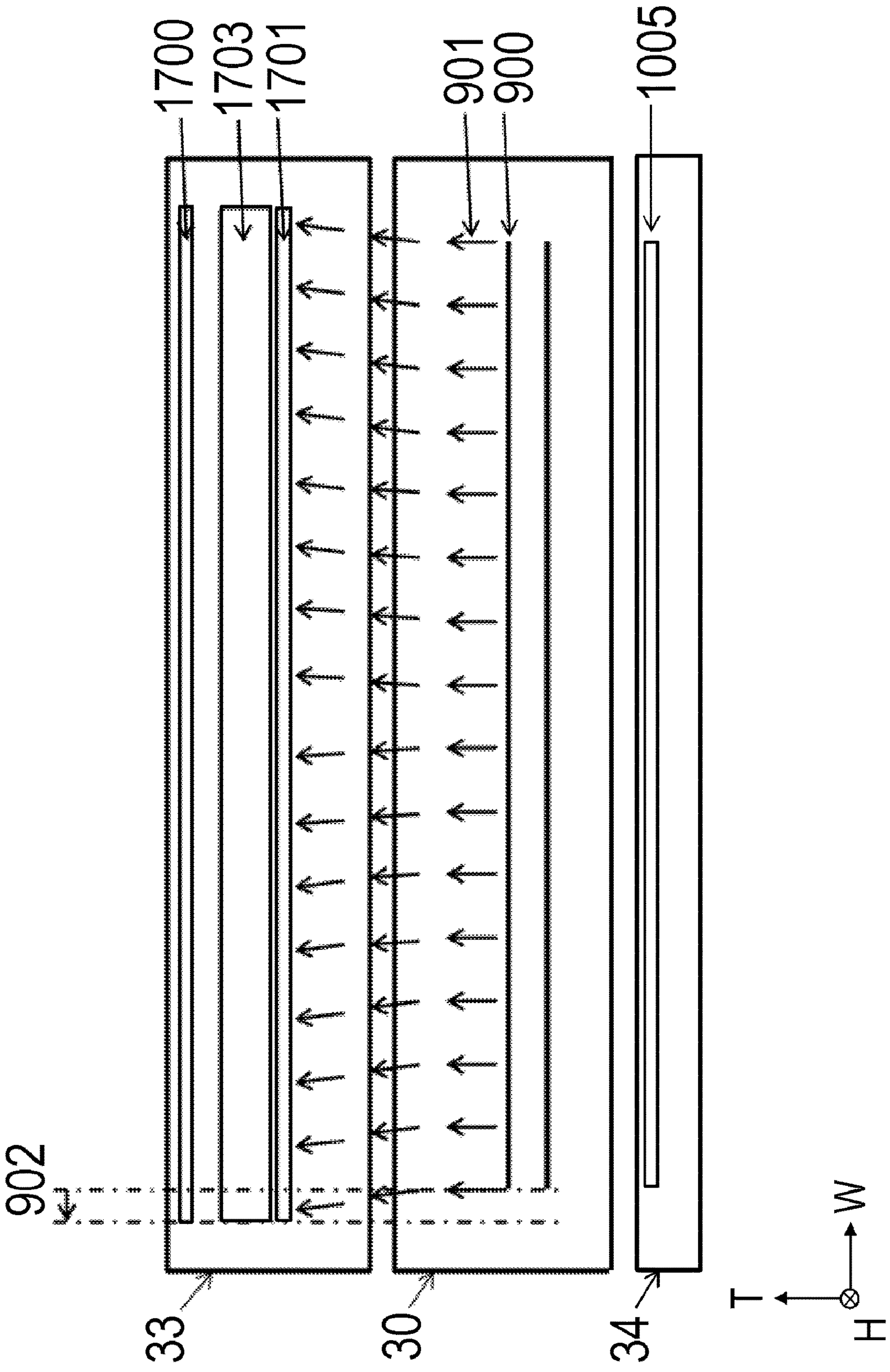
FIG. 9 is a lower view illustrating a disposed relation of the removal units, the recording heads, and the collecting mechanisms.

FIG. 9 is a schematic lower view as viewed from the transfer member 2 side, illustrating a layout relation of the removal unit 34, the recording head 30, and the collecting mechanism 33 as to a conveying direction T of the transfer member 2. That is to say, this is a schematic diagram viewing lower faces of each of the removal unit 34, the recording head 30, and the collecting mechanism 33 (opposing faces facing the transfer member 2), in a direction perpendicular to the conveying direction of the transfer member 2. Each removal unit 34 has a slit-like opening portion 1005 for blowing air into the space between the recording head 30 and the transfer member 2, at a bottom of a unit housing. Also, each collecting mechanism 33 has a slit-like first blowing port 1701 and second blowing port 1700 for blowing air toward the surface of the transfer member 2, and a suction port 1703 for suctioning air, at the bottom of the unit housing. The ink mist generated from the recording heads 30 is thus effectively collected before the ink mist spreads throughout the apparatus, by suctioning air from the suction port 1703 while blowing out clean air from the first blowing port 1701 and the second blowing port 1700.

As illustrated in FIG. 9, the first blowing port 1701, the suction port 1703, and the second blowing port 1700 of the collecting mechanism 33 are opened in slit-like forms, slender along a width direction W orthogonal to the conveying direction T of the transfer member 2, with the width direction W as a longitudinal direction thereof. The lengths of these in the longitudinal direction are preferably longer than at least a region serving as a printing region. That is to say, the lengths thereof are preferably lengths laterally passing across a region in which ink droplets discharged from the recording heads 30 can land, out of the surface of the discharged medium such as the transfer member 2 or the like, in a direction intersecting the direction in which the transfer member 2 or the like is conveyed. The first blowing port 1701, the suction port 1703, and the second blowing port 1700 each have portions longer than the printing region, as denoted by 902 in FIG. 9. Note that 900 in FIG. 9 denotes a discharge nozzle row of the recording head 30, and 901 denotes arrows indicating the flow of ink mist generated by discharge of ink droplets.

Note that if installation space can be secured, the longitudinal-direction length of the collecting mechanism 33 is preferably further extended in both sides in the longitudinal direction beyond the longitudinal direction of the recording head 30, so that 902 is longer than half of the distance between the recording head 30 and the collecting mechanism 33. A reason thereof is that there are cases in which mist generated between the recording head 30 and the transfer member 2 gradually spreads in the longitudinal-direction length of the recording head 30 while being moved to the collecting mechanism 33 along with conveying of the transfer member 2. Also, another reason thereof is that in a case in which the ink mist spills to the outer side in the longitudinal direction from the space between the transfer member 2 and the recording head 30, the space on the outer side thereof is generally more widely open than the space between the transfer member 2 and the recording head 30, and accordingly the ink mist will rapidly spread in the longitudinal direction.

As illustrated in FIGS. 1 and 2 (omitted from illustration in FIGS. 8 and 9), the carriage 31 supports the plurality of recording heads 30, and the plurality of collecting mechanisms 33 and removal units 34. The end portion of each recording head 30 on the ink discharge face side thereof is fixed to the carriage 31. Thus, the inter-surface gap between the ink discharge face and the transfer member 2 can be precisely maintained. The carriage 31 is configured to be capable of displacement in the Y direction in the figures, guided by a guide member RL, with the recording heads 30 mounted thereupon. In the case of the present example, the guide member RL is a rail member provided extending in the Y direction, a pair thereof being provided separated from each other in the X direction. A slide portion 32 is provided at each side portion of the carriage 31 in the X direction. The slide portions 32 engage the guide members RL and slide in the Y direction along the guide members RL.

Figure 3:
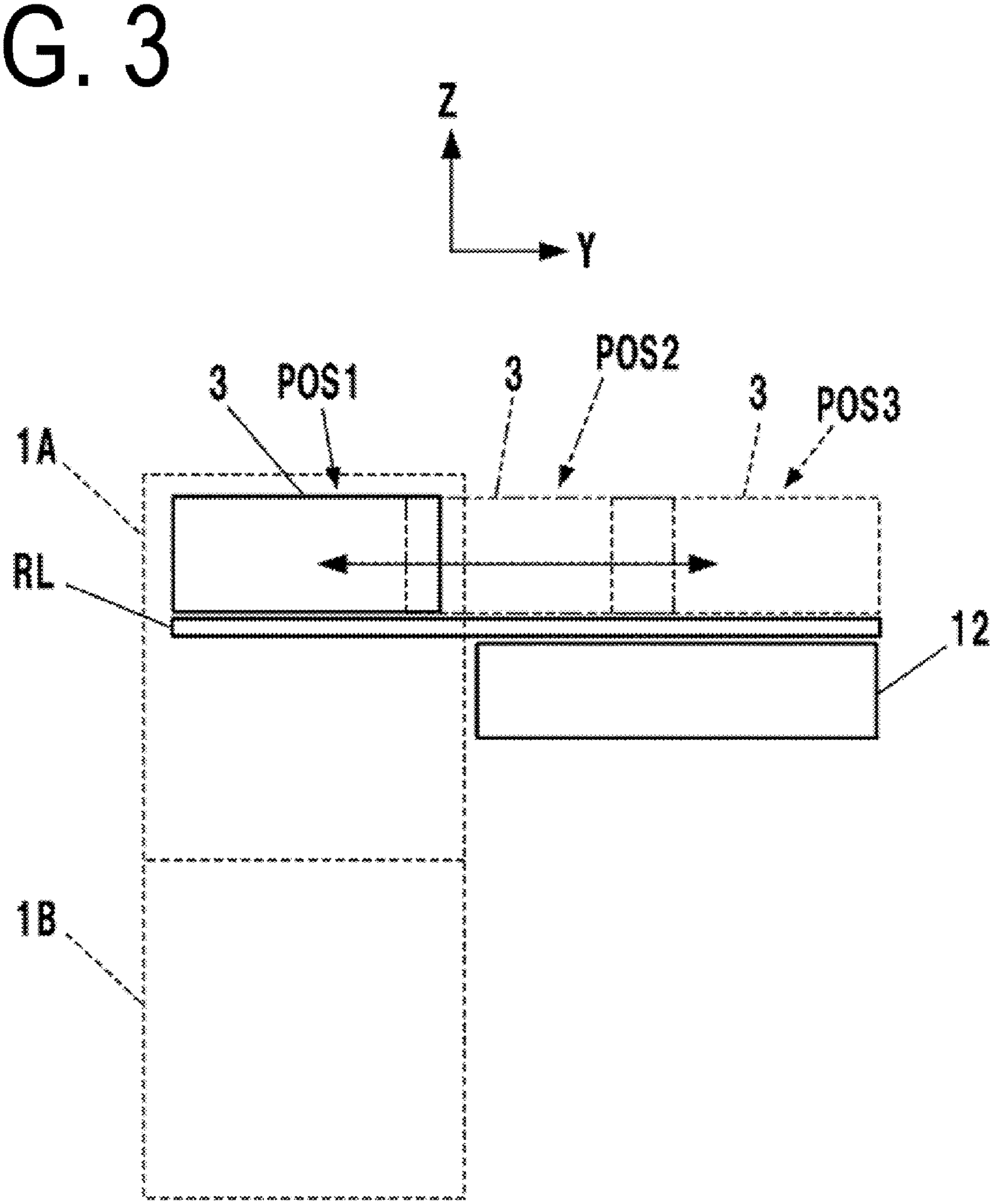
FIG. 3 is an explanatory diagram of a displacement form.

FIG. 3 illustrates a displacement form of the recording unit 3, schematically illustrating a right side face of the recording system 1. A recovery unit 12 is provided on a rear portion of the recording system 1. The recovery unit 12 has a mechanism for recovering discharge performance of the recording head 30. Examples of such a mechanism include a cap mechanism that caps the ink discharge face of the recording head 30, a wiper mechanism that wipes the ink discharge face, and a suctioning mechanism that suctions ink within the recording head 30 from the ink discharge face by negative pressure.

The guide member RL is provided extending from a side of the transfer member 2 to the recovery unit 12. The recording unit 3 is capable of displacement between a discharging position POS1 at which the recording unit 3 is illustrated by solid lines, and a recovering position POS3 at which the recording unit 3 is illustrated by dashed lines, and is moved by a driving mechanism that is omitted from illustration, guided by the guide members RL. The discharging position POS1 is a position at which the recording unit 3 discharges ink onto the transfer member 2, and is a position at which the ink discharging faces of the recording heads 30 face the surface of the transfer member 2. The recovering position POS3 is a position retreated from the discharging position POS1, and is a position at which the recording unit 3 is positioned above the recovery unit 12. In a case in which the recording unit 3 is positioned at the recovering position POS3, the recovery unit 12 is capable of executing recovery processing of the recording heads 30. In the case of the present example, recovery processing can be executed before the recording unit 3 reaches the recovering position POS3, partway through movement thereof. A preliminary recovering position POS2 is provided between the discharging position POS1 and the recovering position POS3. The recovery unit 12 is capable of carrying out preliminary recovery processing of the recording heads 30 at the preliminary recovering position POS2, while the recording heads 30 are being moved from the discharging position POS1 to the recovering position POS3.

Transfer Unit

The transfer unit 4 will be described with reference to FIG. 1. The transfer unit 4 includes the transfer drum 41 (transfer cylindrical body) and a platen 42 serving as a pressing member. These drums are rotating members that rotate about Y-directional rotation axes, and have cylindrically-shaped outer circumferential faces. In FIG. 1, the arrows inside the shapes of the transfer drum 41 and the platen 42 represent the directions of rotation thereof, and in the apparatus layout configuration illustrated in FIG. 1, the transfer drum 41 rotates clockwise, and the platen 42 rotates counterclockwise.

The transfer drum 41 is a supporting member that supports the transfer member 2 on the outer circumferential face thereof. The transfer member 2 is provided continuously or intermittently in a circumferential direction on the outer circumferential face of the transfer drum 41. In a case of being provided continuously, the transfer member 2 is formed as an endless band. In a case of being provided intermittently, the transfer member 2 is formed as a band with ends being divided into a plurality of segments, and the segments can be disposed at an even pitch along an arc on the outer circumferential face of the transfer drum 41.

The transfer member 2 cyclically moves over the circular path by rotation of the transfer drum 41. The position of the transfer member 2 can be sectioned into a pre-discharging processing region R1, a discharging region R2, post-discharging processing regions R3 and R4, a transferring region R5, and a post-transferring processing region R6, in accordance with the rotational phase of the transfer drum 41. The transfer member 2 cyclically passes through these regions.

The pre-discharging processing region R1 is a region in which preprocessing is performed with regard to the transfer member 2 before discharging of ink by the recording unit 3, and is a region in which processing is performed by the peripheral unit 5A. In the case of the present example, a reaction liquid is applied. The discharging region R2 is a forming region in which the recording unit 3 discharges ink to the transfer member 2 to form an ink image. The post-discharging processing regions R3 and R4 are processing regions in which processing is performed with regard to the ink image following discharging of ink, in which the post-discharging processing region R3 is a region where processing is performed by the peripheral unit 5B and the post-discharging processing region R4 is a region where processing is performed by the peripheral unit 5C. The transferring region R5 is a region in which the ink image on the transfer member 2 is transferred onto the recording medium P by the transfer unit 4. The post-transferring processing region R6 is a region in which post-processing is performed with regard to the transfer member 2 following transferring, and is a region where processing is performed by the peripheral unit 5D.

In the case of the present example, the discharging region R2 is a region having a certain section. The sections of the other regions R1 and R3 to R6 are narrower in comparison with the discharging region R2. Likening this to a clock face, in the case of the present example, the pre-discharging processing region R1 is generally at the position of 10 o'clock, the discharging region R2 is a range generally from 11 o'clock to 1 o'clock, the post-discharging processing region R3 is generally at the position of 2 o'clock, and the post-discharging processing region R4 is generally at the position of 4 o'clock. The transferring region R5 is generally at the position of 6 o'clock, and the post-transferring processing region R6 is generally at the position of 8 o'clock.

The transfer member 2 may be made of a single layer, or may be a stacked member of a plurality of layers. In a case of a multilayer configuration, three layers of, for example, a surface layer, an elastic layer, and a compression layer, may be included. The surface layer is an outermost layer that has an image forming face upon which the ink image is formed. Providing the compression layer enables the compression layer to absorb deformation, disperse local variation in pressure, and maintain transferability even while performing high-speed recording. The elastic layer is a layer between the surface layer and the compression layer.

For the material of the surface layer, various types of materials, such as resins, ceramics, or the like can be used, but a material with a high compression modulus of elasticity can be used, from the perspective of durability and so forth. Specific examples include acrylic resin, acrylic silicone resin, fluorine-containing resin, a condensate obtained by condensation of a hydrolyzable organosilicon compound, and so forth. The surface layer may be subjected to surface processing to improve wettability of the reaction liquid, image transferability, and so forth. Examples of surface processing include flame processing, corona processing, plasma processing, polishing processing, roughening processing, activation energy ray irradiation processing, ozone processing, surfactant processing, silane coupling processing, and so forth. A plurality of thereof may be combined. Also, surface forms may be optionally provided to the surface layer.

Examples of the material of the compression layer include acrylonitrile-butadiene rubber, acrylic rubber, chloroprene rubber, urethane rubber, silicone rubber, and so forth. At the time of forming such rubber materials, a predetermined amount of vulcanizing agent, vulcanization accelerator, or the like, may be blended in, and further, a blowing agent, a filler such as hollow fine particles or salt or the like may be blended in as necessary, thereby obtaining a porous rubber material. Accordingly, the foam portion is compressed with change in volume under various pressure changes, whereby deformation in directions other than the compression direction is small, and more stable transferability and durability can be obtained. Porous rubber materials include continuous porous structures in which the pores are connected to each other, and independent porous structures in which the pores are independent from each other, but either structure may be used, and these structures may be used together.

For the material of the elastic layer, various types of materials, such as resins, ceramics, or the like can be used. Various types of elastomer materials and rubber materials can be used from the perspective of working properties and so forth. Specific examples include fluoro silicone rubber, phenyl silicone rubber, fluoro-rubber, chloroprene rubber, urethane rubber, nitrile rubber, and so forth. Further examples include ethylene propylene rubber, natural rubber, styrene rubber, isoprene rubber, butadiene rubber, a copolymer of ethylene/propylene/butadiene, nitrile butadiene rubber, and so forth. In particular, silicone rubber, fluoro silicone rubber, and phenyl silicone rubber have a small compression set, and accordingly are advantageous from the perspectives of dimensional stability and durability. Also, change in the modulus of elasticity due to change in temperature is small, which is advantageous from the point of transferability as well.

Various types of adhesive agents and double-sided tape can be used between the surface layer and the elastic layer, and between the elastic layer and the compression layer, for fixation thereof. Also, the transfer member 2 may include a reinforcement layer that has a high compression modulus of elasticity, to suppress lateral stretching at the time of mounting to the transfer drum 41, and to maintain stiffness. Further, woven fabric may be used as a reinforcement layer. The transfer member 2 can be fabricated by optionally combining the layers in accordance with the above materials.

The outer circumferential face of the platen 42 is pressed against the transfer member 2. At least one gripping mechanism to hold a leading edge of the recording medium P is provided on the outer circumferential face of the platen 42. A plurality of the gripping mechanisms may be provided distanced from each other in a circumferential direction of the platen 42. The ink image on the transfer member 2 is transferred to the recording medium P at the time of passing a nip portion (transfer portion) of the platen 42 and the transfer member 2 while being conveyed in close contact with the outer circumferential face of the platen 42.

A driving source such as a motor or the like that drives the transfer drum 41 and the platen 42 is shared between the two, and driving force can be distributed by a transmitting mechanism such as a gear mechanism or the like.

Peripheral Units

The peripheral units 5A to 5D are disposed around the transfer drum 41. The peripheral units 5A to 5D in the present example are an applying unit, an absorbing unit, a heating unit, and a cleaning unit, in that order.

The applying unit 5A is a mechanism that applies reaction liquid upon the transfer member 2 before the recording unit 3 discharges ink. The reaction liquid is a liquid that contains a component that makes the ink to be highly viscous. To say that the ink is made to be highly viscous is to say that color material, resin, or the like, making up the ink, chemically reacts with or exhibits physical adsorption to a component that makes the ink to be highly viscous through contact therewith, by which increase in the viscosity of the ink is observed. This making the ink to be highly viscous is not limited to cases in which increase in the viscosity of the entire ink is observed, and also includes cases in which viscosity locally increases by part of components making up the ink, such as color material, resin, or the like, aggregating.

The component that makes the ink to be highly viscous is not limited in particular, such as metal ions, polymeric flocculants, or the like, but substances that cause a change in the pH of the ink and cause color material in the ink to aggregate can be used, and organic acids can be used. Examples of an applying mechanism for applying the reaction liquid include a roller, a recording head, a dye coating device (dye coater), a blade coating device (blade coater), and so forth. Applying the reaction liquid to the transfer member 2 prior to discharging ink to the transfer member 2 enables the ink to be immediately fixed upon reaching the transfer member 2. This enables bleeding, in which adjacent inks become mixed with each other, to be suppressed.

The absorbing unit 5B is a mechanism that absorbs liquid component from the ink image on the transfer member 2 prior to transfer. Reducing the liquid component of the ink image enables bleeding and so forth of the image recorded on the recording medium P to be suppressed. To describe reduction in the liquid component from a different perspective, this can also be expressed as concentrating the ink making up the ink image on the transfer member 2. Concentrating the ink means the proportion of solid components such as color material and resin contained in the ink as to the liquid components increases by reducing the liquid components contained in the ink.

The absorbing unit 5B includes, for example, a liquid absorbing member that comes into contact with the ink image and reduces the amount of the liquid component in the ink image. The liquid absorbing member may be formed on an outer circumferential face of a roller, or the liquid absorbing member may be formed as an endless sheet and cyclically moved. From the perspective of protecting the ink image, the moving speed of the liquid absorbing member may be set to be the same as the circumferential speed of the transfer member 2, with the liquid absorbing member being moved synchronously with the transfer member 2.

The liquid absorbing member may include a porous material that comes into contact with the ink image. The pore size of the porous material at the face that comes into contact with the ink image may be no larger than 10 μm, in order to suppress adhesion of solid components of the ink to the liquid absorbing member. Note that the pore size means the average diameter, and can be measured by known means, such as mercury intrusion method, nitrogen adsorption method, scanning electron microscope (SEM) image observation, or the like, for example. Note that the liquid components are not limited in particular, as long as the liquid components have no constant shape, have fluidity, and have a substantially constant volume. Examples of liquid components include water, organic solvents, and so forth, included in the ink and the reaction liquid.

The heating unit 5C is a mechanism that heats the ink image on the transfer member 2 prior to transfer. Heating the ink image melts the resin in the ink image, and transferability onto the recording medium P improves. The heating temperature can be the minimum film-forming temperature (MFFT) of the resin or higher. The MFFT can be measured by generally known techniques, e.g., by devices conforming to JIS K 6828-2:2003 or ISO 2115:1996. Heating may be performed at a temperature no less than 10° C. higher than the MFFT, or further at a temperature no less than 20° C. higher, from the perspective of transferability and robustness of the image. Examples that can be used for the heating unit 5C include known heating devices, such as various types of lamps such as infrared lamps, blow heaters, and so forth. Infrared heaters can be used from the perspective of heating efficiency.

The cleaning unit 5D is a mechanism that cleans the face of the transfer member 2 after transfer. The cleaning unit 5D removes ink remaining on the transfer member 2, dust on the transfer member 2, and so forth. Examples that can be suitably used for the cleaning unit 5D include known systems, of a system that brings a porous member into contact with the transfer member 2, a system that rubs the surface of the transfer member 2 with a brush, a system that scrapes the surface of the transfer member 2 with a blade, and so forth. Also, known forms can be used for a cleaning member used for cleaning, such as a roller forms, web forms, and so forth.

As described above, according to the present example, the applying unit 5A, the absorbing unit 5B, the heating unit 5C, and the cleaning unit 5D are provided as peripheral units. Cooling functions for cooling the transfer member 2 may be provided to part of these units, or alternatively, a cooling unit may be additionally provided. In the present example, there are cases in which the temperature of the transfer member 2 rises due to heat from the heating unit 5C. When the temperature of the ink image exceeds the boiling point of water that is the primary solvent of the ink, following the recording unit 3 discharging ink onto the transfer member 2, there are cases in which the absorption performance of the absorbing unit 5B absorbing the liquid components deteriorates. Cooling the transfer member 2 so that the temperature of the discharged ink is maintained below the boiling point of water enables the absorption performance regarding the liquid components to be maintained.

The cooling unit may be a blowing mechanism that blows air upon the transfer member 2, or a mechanism that brings a member (e.g., a roller) into contact with the transfer member 2, and cools this member by air cooling or water cooling. Also, the cooling unit may be a mechanism that cools the cleaning member of the cleaning unit 5D. The cooling timing may be in a period following transfer and prior to applying the reaction liquid.

Supply Unit

The supply unit 6 is a mechanism that supplies ink to the recording heads 30 of the recording unit 3. The supply unit 6 may be provided at the rear side of the recording system 1. The supply unit 6 has a reservoir portion TK for storing ink of each type. The reservoir portion TK may be made up of a main tank and a sub-tank. The reservoir portions TK and the recording heads 30 communicate through channels 6*a*, and ink is supplied from the reservoir portions TK to the recording heads 30. The channels 6*a* may be channels that circulate ink between the reservoir portions TK and the recording heads 30, and the supply unit 6 may be provided with a pump or the like that circulates ink. Degassing mechanisms for degassing air bubbles in the ink may be provided partway along the channels 6*a* or in the reservoir portions TK. Valves for performing adjustment of liquid pressure of ink and atmospheric pressure may be provided partway along the channels 6*a* or in the reservoir portions TK. The Z-directional heights of the reservoir portions TK and the recording heads 30 may be designed such that the ink liquid level in the reservoir portions TK is at a lower position than the ink discharge faces of the recording heads 30.

Conveying Apparatus

The conveying apparatus 1B is an apparatus that feeds the recording medium P to the transfer unit 4, and discharges the recorded article P1 on which the ink image is transferred from the transfer unit 4. The conveying apparatus 1B includes a feeding unit 7, a plurality of conveying drums 8 and 8*a*, two sprockets 8*b*, a chain 8*c*, and a collecting unit 8*d*. In FIG. 1, the arrows on the inner side of the shapes of the components of the conveying apparatus 1B represent the direction of rotation of the components, and the arrows on the outer side represent the conveyance path of the recording medium P or the recorded article P1. The recording medium P is conveyed from the feeding unit 7 to the transfer unit 4, and the recorded articles P1 (recording medium on which the image has been recorded) is conveyed from the transfer unit 4 to the collecting unit 8*d*. The feeding unit 7 side may be referred to as the "upstream side" in the conveying direction, and the collecting unit 8*d* side may be referred to as "downstream side".

The feeding unit 7 includes a stacking portion where a plurality of the recording medium P is stacked, and a feeding mechanism for feeding the recording medium P from the stacking portion, one sheet at a time, to the conveying drum 8 farthest upstream. The conveying drums 8 and 8*a* are rotating members that rotate about Y-directional rotation axes, and have cylindrically-shaped outer circumferential faces. At least one gripping mechanism to hold the leading edge of the recording medium P (or the recorded article P1) is provided on the outer circumferential faces of the conveying drums 8 and 8*a*. Gripping actions and releasing actions of the gripping mechanisms are controlled so that the recording medium P is handed over between adjacent conveying drums.

Two conveying drums 8*a* are conveying drums for reversing the recording medium P. In a case of recording on both faces of the recording medium P, following transfer onto a front face (first face), the recording medium P is not handed over from the platen 42 to the conveying drum 8 adjacent on the downstream side, but rather is handed over to the conveying drums 8*a*. The front and rear of the recording medium P are reversed through the two conveying drums 8*a*, and the recording medium P then passes over the conveying drum 8 on the upstream side of the platen 42 and is handed over to the platen 42 again. Accordingly, the rear face of the recording medium P faces the transfer drum 41, and an ink image is transferred onto the rear face (second face).

The chain 8*c* passes around the two sprockets 8*b*. One of the two sprockets 8*b* is a driving sprocket and the other is a driven sprocket. The chain 8*c* cyclically travels due to rotation of the driving sprocket. The chain 8*c* is provided with a plurality of gripping mechanisms distanced from each other in the longitudinal direction of the chain 8*c*. The gripping mechanisms grip the ends of the recorded article P1. The recorded article P1 is handed over from the conveying drum 8 situated at the downstream end to the gripping mechanisms of the chain 8*c*, the recorded article P1 gripped by the gripping mechanisms is conveyed to the collecting unit 8*d* by the chain 8*c* traveling, and the gripping is released. Thus, the recorded article P1 is stacked in the collecting unit 8*d*.

Post-Processing Units

Post-processing units 10A and 10B are provided to the conveying apparatus 1B. The post-processing units 10A and 10B are mechanisms that are disposed on the downstream side of the transfer unit 4 and that perform post-processing on the recorded article P1. The post-processing unit 10A performs processing on the front face (first face) of the recorded article P1, and the post-processing unit 10B performs processing on the rear face (second face) of the recorded article P1. Examples of the contents of processing include coating on the image recording face of the recorded article P1 in order to protect the image, for gloss, and so forth. Examples of coating include applying a liquid, fusing of a sheet, laminating, and so forth.

Inspection Units

The conveying apparatus 1B is provided with inspection units 9A and 9B. The inspection units 9A and 9B are mechanisms that are disposed on the downstream side of the transfer unit 4 and that perform inspection of the recorded articles P1.

The inspection unit 9A according to the present example is a photographing device that takes photographs of images recorded on the recorded articles P1, and includes an image-capturing device such as a charge coupled device (CCD) sensor or a complementary metal-oxide semiconductor (CMOS) sensor or the like, for example. The inspection unit 9A takes photographs of recorded images while recording operations are being consecutively performed. Temporal change of tinge and so forth of recorded images can be confirmed, and whether or not correction of image data or recorded data is necessary can be judged on the basis of the images photographed by the inspection unit 9A. In the case of the present example, the photographing range of the inspection unit 9A is set on the outer circumferential face of the platen 42, and the inspection unit 9A is disposed so as to be capable of partially photographing recorded images immediately following transfer. The inspection unit 9A may perform inspection of all recorded images, or may perform inspection every predetermined count.

The inspection unit 9B according to the present example also is a photographing device that takes photographs of images recorded on the recorded articles P1, and includes an image-capturing device such as a CCD sensor or a CMOS sensor or the like, for example. The inspection unit 9B takes photographs of recorded images during test recording operations. The inspection unit 9B takes photographs of entire recorded images, and basic settings for various types of correction regarding recorded data can be performed on the basis of the image photographed by the inspection unit 9B. In the case of the preset example, the inspection unit 9B is disposed at a position for photographing recorded articles P1 being conveyed by the chain 8*c*. In a case of photographing a recorded image by the inspection unit 9B, traveling of the chain 8*c* is temporarily stopped, and the entirety thereof is photographed. The inspection unit 9B may also be a scanner that scans over the recorded articles P1.

Control Unit

Figure 4:
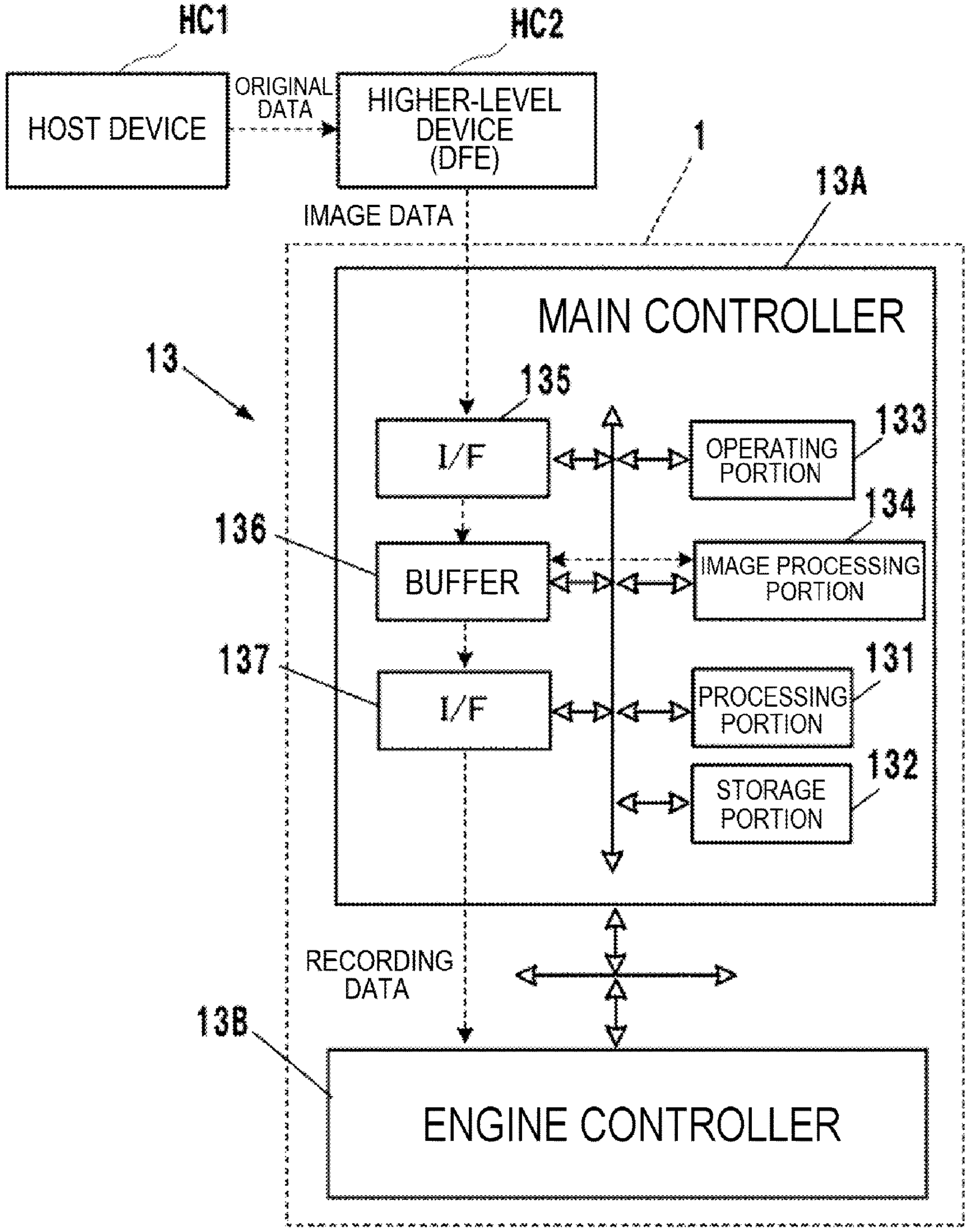
FIG. 4 is a block diagram of a control system of the recording system.
Figure 5:
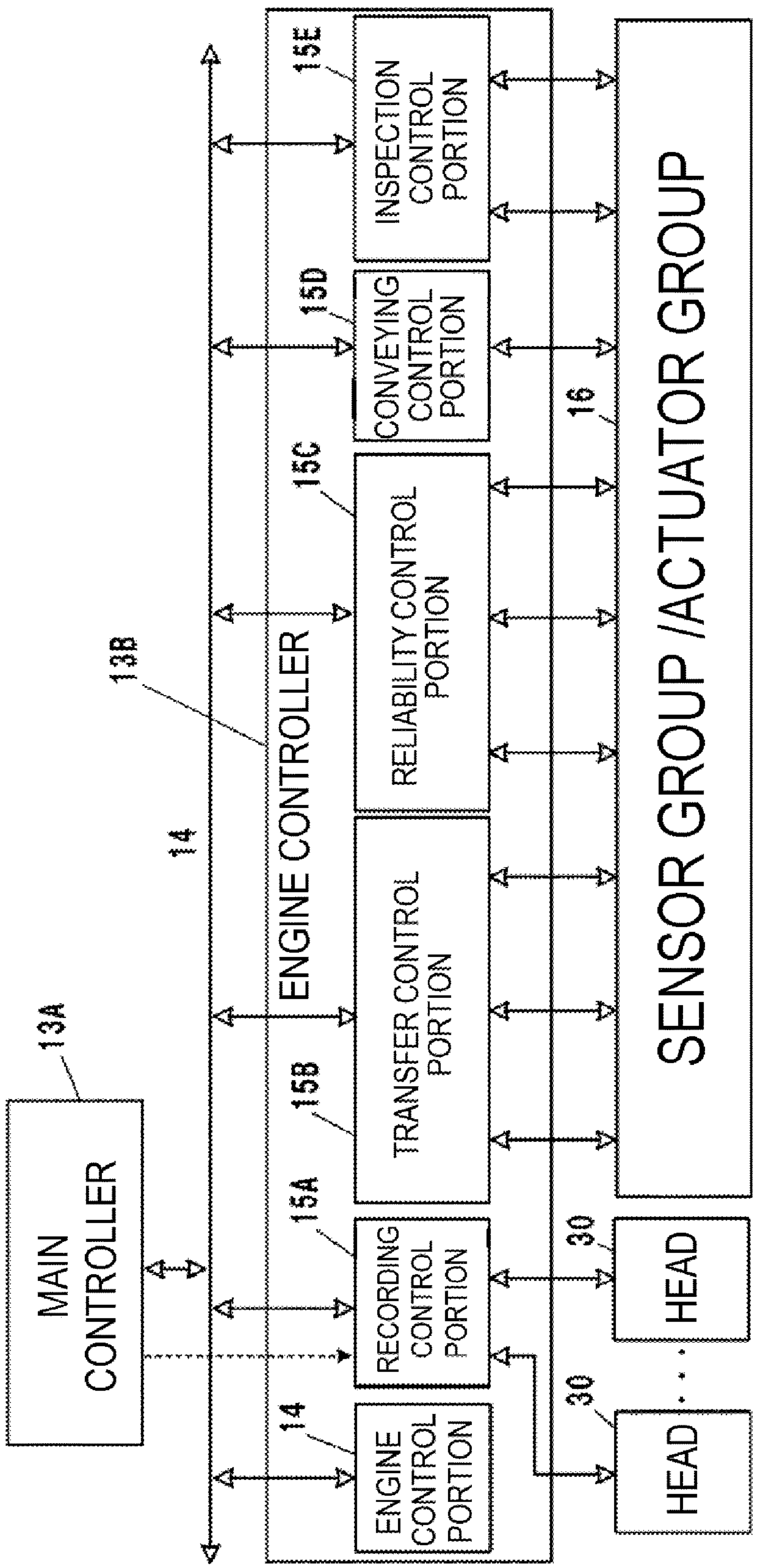
FIG. 5 is a block diagram of the control system of the recording system.

A control unit of the recording system 1 will be described with reference to FIGS. 4 and 5. FIGS. 4 and 5 are block diagrams of the control unit 13 of the recording system 1. The control unit 13 is communicably connected to a higher-level device (digital front end (DFE)) HC2, and the higher-level device HC2 is communicably connected to a host device HC1.

Original data serving as the base for recorded images is generated or saved at the host device HC1. The document data here is generated in an electronic file format, such as a document file, image file, or the like, for example. This original data is transmitted to the higher-level device HC2, and at the higher-level device HC2 the received original data is converted into a data format usable by the control unit 13 (e.g., RGB data that expresses images in RGB). The data following conversion is transmitted from the higher-level device HC2 to the control unit 13 as image data, and the control unit 13 starts recording operations on the basis of the received image data.

In the case of the present example, the control unit 13 is generally divided into a main controller 13A and an engine controller 13B. The main controller 13A includes a processing portion 131, a storage portion 132, an operating portion 133, an image processing portion 134, a communication interface 135, a buffer 136, and a communication interface 137.

The processing portion 131 is a processor such as a central processing unit (CPU) or the like that executes programs stored in the storage portion 132 to control the entire main controller 13A. The storage portion 132 is a storage device such as random-access memory (RAM), read-only memory (ROM), a hard disk, a solid-state drive (SSD), or the like, and stores programs that the CPU 131 executes, as well as data, and also provides a work area for the CPU 131. The operating portion 133 is an input device such as, for example, a touch panel, a keyboard, a mouse, or the like, and accepts user instructions.

The image processing portion 134 is an electronic circuit that has an image processing processor, for example. The buffer 136 is RAM, a hard disk, or an SSD, for example. The communication interface 135 performs communication with the higher-level device HC2, and the communication interface 137 performs communication with the engine controller 13B. Dashed-line arrows in FIG. 4 exemplify the flow of processing of image data. The image data received from the higher-level device HC2 via the communication interface 135 is accumulated in the buffer 136. The image processing portion 134 reads out image data from the buffer 136, subjects the image data that is read out to predetermined image processing, and stores the image data in the buffer 136 again. The post-image-processing image data stored in the buffer 136 is transmitted from the communication interface 137 to the engine controller 13B as recording data that a print engine will use.

As illustrated in FIG. 5, the engine controller 13B includes various types of control portions 14 and 15A to 15E, and acquires detection results and performs driving control of a sensor group and an actuator group 16 that the recording system 1 is provided with. These control portions each include a processor such as a CPU, a storage device such as RAM, ROM, or the like, and an interface for communication with an external device. Note that the segmentation of the control portions is exemplary, and execution may be performed by a plurality of control portions where part of the control has been further segmentalized, or inversely, a plurality of control portions may be integrated, and be configured such that the control content thereof is carried out by a single control portion.

The engine control portion 14 controls the entire engine controller 13B. The recording control portion 15A converts recording data received from the main controller 13A into a data format appropriate for driving the recording heads 30, such as raster data or the like. The recording control portion 15A performs discharge control of each recording head 30. The transfer control portion 15B performs control of the applying unit 5A, control of the absorbing unit 5B, control of the heating unit 5C, and control of the cleaning unit 5D. The reliability control portion 15C performs control of the supply unit 6, control of the recovery unit 12, and control of the driving mechanism that moves the recording unit 3 between the discharging position POS1 and the recovering position POS3. The conveying control portion 15D performs control of the conveying apparatus 1B. The inspection control portion 15E performs control of the inspection unit 9B and control of the inspection unit 9A. Out of the sensor group and the actuator group 16, the sensor group includes a sensor to detect positions and speeds of moving parts, a sensor for detecting temperature, an image-capturing device, and so forth. The actuator group includes a motor, an electromagnetic solenoid, an electromagnetic valve, and so forth.

Operation Example

Figure 6:
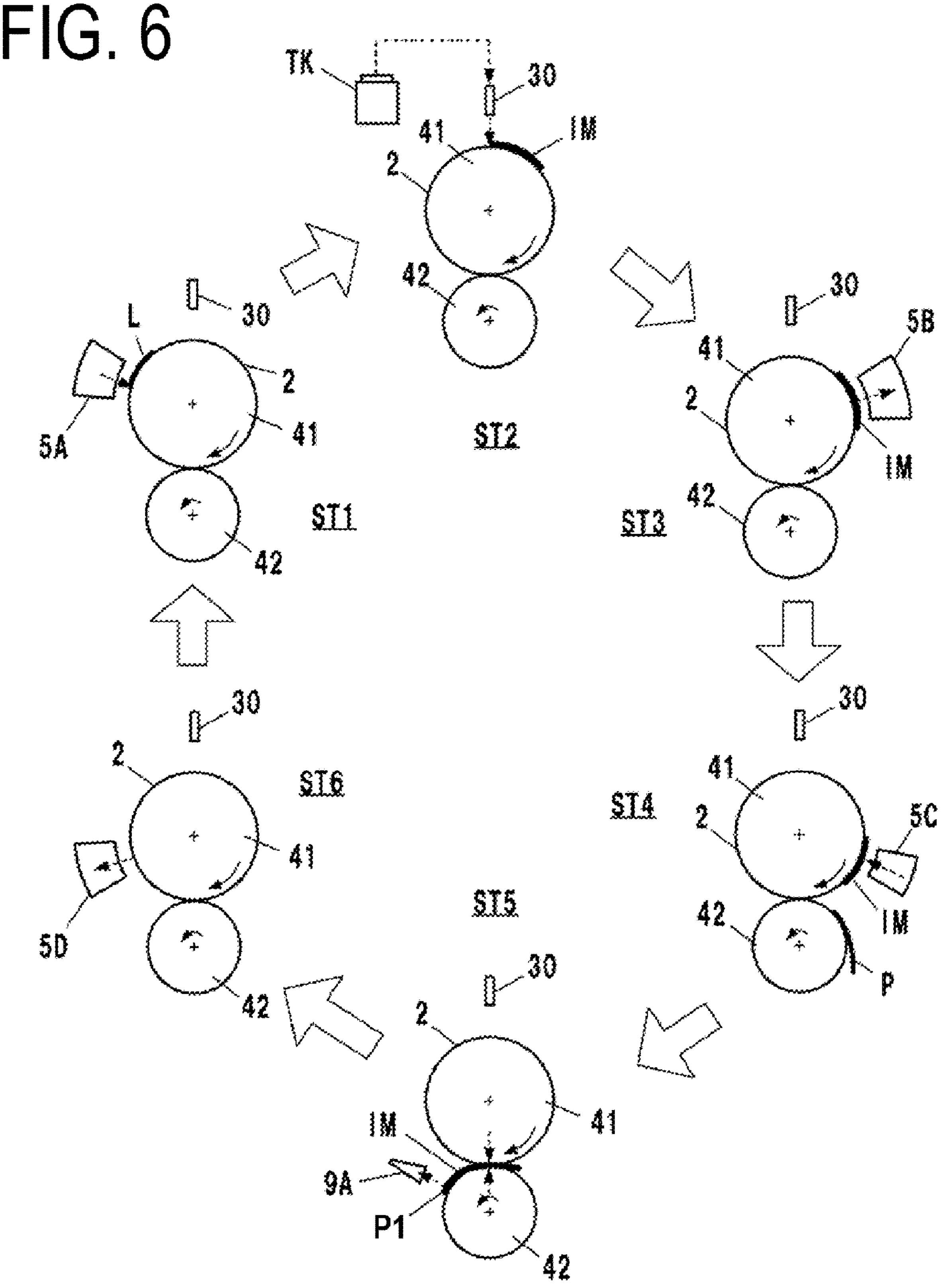
FIG. 6 is an explanatory diagram of an operation example of the recording system.

FIG. 6 is a diagram schematically illustrating an example of recording operations. The following processes are cyclically performed while the transfer drum 41 and the platen 42 are rotated. As illustrated at state ST1, first, a reaction liquid L is applied onto the transfer member 2 by the applying unit 5A. The portion of the transfer member 2 to which the reaction liquid L is applied moves along with the rotation of the transfer drum 41. When the portion to which the reaction liquid L is applied reaches beneath the recording head 30, ink is discharged to the transfer member 2 by the recording head 30, as illustrated in state ST2. Thus, an ink image IM is formed. At this time, the discharged ink mixes with the reaction liquid L on the transfer member 2, thereby promoting aggregation of the color material. The discharged ink is supplied to the recording head 30 from the reservoir portion TK of the supply unit 6.

The ink image IM on the transfer member 2 moves along with the rotation of the transfer member 2. When the ink image IM reaches the absorbing unit 5B, liquid components are absorbed from the ink image IM by the absorbing unit 5B, as illustrated in state ST3. When the ink image IM reaches the heating unit 5C, the ink image IM is heated by the heating unit 5C, resin in the ink image IM melts, and the ink image IM exhibits film formation, as illustrated in state ST4. Synchronously with the formation of the ink image IM in this way, the recording medium P is conveyed by the conveying apparatus 1B.

As illustrated in state ST5, the ink image IM and the recording medium P reach the nip portion of the transfer member 2 and the platen 42 and the ink image IM is transferred onto the recording medium P, hereby manufacturing a recorded article P1. Upon passing the nip portion, the image recorded on the recorded article P1 is photographed by the inspection unit 9A, and the recorded image is inspected. The recorded article P1 is conveyed to the collecting unit 8*d* by the conveying apparatus 1B.

The portion of the transfer member 2 upon which the ink image IM had been formed reaches the cleaning unit 5D, and thereupon is cleaned by the cleaning unit 5D, as illustrated in state ST6. Following cleaning, the transfer member 2 has made one rotation, and transfer of ink images to recording media P is repeatedly performed by the same procedures. Although description has been made above that transfer of the ink image IM is made one time to one sheet of the recording medium P during one rotation of the transfer member 2, for the sake of facilitating understanding, transfer of the ink image IM may be made consecutively to a plurality of sheets of recording medium P during one rotation of the transfer member 2.

After continuing such recording operations, maintenance of the recording heads 30 becomes necessary.

Figure 7:
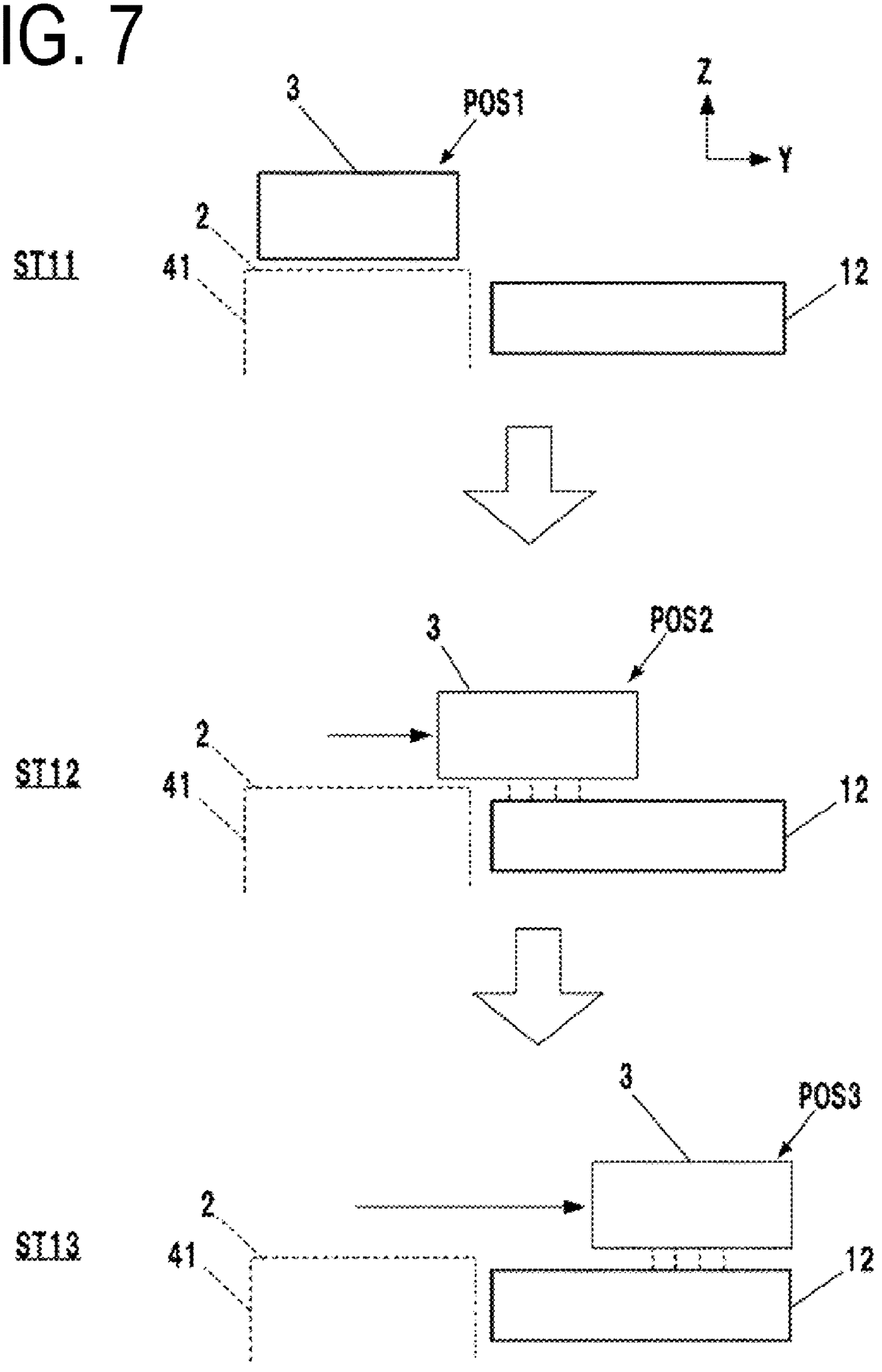
FIG. 7 is an explanatory diagram of an operation example of the recording system.

FIG. 7 illustrates an operation example at the time of maintenance of the recording heads 30. State ST11 illustrates a state in which the recording unit 3 is situated at the discharging position POS1. State ST12 illustrates a state in which the recording unit 3 is passing over the preliminary recovering position POS2, and processing of recovering the discharge performance of the recording heads 30 of the recording unit 3 is executed by the recovery unit 12 while passing. Thereafter, in a state of the recording unit 3 situated at the recovering position POS3, processing of recovering the discharge performance of the recording heads 30 is executed by the recovery unit 12, as illustrated in state ST13.

Description has been made above regarding a transfer type recording apparatus that forms an ink image on the transfer member 2 provided on the outer circumferential face of the transfer drum 41, and transfers this ink image onto the recording medium P, thereby recording the image on the recording medium P. However, this is not limiting, and may be a direct-recording type recording apparatus that discharges ink from the recording heads 30 onto the recording medium P that is being conveyed, to directly record images thereupon. Also, although a configuration has been described above in which the recording unit 3 has a plurality of recording heads 30, a configuration may be made where one recording head 30 is had. Also, the recording head 30 does not have to be a full-line head, and may be a serial type recording head that forms ink images by discharging ink from the recording head 30 while moving a carriage, to which the recording head 30 is detachably mountable, in the Y-axis direction.

The conveying mechanism of the recording medium P may be another system, such as a system in which the recording medium P is nipped by a roller pair and conveyed. In a system for conveying the recording medium P by the roller pair, or the like, a roll sheet may be used as the recording medium P, and the roll sheet may be cut after transfer to manufacture the recorded articles P1. Also, although the transfer member 2 is provided on the outer circumferential face of the transfer drum 41 in the above, other systems may be used, such as a system of forming the transfer member 2 as an endless band and cyclically moving, or the like.

Although the transfer member 2 is provided on the outer circumferential face of the transfer drum 41 in the above embodiment, other systems may be used, such as a system of forming the transfer member 2 as an endless band and cyclically traveling, or the like.

Also, the present invention is also realizable by processing of supplying a program realizing one or more functions of the above-described embodiment to a system or an apparatus via a network or a storage medium, and one or more processors of a computer in the system or apparatus reading out and executing the program. The present invention can also be realized by a circuit that realizes one or more functions (e.g., an application-specific integrated circuit (ASIC)).

Problems with Conventional Collecting Mechanism

Japanese Patent Application Publication No. 2015-83372 discloses an ink mist collecting mechanism of which an object is to collect ink mist droplets without adhesion to wall faces making up suction ports, and without ink droplets originating from adhesion of the ink mist contaminating printed articles. A configuration exemplified as this collecting mechanism has a suction port, a first blowing port, and a second blowing port, in the same way as the present embodiment. The suction port suctions air containing ink mist. The first blowing port blows out air for guiding air containing the ink mist to the suction port. The second blowing port blows out air to adjust the position toward which the air blown out from the first blowing port heads, such that the air blown out from the first blowing port is suctioned by the suction port.

Also, WO 2017/009722 discloses a configuration including a manifold that generates a high-speed gas flow, and a manifold that generates a low-speed gas flow. The manifold that generates the high-speed gas flow is provided to dry condensation of vapor, generated by the solvent of ink droplets discharged onto a transfer member evaporating, which has aggregated on the recording head. Also, the manifold that generates the low-speed gas flow is provided to generate the low-speed gas flow in a space between the recording head and a discharged medium, in order to suppress adhesion of ink mist on the face of the recording head in which the discharge orifices are formed. In this configuration, a slit-like opening portion for blowing a gas flow is provided over the entire width of the printing region, and a configuration is illustrated in which a comb tooth-like structural object is encompassed within the opening portion in order to maintain the structure of the opening portion.

In either configuration of the above Japanese Patent Application Publication No. 2015-83372 and WO 2017/009722, substantially uniformly blowing out an airflow over the entire width of the printing region is important in effectively manifesting the advantages of these inventions. Also, in Japanese Patent Application Publication No. 2015-83372, with regard to the airflow blown out from the second blowing port, windspeed needs to be controlled so that the airflow does not reach the discharged medium in particular.

In a recording apparatus provided with a mechanism that has a slit-like opening portion for blowing out an airflow, and that supplies the airflow to the vicinity of the discharged medium and recording head, variance in windspeed of the airflow occurs in the configuration in WO 2017/009722, for example. The configuration in WO 2017/009722 has the combtooth-like structural object in the blowing channel in order to maintain the shape of the slit-like opening portion, and accordingly variance in windspeed due to the combtooth-like structural object occurs in the airflow blown out.

Also, although Japanese Patent Application Publication No. 2015-83372 makes no mention of an internal structure of a slit-like blowing channel, application to a line-form ink jet recording apparatus can be assumed. In this case, depending on the apparatus and the size of the printed article that is the object, there can be cases in which the length of the long side direction of the slit-like opening portion reaches around one meter, while the length in the short side direction is around one millimeter. Further, cases in which the ratio of the length of the long side of the opening portion as to the length of the short side thereof is extremely great, such as a thousand to one, are conceivable. In such cases, providing some sort of structure within the opening portion to maintain the shape of the opening, there is a possibility of variance in windspeed occurring in the airflow that is blown out due to the structure for maintaining the space.

Also, there is a problem in WO 2017/009722 in that the drying effect of condensation on the recording head surface may locally be inferior, and the performance of removing the ink mist from the space between the recording head and the discharged medium may locally deteriorate, leading to deterioration in image quality.

Uniform Airflow Generating Unit

Figure 10A:
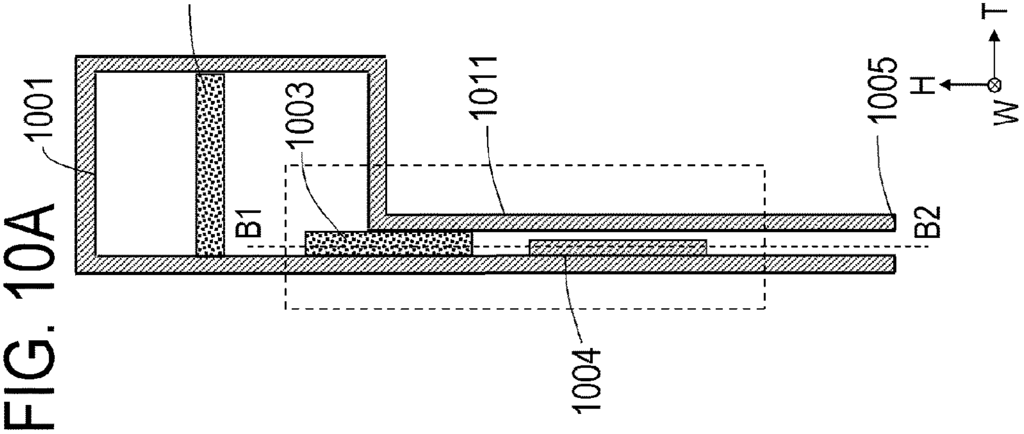
FIGS. 10A to 10C are cross-sectional views illustrating an internal configuration of a configuration example of uniform airflow generating unit.
Figure 10B:
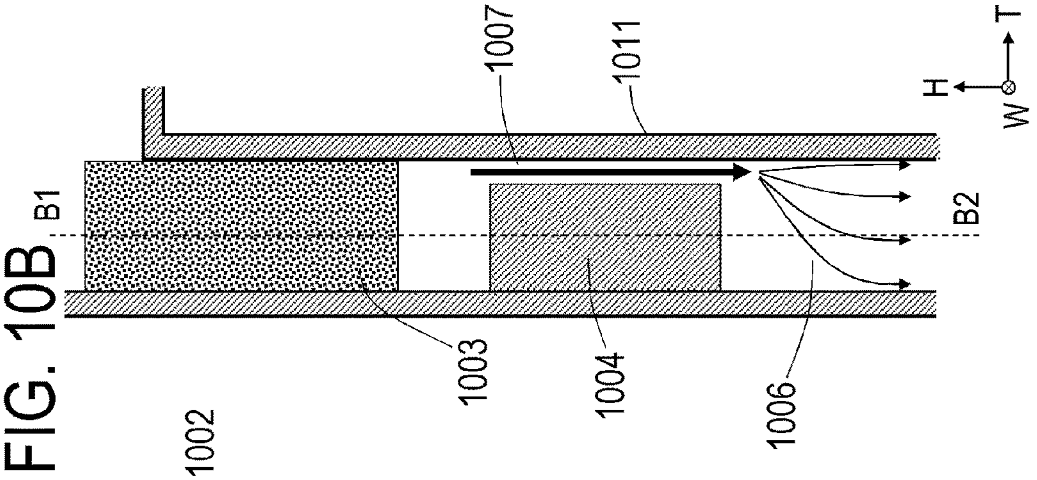
Figure 10C:
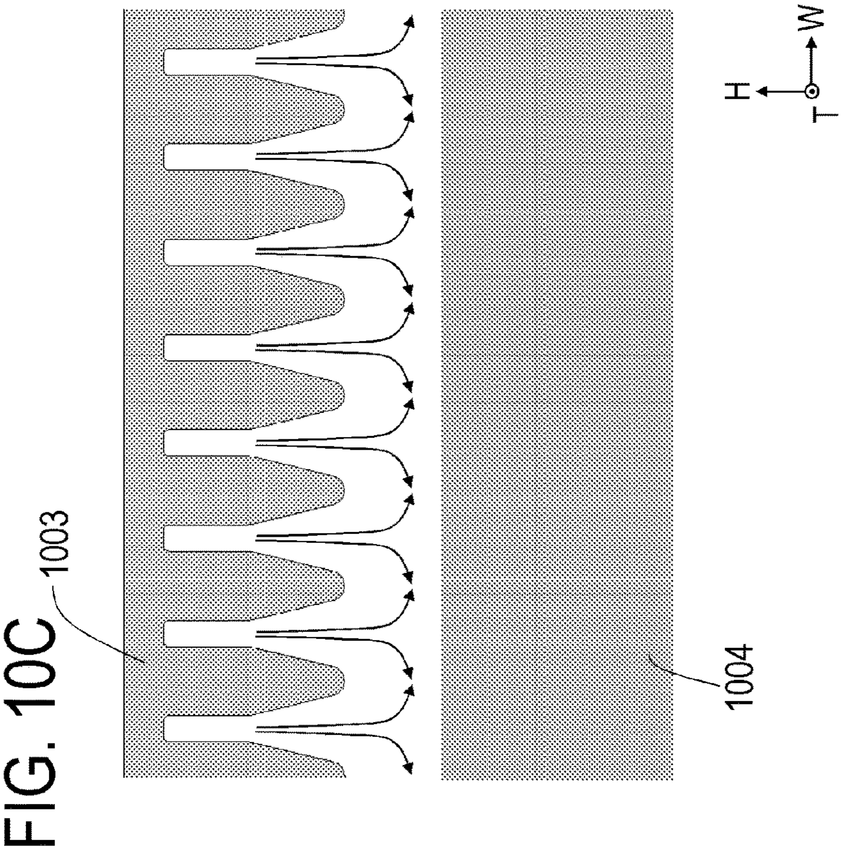
Figures 11A, 11B, 11C, 11D:
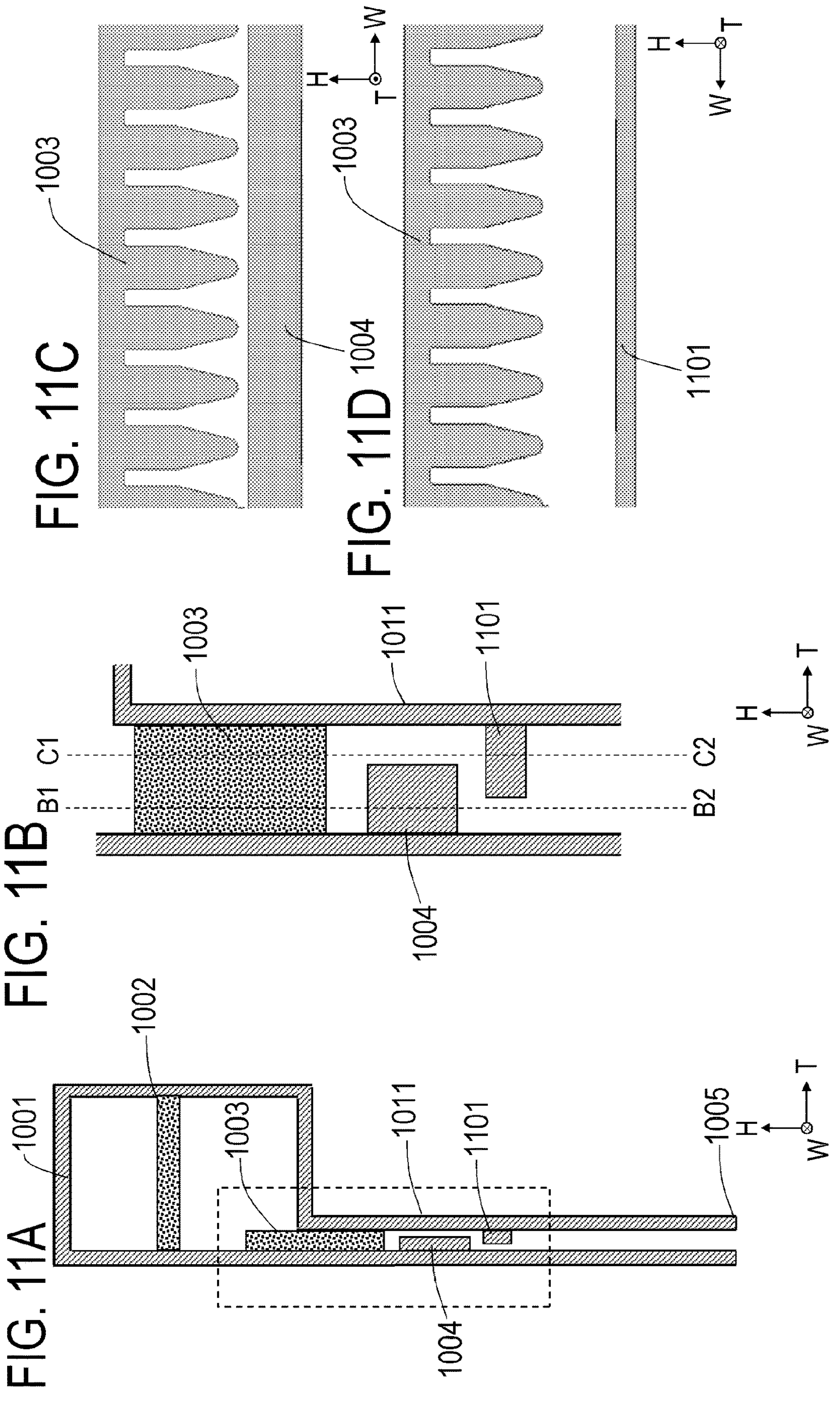
FIGS. 11A to 11D are cross-sectional views of a configuration example of more suitable uniform airflow generating unit.
Figure 12C:
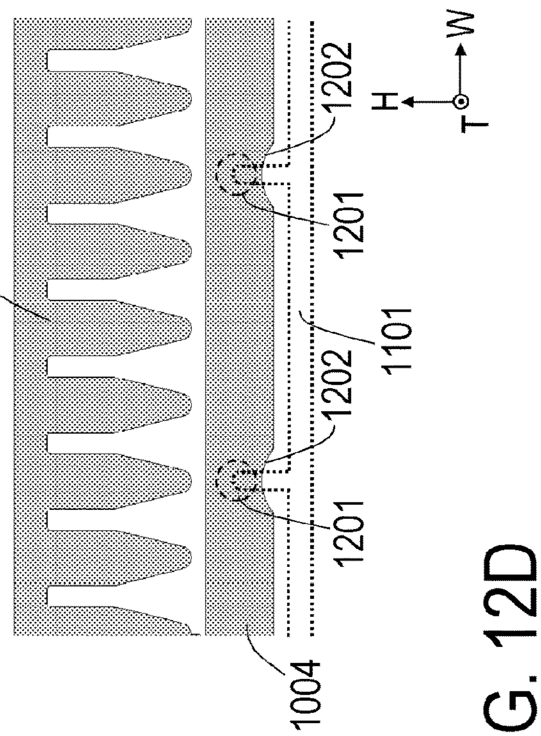
FIGS. 12A to 12D are cross-sectional views of a modification of suitable uniform airflow generating unit.
Figure 12D:
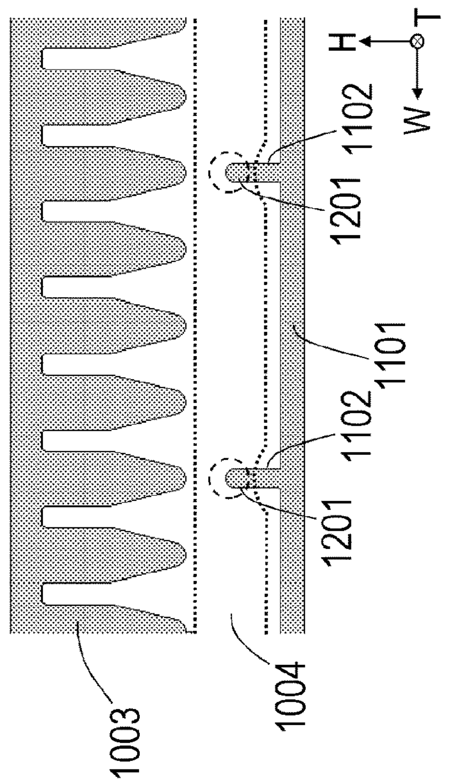
Figure 12B:
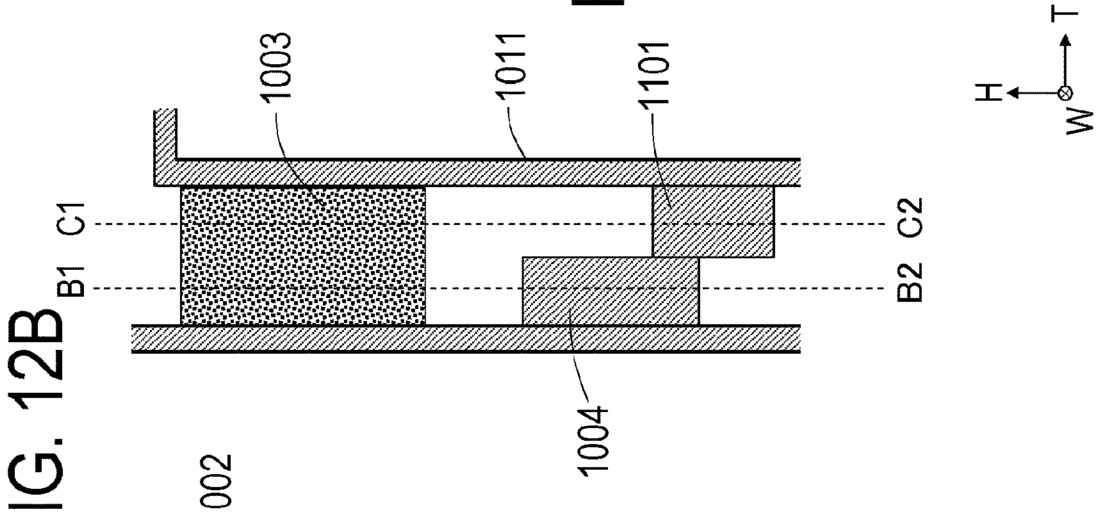
Figure 12A:
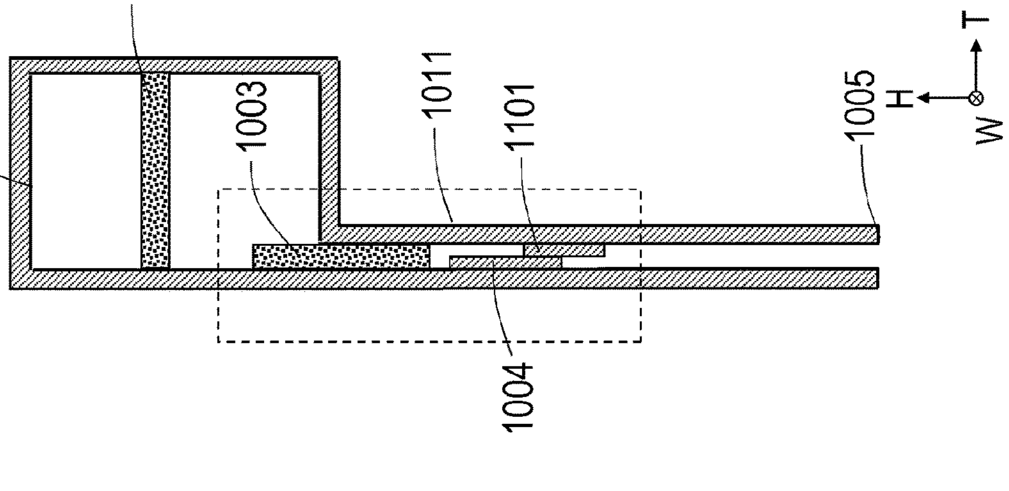

Uniform Airflow Generating Unit Uniform airflow generating unit according to the present embodiment will be described with reference to FIGS. 10A to 12D. FIGS. 10A to 10C are schematic cross-sectional views of a configuration example of uniform airflow generating unit. FIG. 10A illustrates a cross section of the entirety of the present configuration example, and FIG. 10B is an enlarged view of a region in FIG. 10A that is surrounded by a dotted line. Also, FIG. 10C is a diagram illustrating a cross-section taken along B1-B2 in FIG. 10B. Arrows in the figures indicate the direction in which air flows.

This form is a configuration of which an object is to supply air to an inlet buffer chamber 1001 from an inlet port that is omitted from illustration, and to substantially uniformly blow out an airflow from a slit-like opening portion 1005. In the configuration example illustrated in FIGS. 10A to 10C, the inlet buffer chamber 1001 for buffering the pressure of air supplied to the present uniform airflow generating unit is provided, and the inlet buffer chamber 1001 serving as an airflow supply portion is sectioned into two regions by an air pressure adjusting member 1002. This air pressure adjusting member 1002 may be, for example, a porous material, a plate-like member in which a plurality of small holes is provided in the longitudinal direction, a combination thereof, or the like.

A blowing port 1011 forms a blowing channel for blowing out the airflow supplied from the inlet buffer chamber 1001. A channel cross-section of the blowing port 1011 forms a slit-like channel that is slender in the width direction W that is orthogonal to the conveying direction T of the discharged medium such as the transfer member 2 or the like. The slit-like channel of which the channel width is slender in the width direction W thus extends in a substantially perpendicular direction H as to the conveyance region of the discharged medium, from an inlet side connected to the inlet buffer chamber 1001, to an outlet side at which the opening portion 1005 is provided.

Also, a comb tooth-like structural object 1003 serving as a supporting member for maintaining the shape of the slit-like opening portion 1005 is provided at an inlet of the channel of the blowing port 1011 from the inlet buffer chamber 1001 toward the slit-like opening portion 1005. The structural object 1003 is provided so as to allow passage of the airflow at the inlet side of the blowing port 1011, while supporting (being wedged against), in the conveying direction T, wall faces of the blowing port 1011 that are opposite to each other in the conveying direction T.

Also, the blowing port 1011 has a narrow portion at which the width of the channel in the conveying direction T is partially narrowed closer to the outlet side than the structural object 1003 on the wall faces forming the channel, and part of the channel is narrowed between the comb tooth-like structural object 1003 and the slit-like opening portion 1005. In the present example, the narrow portion is realized by a structural object 1004 that is plate-like in shape and has a thickness of half or more of the width of the slit in the short side direction. That is to say, the structural object 1004 partially narrows the width of the channel of the blowing port 1011 in the conveying direction T to no more than half the width of regions thereof where the structural object 1004 is not provided. Out of the wall faces of the opposing wall faces of the blowing port 1011, the structural object 1004 is provided to the wall face on the upstream side in the conveying direction T at a position away from the structural object 1003 on the downstream side of the channel, and also away from the outlet of the channel (opening portion 1005) on the upstream side of the channel. The structural object 1004 is provided over the entire region of the blowing port 1011 in the width direction W thereof. This structure may be realized by working part of the wall faces of the channel of the blowing port 1011, such as bending so as to protrude to an inner side of the channel.

Generally, when a fluid such as air that has viscosity is made to flow through the inside of a slit-like channel, and blow out from an opening portion, the flow speed of the fluid being blown out is the fastest around the middle in the width of the short side direction of the slit. Accordingly, making the structural object 1004 to have a thickness exceeding half of the width in the short side direction is even more suitable, since the portion of the flow that is fastest can be efficiently dispersed in the long side direction. According to this configuration, even if there are portions where the flow speed is locally fast, this flow can be suppressed from directly heading toward the opening portion. According to this action, in the blowing channel, first, the airflow is disposed in the long side direction of the slit, variance in flow speed in the long side direction is mitigated, and an airflow restricted to the short side direction is generated. Next, when the airflow passes a narrowed space portion 1007 that is narrowed down by the structural object 1004, the airflow becomes a jet flow that is a so-called rectangular jet, and the airflow that has passed through this slender narrow portion becomes an airflow that has a nature of readily spreading in the short side direction as compared to in the long side direction. Further, in this span heading toward the opening portion 1005, the wall faces that form the opening portion are present near to the flow of air, and accordingly the airflow is straightened, being drawn toward the wall faces by the Coanda effect, and consequently the airflow actively spreads in the short side direction of the channel, as indicated by 1006 in FIG. 10B. According to this effect, the windspeed of the airflow in the blowing channel that has passed the narrow portion decreases as compared to the windspeed, at the narrow portion, and this reduction in the windspeed further facilitates spreading of the airflow in the long side direction of the opening. That is to say, temporarily restricting the airflow to the short side direction by the narrow portion in the channel is equivalent to converting variance of windspeed in the long side direction into variance of windspeed in the short side direction. Effects of dispersion of air by the nature of the above-described rectangular jet, and the Coanda effect, act more effectively on windspeed variance in the short side direction, whereby air is dispersed more readily, and consequently, this mechanism enables windspeed to easily be made uniform.

Through the above mechanism, making uniform the airflow in the long side direction of the slit, which generally requires a large pressure buffer chamber and a highly precise and highly rigid slit, can be realized in a space within an extremely narrow and small blowing channel.

Also, more preferably, one or more sets of the plate-like structural object 1004 serving as a first narrow portion and a second plate-like structural object 1101 serving as a second narrow portion may be alternatingly provided on respective opposing wall faces of the blowing port 1011, as illustrated in FIGS. 11A to 11D. In this case, the total of the short side direction lengths (heights in the conveying direction T) of the narrow portions making up a set is preferably no less than the length of the blowing port 1011 in the short side direction (width in the conveying direction T). That is to say, a configuration is preferable in which, when viewing the two narrow portions making up a set in the direction substantially perpendicular to the conveyance region, the far side is not visible beyond the narrow portions, or the two narrow portions overlap each other.

According to this structure, the effects that the configuration of the present form has can be made more reliable. That is to say, in a case in which there is a portion of the channel in the slit-like blowing port 1011 where the flow speed is locally fast, one of the narrow portions will be at a position shielding this flow without fail, and accordingly this flow can be suppressed from directly heading toward the opening portion 1005.

Further, a configuration may be made in which plate-like structural objects, serving as a narrow portion pair disposed on respective opposing wall faces of the blowing port 1011, have contact portions that partially come into contact with each other in the conveying direction T, as illustrated in FIGS. 12A to 12D. That is to say, a configuration is made in which the total of the plate thicknesses of the plate-like structural objects (heights in the conveying direction T) is equal to the length of the blowing port 1011 in the short side direction (width in the conveying direction T), and the structural objects partially come into contact with each other at places indicated by 1201. Thus, these plate-like structural objects themselves can also serve as structural objects for maintaining the shape of the slit-like blowing port 1011, and in particular the opposing distance of the opposing wall faces making up the channel, while allowing airflow to pass between the two plate-like structural objects.

In the present form, the second plate-like structural object 1101 has a configuration including a rib-like abutting portion 1102 that extends from the upper end of the main portion of the second plate-like structural object 1101 extending over the entire region in the width direction W of the blowing port 1011 toward the channel inlet side of the blowing port 1011. A plurality of the rib-like abutting portions 1102 is provided equidistantly in the width direction W, and tip end sides thereof come into contact in the conveying direction T with the first plate-like structural object 1004 at the places 1201. Note that this abutting configuration is only exemplary, and is not restrictive. An abutting configuration such as the rib abutting portions 1102 may be provided on the first plate-like structural object 1004. The configuration of the abutting portion is not limited to the above rib-like form.

Also, notches 1202 may be further provided at part of at least one of the two plate-like structural objects disposed on the respective opposing wall faces of the blowing port 1011, around the places 1201 where the plate-like structural objects come into contact. Thus, the non-uniformity of the windspeed due to the portions where the plate-like structural objects come into contact can be further mitigated.

According to the present embodiment, in a case in which there is variance in windspeed of the airflow blowing out from the opening portion, such as variance due to structures for maintaining the shape of the slit-like opening portion disposed in the opening portion, this variance can be made uniform in a space of a narrow and small slit-like opening portion. According to the present embodiment, the performance of the collecting mechanism, condensation drying mechanism, and ink mist removal mechanism can be markedly improved. Also, by disposing one or more sets of the plate-like structural objects alternatingly on both sides of the long-side side faces in the opening (each of the opposing wall faces in the conveying direction), such that part of the plate-like structural objects come into contact, these structural objects can also serve as structural objects maintaining the shape of the opening portion.

Mist and Vapor Removal Unit

The recording apparatus according to the present embodiment that will be described below is applicable to systems other than the transfer system. Accordingly, the transfer member 2 will be expressed hereinafter as "discharged medium 1702", as a collective name including, for example, recording material onto which ink is directly discharged to perform recording, and so forth.

An example of applying the uniform airflow generating unit according to the present form illustrated in FIGS. 12A to 12D as the removal unit 34 that blows out air to remove the ink mist and vapor of the solvent of the ink from the space between the recording head 30 and the discharged medium 1702 will be described below.

As illustrated in FIG. 8, the removal units 34 are mechanisms that are each disposed on the side of the recording heads 30 corresponding to the plurality of colors that is upstream with respect to the conveying direction of the discharged medium 1702, and blow out an airflow toward the gap between the recording heads 30 and the discharged medium 1702. Blowing out this airflow enables the ink mist and vapor of the solvent of the ink in the space between the recording head 30 and the discharged medium 1702 to be forced to the downstream side of the recording heads 30.

Figure 13:
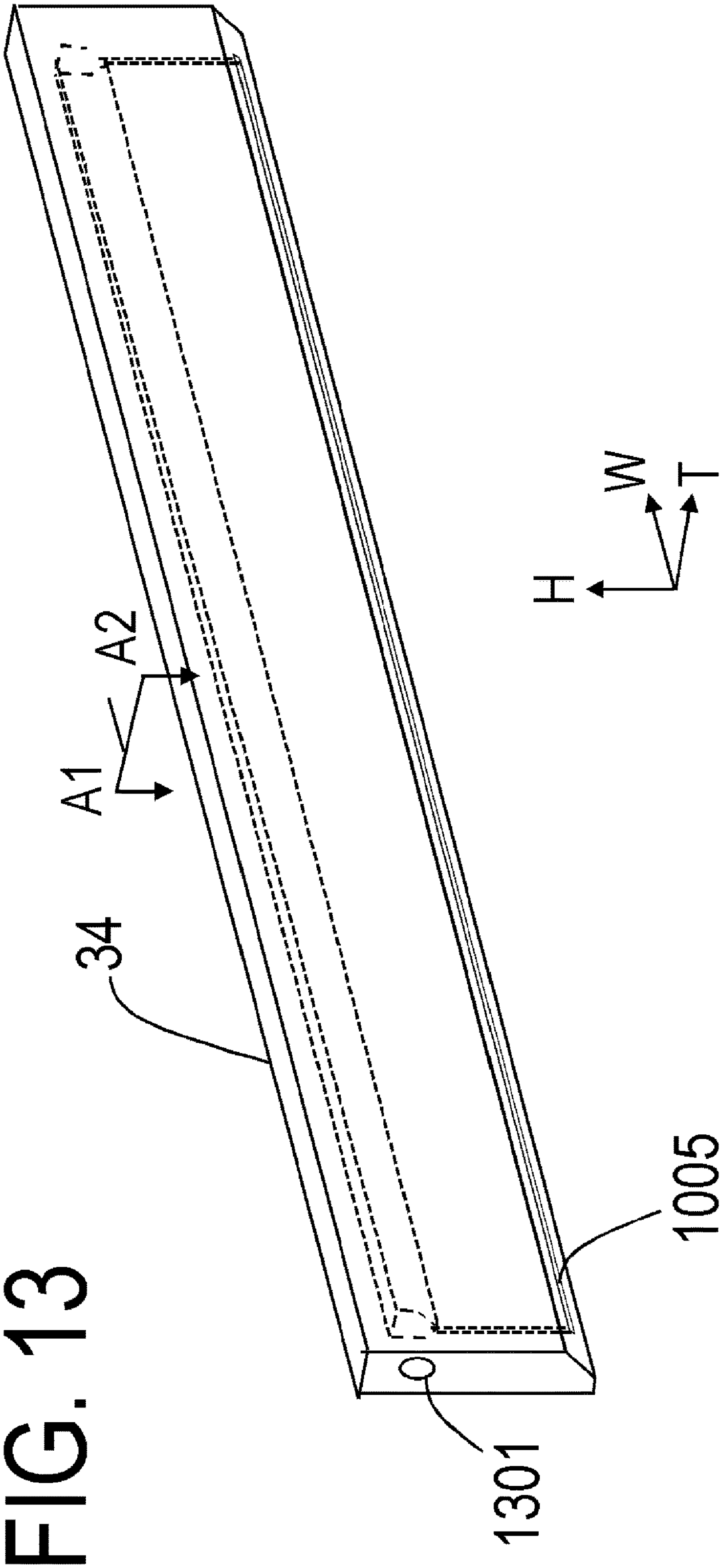
FIG. 13 is a perspective view of a mist and vapor removal unit.

Detailed Description Relating to Embodiment in Case of Applying to Mist and Vapor Removal Unit FIG. 13 is a schematic perspective view illustrating an external view of one of the removal units 34 in FIG. 8 that is extracted. In the present embodiment, the recording heads 30 are line-form heads, and the removal unit 34 has a shape that is long in the same direction as the longitudinal direction of the recording head 30. An air inlet port 1301 that feeds air into a housing of the unit is provided at an end portion of the removal unit 34 in the longitudinal direction (width direction W). Also, this removal unit 34 has the slit-like opening portion 1005 that is long in the width direction of the printing region, to substantially uniformly blow an airflow as to the entire width region of the printing region of the recording head 30. The slit-like opening portion 1005 opens toward the space between the recording head 30 and the discharged medium 1702.

Figures 14A, 14B, 14C, 14D:
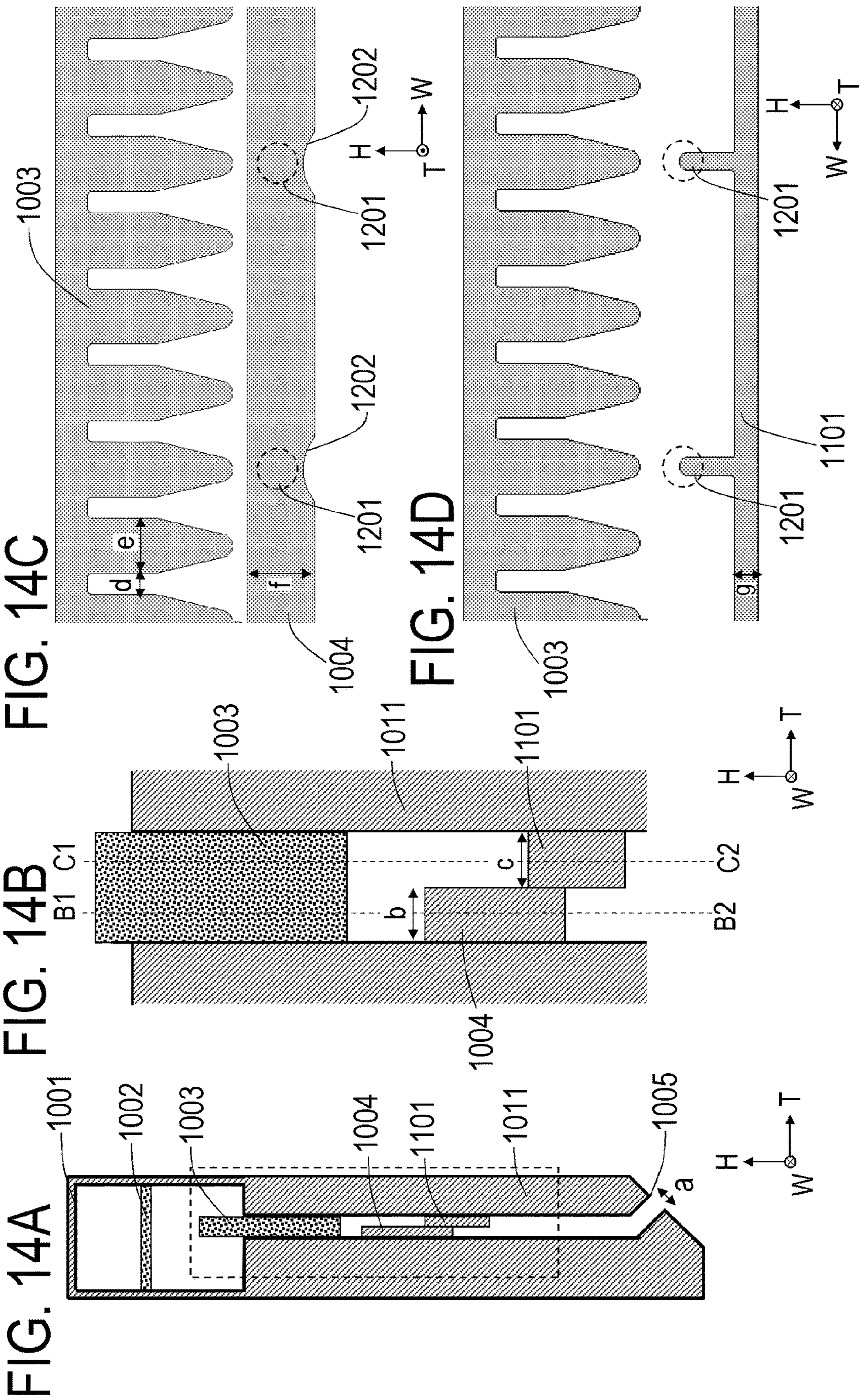
FIGS. 14A to 14D are cross-sectional views illustrating an internal configuration of an embodiment of the mist and vapor removal unit.

FIG. 14A is a schematic cross-sectional view illustrating an internal configuration when cut along cross-section A1-A2 in FIG. 13. FIG. 14B illustrates the region indicated by a dotted line in FIG. 14A in enlarged view. Also, FIG. 14C is a schematic diagram illustrating cross-section B1-B2 in FIG. 14B, and FIG. 14D is a schematic diagram illustrating cross-section C1-C2 in FIG. 14B. In the present form, the comb tooth-like structural object 1003 for maintaining the shape of the slit-like opening portion is provided inside the slit-like opening portion 1005.

Also, a configuration is made in which the plate-like structural objects 1004 and 1101 are alternatingly disposed on respective opposing wall faces of the blowing port 1011, in the same way as the configuration illustrated in FIGS. 12A to 12D, at the side closer to the slit-like opening portion 1005 than the comb tooth-like structural object 1003. Also, the total plate thickness of the structural objects 1004 and 1101 is equal to the distance between the opposing wall faces of the blowing port 1011 in the conveying direction T (opposing width). The plurality of places 1201 where the plate-like structural object 1101 disposed on the downstream side with respect to the airflow blowing out from inside of the blowing port 1011, partially comes into contact with the plate-like structural object 1004 disposed on the upstream side, are provided. Further, the arc-shaped notches 1202 are provided to the plate-like structural object 1004 on the upstream side, at the places 1201. Note that the configuration in FIGS. 14A to 14D is a configuration that differs from the configuration in FIGS. 12A to 12D in that the opening portion 1005 is slightly inclined to the conveying direction T side at the outlet side of the blowing port 1011, but the flow of the airflow of the blowing port 1011 is straightened at the upstream side thereof, and accordingly there is not much difference in functionality.

The present inventors prepared a form in which the dimensions of a, b, c, d, e, f, and g in FIGS. 14A to 14D were as shown in Table 1, and the length of the blowing port 1011 in the long side direction (perpendicular direction H as to the conveyance region) was 800 millimeters. A removal unit 34 according to this form was fabricated that introduces 40 liters per minute of air from the air inlet port 1301, and the windspeed was measured at a position 2 millimeters from the slit-like opening portion 1005. As a result, the wind speed distribution in the long side direction of the slit-like opening portion 1005 was a substantially uniform wind speed within a range of fluctuation amount of 20% from an average windspeed, at each position in the longitudinal direction.

TABLE 1

Units: mm (millimeters)

| a | b | c | d | e | f | g |
|---|---|---|---|---|---|---|
| 1.5 | 0.75 | 0.75 | 3.5 | 9 | 11 | 4 |

Figure 15C:
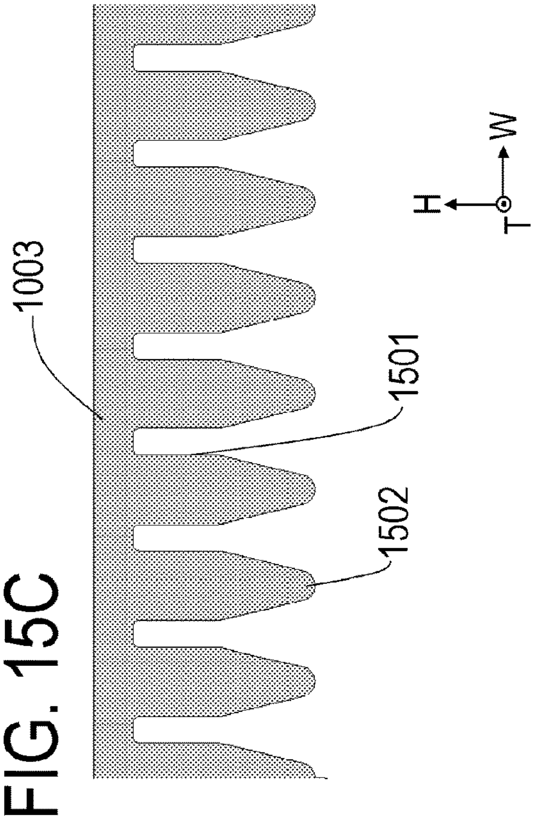
FIGS. 15A to 15C are cross-sectional views illustrating an internal configuration of a mist and vapor removal unit according to a comparative example.
Figure 15B:
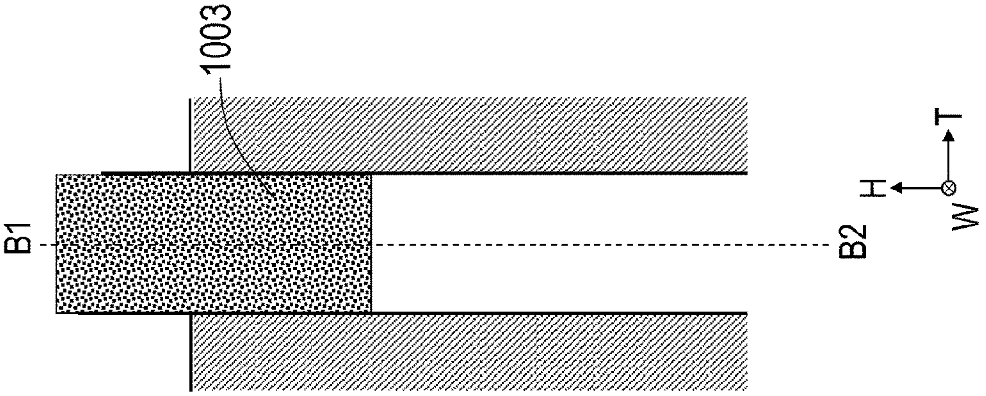
Figure 15A:
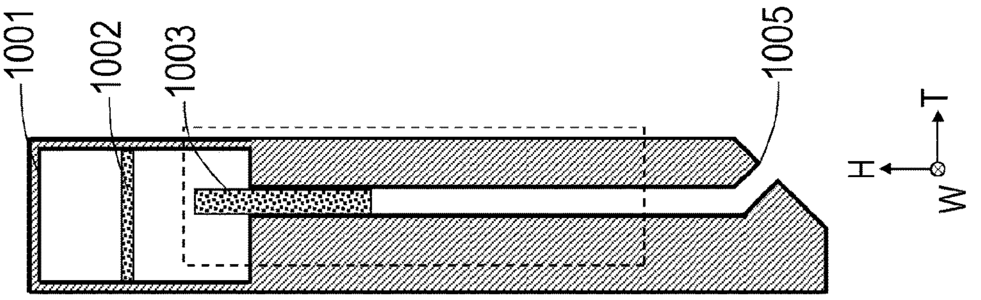

Conversely, a form was created as Comparative Example 1 illustrated in FIGS. 15A to 15C, in which the plate-like structural objects 1004 and 1101 were removed from the form in FIGS. 14A to 14D, and the windspeed was measured at a position 2 millimeters from the slit-like opening portion under the same conditions. As a result, the windspeed locally increased at downstream positions of gaps 1501 where air can pass through the comb tooth-like structural object 1003, and windspeed was locally lower at downstream positions of teeth 1502 of the structural object where air cannot pass. The difference between the locally greatest windspeed and smallest windspeed reached 160% as to the average windspeed, and uniformity was markedly poor as compared to the present embodiment.

Also, based on these results, performance comparison was performed with the gap between the recording head 30 and the discharged medium 1702 at 1.5 millimeters, the width of the recording head 30 as to the conveying direction T of the discharged medium 1702 at 40 millimeters, and a conveying speed V of the discharged medium 1702 of 0.6 meters per second. Specifically, performance comparison of the removal units 34 of the present form and Comparative Example 1 was performed by confirming the effects on ink droplet deviation amount due to the flow of wind in the space between the recording head 30 and the discharged medium 1702 while printing, by computer simulation using the finite volume method. As a result, the present form was found to be effective in reducing deviation amount of landing positions of droplets as compared to the form according to Comparative Example 1, and it was found that the present form is capable of reducing image deterioration due to landing position deviation.

Collecting Mechanism

An overview of the collecting mechanism 33 that collects ink mist and vapor of ink solvent will be described below.

Figure 16:
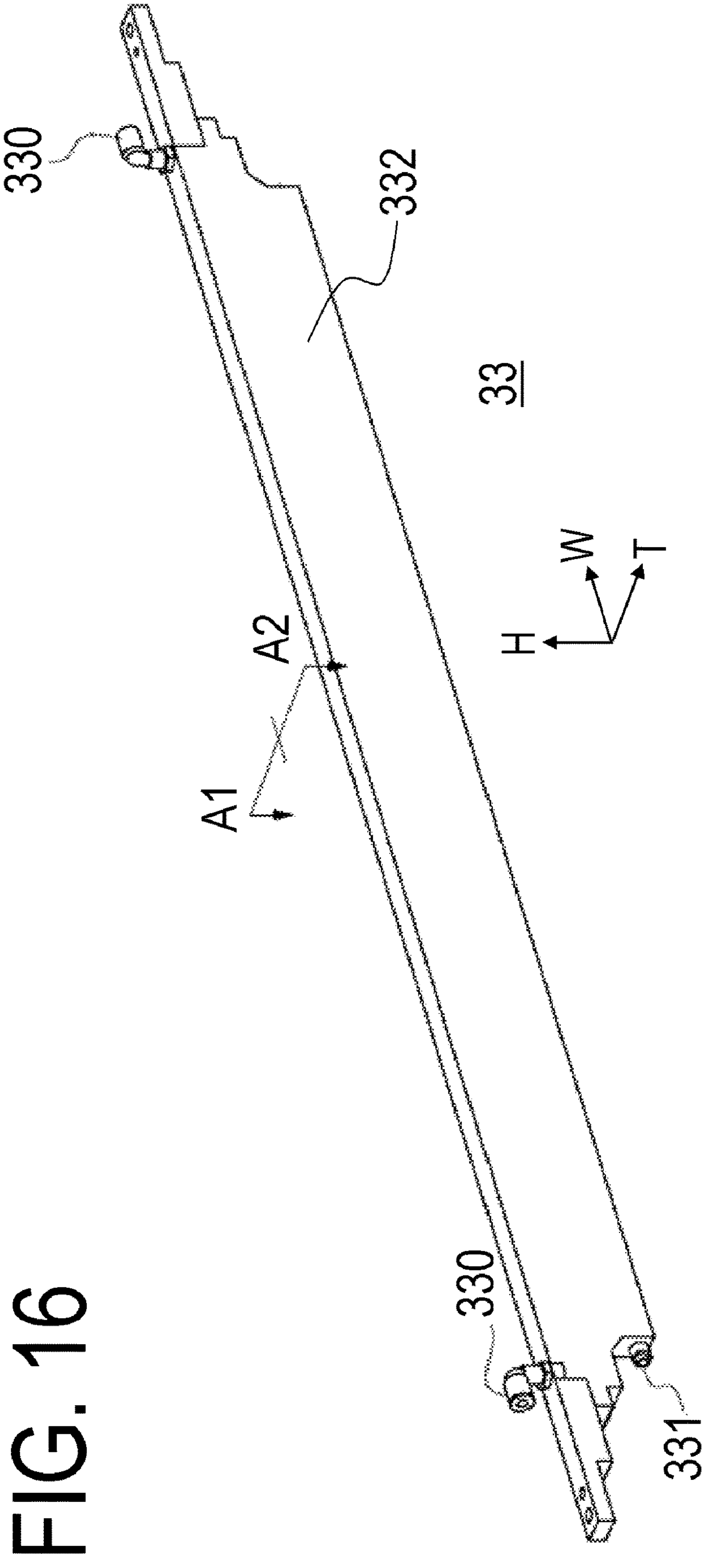
FIG. 16 is a perspective view illustrating an external view of the collecting mechanism.

FIG. 16 is a schematic perspective view illustrating an external view of one of the collecting mechanisms 33 in FIG. 8 that is extracted. In the present embodiment, the recording heads 30 are line-form heads, and an outer housing 332 of the collecting mechanism 33 has a shape that is long in the same direction as the longitudinal direction of the recording head 30. Air inlet ports 330 that feed air into the housing, and air vent ports 331 that discharge air from the inside of the housing, are provided at end portions of the outer housing 332 in the longitudinal direction (width direction W).

Figure 17:
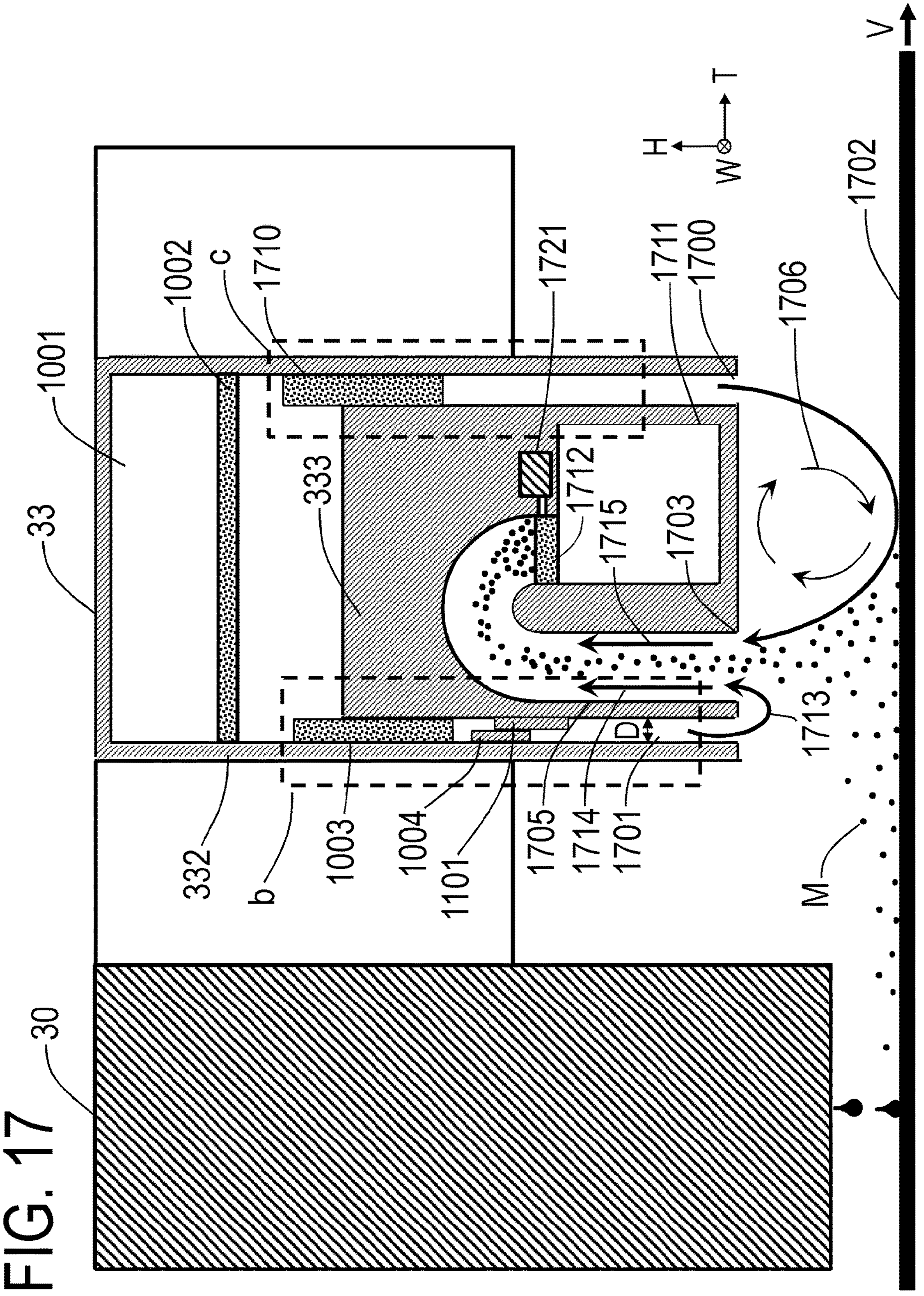
FIG. 17 is a cross-sectional view illustrating an internal configuration according to a first embodiment of the collecting mechanism.

FIG. 17 is a schematic cross-sectional view illustrating an internal configuration when cut along A1-A2 in FIG. 16. The collecting mechanism 33 includes the outer housing 332, and an inner housing 333 encompassed therein, as illustrated in FIG. 17.

A first blowing port 1700 and a second blowing port 1701 are formed to blow clean air from a face of the collecting mechanism 33 that faces the surface (discharged face) of the discharged medium 1702 toward the discharged medium 1702. The first blowing port 1700 and the second blowing port 1701 are formed in slit-like forms as gaps between the outer housing 332 and the inner housing 333. Further, a slit-like suction port 1703 that suctions air into the inside of the inner housing 333 is provided on the face of the collecting mechanism 33 that faces the discharged medium 1702.

Also, in order to blow air out from the first blowing port 1700 and the second blowing port 1701, compressed air is generated by a positive pressure generating portion 211 that includes a pressurizing pump 212 illustrated in FIG. 8 and that serves as a supply portion, and is supplied to the collecting mechanism 33 from the air inlet ports 330. This positive pressure generating portion 211 is provided in common to a plurality of collecting mechanisms 33.

Focusing on one collecting mechanism 33, ink mist M generated by the recording head 30 disposed on the upstream side thereof flows toward the collecting mechanism 33 as the discharged medium 1702 moves, along the movement direction thereof.

The air blown out from the second blowing port 1701 forms laminar flows 1713 and 1714 following wall faces of the collecting mechanism 33, such as an upstream side wall face 1705 on the upstream side in the movement direction (conveying direction) of the discharged medium 1702. The laminar flows 1713 and 1714 function as air barriers that suppress the ink mist M flowing in from adhering to the upstream side wall face 1705 at the upstream side of the suction port 1703.

Meanwhile, air blown out from the first blowing port 1700 generates an eddy 1706 of air at a position that is on the downstream side from the suction port 1703 in the movement direction of the discharged medium 1702. This eddy 1706 swirls up the ink mist M flowing nearby the surface of the discharged medium 1702 toward the suction port 1703. Thus, a great amount of ink mist M is suctioned in by the suction port 1703. Also, the airflow that is blown out from the first blowing port 1700 and heads toward the suction port 1703 forms a laminar flow 1715 along a wall face of the suction port 1703 that is on the downstream side in the movement direction of the discharged medium 1702, and is suctioned into a deep portion of the suction port 1703. Accordingly, at the suction port 1703, the ink mist M is suctioned without adhering to the wall faces making up the suction port 1703.

In one mist collecting mechanism 33, space within the outer housing 332 and space above the inner housing 333 is provided in common as the inlet buffer chamber 1001 to buffer air pressure to be supplied to the first blowing port 1700 and the second blowing port 1701. The inlet buffer chamber 1001 is sectioned into two regions by the air pressure adjusting member 1002. This air pressure adjusting member 1002 may be, for example, a porous material, a plate-like member in which a plurality of small holes is provided in the longitudinal direction, a combination thereof, or the like.

A exhaust buffer chamber 1711 that vents air, suctioned in from the suction port 1703, to the outside of the inner housing 333, is provided inside the inner housing 333. The exhaust buffer chamber 1711 functions as a buffer space for air pressure adjustment of exhaust. The exhaust buffer chamber 1711 functions as an exhaust mechanism, to which a negative pressure generating portion 221 including a negative pressure pump 222 illustrated in FIG. 8 is connected via the air vent ports 331 illustrated in FIG. 16, and which vents air by negative pressure. This negative pressure generating portion 221 is provided in common to the plurality of collecting mechanisms 33.

A suction uniformization member 1712 is provided at the inlet from which air suctioned through the suction port 1703 is introduced to the exhaust buffer chamber 1711. This suction uniformization member 1712 may be a porous material of resin such as polyurethane, metal, ceramic, or the like, a plate-like member in which a plurality of small holes is provided in the longitudinal direction, or a combination thereof, for example. The suction uniformization member 1712 is situated at the deep side of the suction port 1703, and functions as a collecting portion that collects the mist, vapor of ink solvent, and so forth generated by discharging ink, which is included in the air suctioned into the suction port 1703. The suction uniformization member 1712 is provided with a unit 1721 serving as a cleansing liquid supply portion that supplies a cleansing liquid for cleansing the suction uniformization member 1712 and the exhaust buffer chamber 1711. Also provided is a venting mechanism for externally venting the cleansing liquid supplied from the unit 1721 to the suction uniformization member 1712 along with the air suctioned into the collecting portion through the suction port 1703.

Also, a flow rate of air blown out from the first blowing port 1700 (first volume of air) is greater than a flow rate of air blown out from the second blowing port 1701 (second volume of air), and preferably is a volume no greater than ten times thereof at the most. This has been found through numerical value calculation by the finite volume method carried out by the present inventors. The reason is that within this range, the position of the ink mist M being suctioned through the suction port 1703 passes near the middle of the width of the suction port 1703, and accordingly the ink mist M can be prevented from adhering to the wall faces forming the suction port 1703 in a stable manner.

In particular, the flow rate of air blown out from the first blowing port 1700 is preferably in a range of three times to seven times the flow rate of air blown out from the second blowing port 1701 (at least three times the volume of air and not more than seven times the volume of air). In this case, the position of the ink mist M being suctioned and passing through the suction port 1703 is even closer to around the middle of the width of the suction port 1703. Accordingly, the ink mist M can be prevented from adhering to the wall faces forming the suction port 1703 in a sure manner, even in cases where there is fluctuation in the volume of air blown out from the blowing ports 1700 and 1701, or fluctuation in the airflow occurring due to movement of the discharged medium 1702.

Detailed Description Relating to First Embodiment in Case of Applying to Collecting Mechanism An example of a case of applying the uniform airflow generating unit according to the present form to the collecting mechanism 33 that collects ink mist floating in the recording apparatus will be described.

FIG. 17 is a form of the collecting mechanism 33 sharing the inlet buffer chamber 1001 that buffers the air pressure supplied to the first blowing port 1700 and the second blowing port 1701. The inlet buffer chamber 1001 is sectioned into two regions by the air pressure adjusting member 1002. Also, the comb tooth-like structural object 1003 for maintaining the slit-like opening shape is provided in the space connecting the inlet buffer chamber 1001 to the second blowing port 1701, in order to make the ratio of volume of air at the first blowing port 1700 and the second blowing port 1701 to be the above-described appropriate ratio. This structural object 1003 also serves as an air flow rate control member for controlling the flow rate ratio of air blown out from the first blowing port 1700 and the second blowing port 1701.

An air flow rate control member 1710 may be provided in the space connecting the inlet buffer chamber 1001 to the first blowing port 1700 as necessary, and can also serve as a structural object for maintaining the shape of the slit-like opening portion of the first blowing port 1700. Selecting appropriate structural objects 1003 and 1710 serving as air flow rate control members, taking into consideration the magnitude of air resistance thereof, in accordance with the volume of air to be supplied to each of the first blowing port 1700 and the second blowing port 1701, is advantageous.

Note that the air flow rate control members 1003 and 1710 may be a porous material, a plate-like member in which a plurality of small holes is provided in the longitudinal direction, a plate-like member in which a great number of comb-like gaps are formed in the longitudinal direction, a combination thereof, or the like, for example. In the present example, a plate-like member in which a great number of comb-like gaps are formed in the longitudinal direction was selected as the air flow rate control member. In a case of the plate-like member in which the great number of comb-like gaps are formed, with regard to a configuration in which an upper side of the comb-like gaps open into the inlet buffer chamber 1001, a configuration may be made in which air is introduced from the inlet buffer chamber 1001 to the gaps through these opening portions.

Figure 18B:
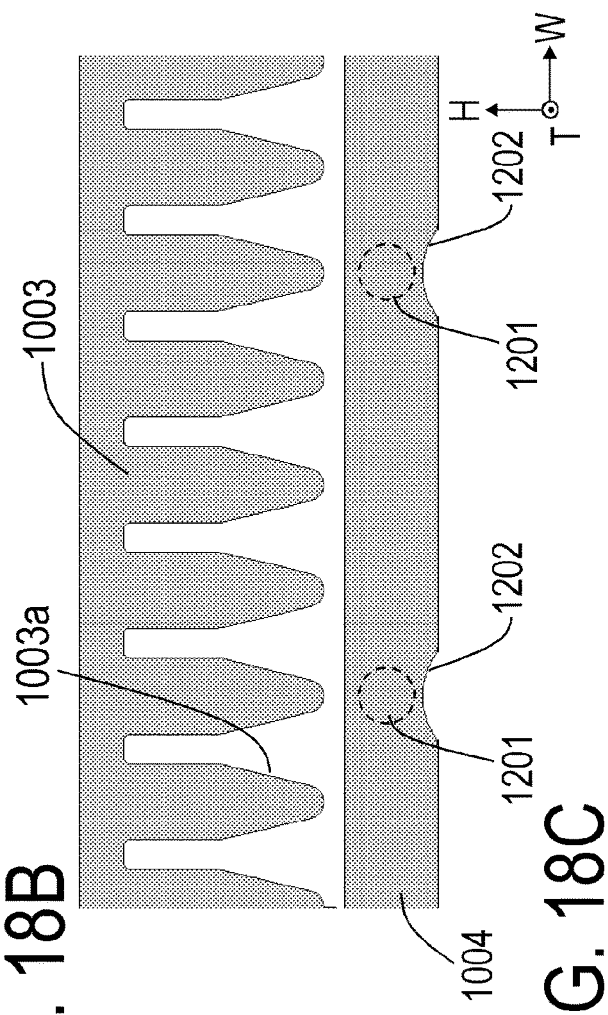
FIGS. 18A to 18C are cross-sectional views illustrating the internal configuration according to the first embodiment of the collecting mechanism.
Figure 18C:
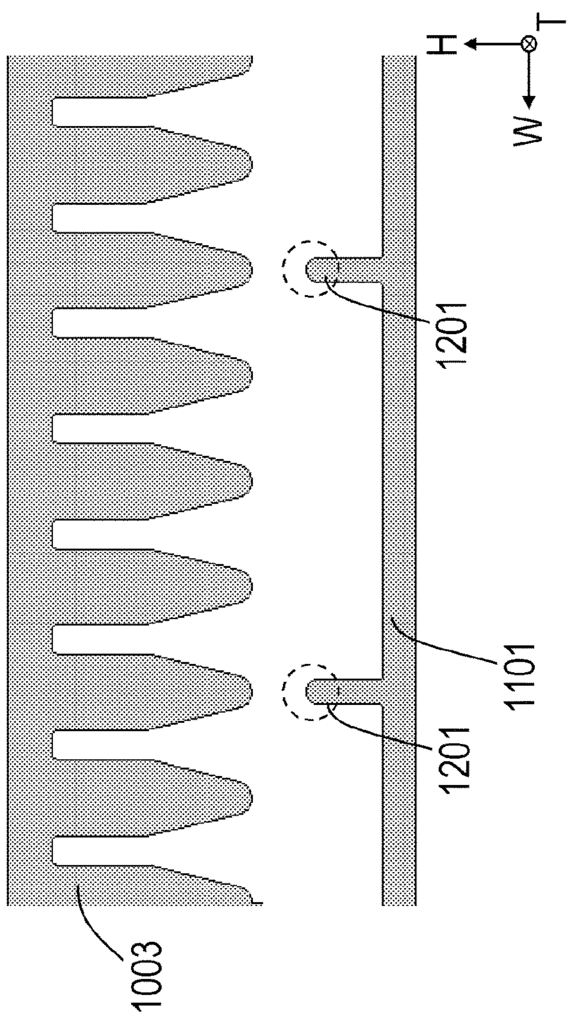
Figure 18A:
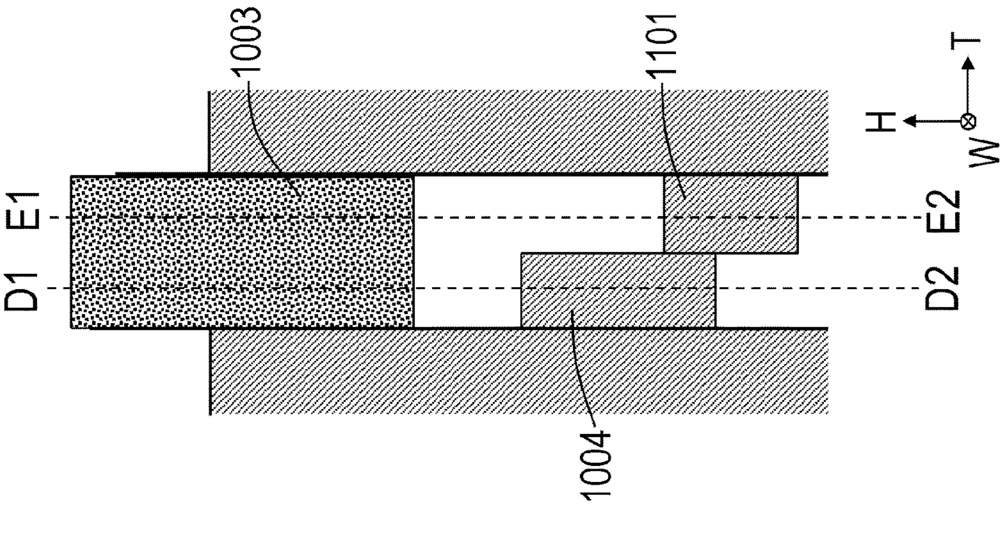
Figure 19B:
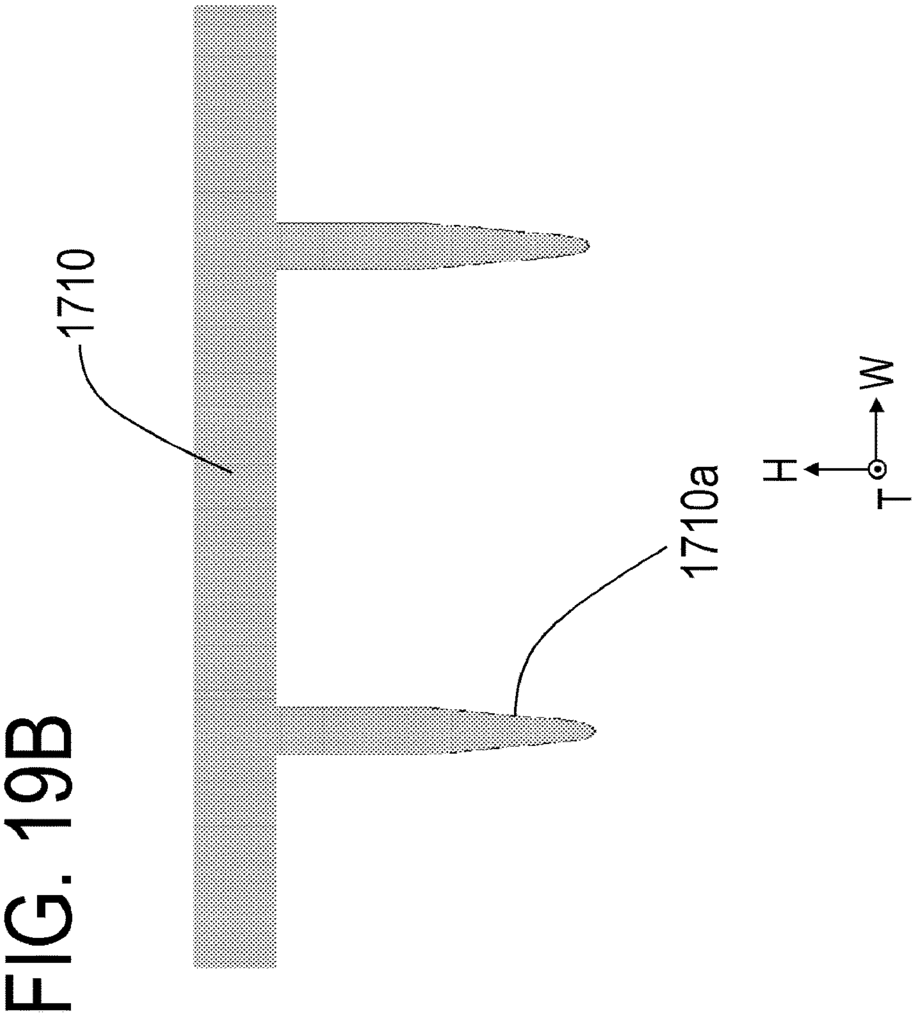
FIGS. 19A and 19B are cross-sectional views illustrating the internal configuration according to the first embodiment of the collecting mechanism.
Figure 19A:
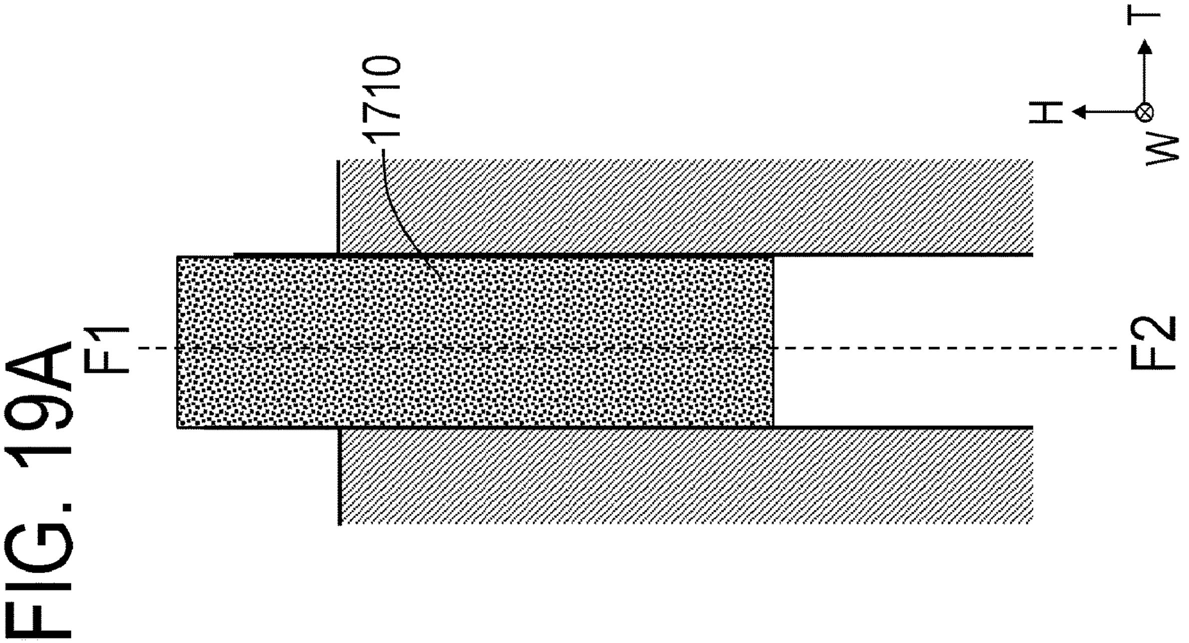

With regard to the form according to the present example, FIG. 18A is an enlarged view of a dashed line portion b in FIG. 17, and FIG. 19A is an enlarged view of a dashed line portion c in FIG. 17. Also, FIGS. 18B and 18C illustrate cross-section D1-D2 and cross-section E1-E2 in FIG. 18A, and FIG. 19B illustrates cross-section F1-F2 in FIG. 19A.

In order to make the ratio of volume of airs of the first blowing port 1700 and the second blowing port 1701 to be the above-described appropriate ratio, the volume of air being blown out needs to be stabilized for the first blowing port 1700 as well. In the present form, the comb tooth-like air flow rate control member 1710 disposed in the first blowing port 1700 has a configuration provided with a plurality of comb teeth 1710*a* extending from a lower end of a main unit portion that extends over the entire region in the width direction W of the first blowing port 1700 toward the outlet side, as illustrated in FIG. 19B. The comb teeth 1710*a* are designed to be of a minimally necessary count for maintaining the shape of the slit-like first blowing port 1700 and a minimally necessary width. Further, an arrangement in which the count of comb teeth 1003*a* of the comb tooth-like air flow rate control member 1003 disposed in the second blowing port 1701 is greater than the count thereof in the air flow rate control member 1710, and the gap between adjacent comb teeth 1003*a* is narrower, is advantageous. Thus, an appropriate flowrate ratio can be realized while minimizing the effects of the comb tooth-like structural objects on the windspeed distribution of the airflow blown out from the slit-like first blowing port 1700.

However, in this case, the airflow blown out from the second blowing port 1701 may include variance in windspeed distribution, due to the structural object 1003 that is the comb tooth-like air flow rate control member disposed in the second blowing port 1701. That is to say, the windspeed may be fast at portions corresponding to the gaps between the comb teeth, and slow at the comb teeth portions. Accordingly, applying the configuration according to the present form illustrated in FIGS. 10A to 12D and described in the section of the uniform airflow generating unit to the second blowing port 1701 enables the windspeed distribution to be made uniform.

Second Embodiment

Detailed Description Relating to Second Embodiment in Case of Applying to Collecting Mechanism Depending on the system of the ink jet recording apparatus, there are cases in which setting the air flow rate blown out from the first blowing port and the second blowing port to be greater than the volume of air necessary for realizing the functions of collecting the ink mist is desirable. An example of the present invention regarding such a case will be described as a second embodiment. Note that in the following description, description of matters in the second embodiment that are in common with the first embodiment will be omitted. The configuration of the second embodiment is the same as the first embodiment where no description in given in particular below.

In a case in which the discharged medium is a heated transfer member in a transfer system recording apparatus or the like, needing to prevent vapor that is generated by the solvent of ink droplets discharged onto the transfer member evaporating from aggregating and condensing on a face of the collecting mechanism facing the transfer medium, or the like, is an example of when a higher air flow rate is desirable. In this case, increasing the volume of air blown out from the first blowing port and the volume of air suctioned in from the suction port to increase the volume of air heading from the first blowing port toward the suction port is advantageous. Accordingly, vapor can be suppressed from stagnating in the space between the collecting mechanism and the transfer member, and even in the event of condensation occurring at the face of the collecting mechanism facing the transfer member, drying can be promoted.

In a recording apparatus that needs a greater volume of air from the first blowing port as in this case, the position in the suction port toward which the airflow blown out from the first blowing port heads is adjusted to a position such that the ink mist suctioned in through the suction port does not adhere to the inner walls of the suction port. There is a need in this adjustment to increase the volume of air blown out from the second blowing port as well. Also, it can be assumed from a coordinates system as viewed from the recording head that the second blowing port will be disposed on the upstream side in the conveying direction of the discharged medium. Accordingly, in order for the configuration of Japanese Patent Application Publication No. 2015-83372 to function, the windspeed of the airflow blown out from the second blowing port is restricted to a relatively slow speed, to a degree where the airflow does not reach the discharged medium and swirl up ink mist, as a matter of course.

Now, when employing a member having a great number of comb tooth-like gaps in the longitudinal direction of the slit-like opening as the air flow rate control member, as described in the first embodiment, the windspeed blown out from the second blowing port increases as the volume of air increases. Accordingly, the windspeed of the airflow blown out toward the second blowing port from the gaps between the comb teeth of the comb tooth-like structure disposed in the second blowing port becomes faster and linearity increases, and disperses less readily, and accordingly variance in windspeed may become more marked. In this case as well, the configuration according to the present form that is illustrated in FIGS. 10A to 12D and that is described above as the uniform airflow generating unit is effective.

Further, when the necessary volume of air to be blown out from the second blowing port increases even more, the windspeed of the air blown out from the second blowing port will increase. Accordingly, cases are conceivable in which, even though the windspeed of the airflow from the second blowing port is made to be substantially uniform by the present form, in a limited space it is difficult to limit the windspeed of the air from the second blowing port to a relatively slow speed such that ink mist is not swirled up. In order to solve the above difficulty, in addition to the configuration of the uniform airflow generating unit described above, a configuration is preferable in which, out of the wall faces making up the second blowing port the upstream side wall face in the conveying direction of the discharged medium is at a position farther away from the discharged medium than the downstream side wall face.

Also, a configuration in which air from the second blowing port is made to blow toward the upstream side in the conveying direction, by a method such as providing a protrusion protruding toward the upstream side in the conveying direction of the discharged medium in a range of the downstream side wall face that is closer to the discharged medium than the upstream side wall face in this configuration, is also advantageous. According to the present configuration, an action of the airflow blown out from the second blowing port spreading to the upstream side in the conveying direction of the discharged medium is generated. There are cases which this necessitates an increase in volume of air blown out from the second blowing port, in order to adjust the position in the suction port toward which the airflow from the first blowing port heads to a position where ink mist suctioned through the suction port does not adhere to the inner walls of the suction port. In such a case as well, ink mist can be kept from swirling up by the airflow blown out from the second blowing port. According to this effect, even in a case in which vapor from the solvent of ink that has evaporated from ink droplets fills the space between the discharged medium and the collecting mechanism, for example, the ink mist can be collected in a stable manner without occurrence of condensation on the opposing face of the collecting mechanism that faces the discharged medium.

Figure 20:
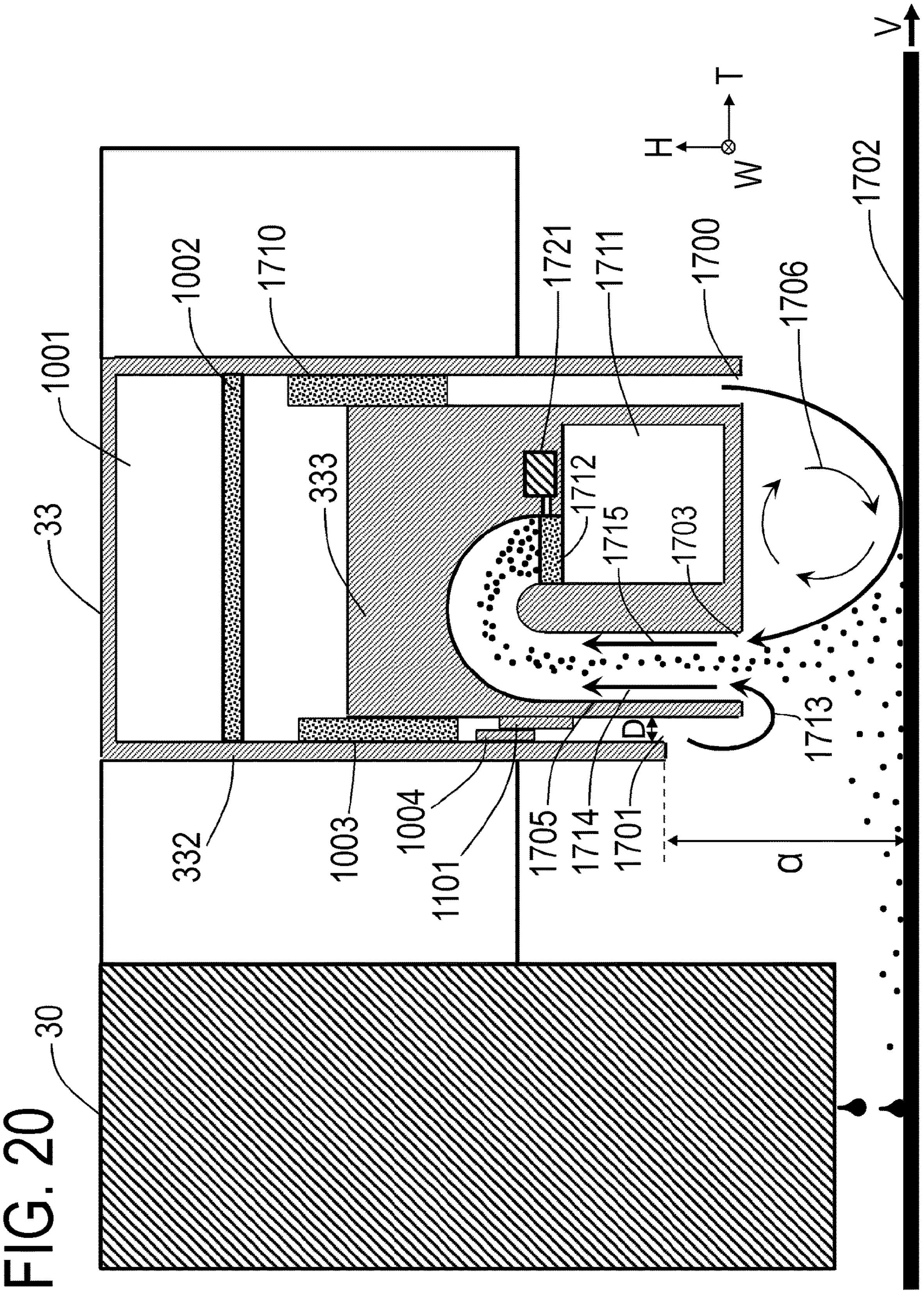
FIG. 20 is a cross-sectional view illustrating an internal configuration according to a second embodiment of the collecting mechanism.

The second embodiment, which is a suitable case of applying the present invention to the collecting mechanism will be described in further detail with reference to FIGS. 20 and 21. FIG. 20 is a cross-sectional view illustrating inside of the collecting mechanism according to the present embodiment. Also, FIG. 21 is an enlarged view illustrating representing the vicinity of the second blowing port 1701 out of the configuration illustrated in FIG. 20.

Figure 21:
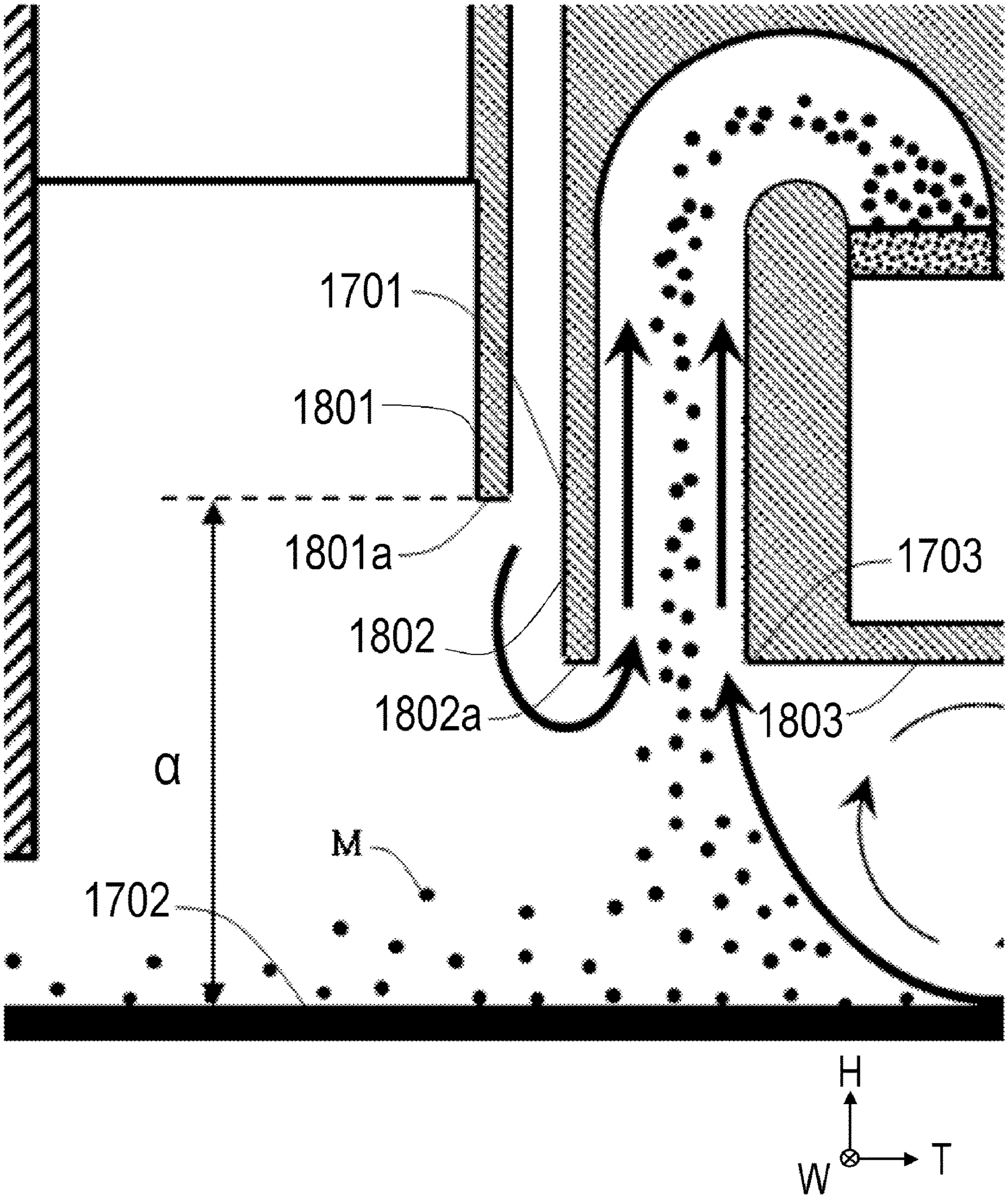
FIG. 21 is a cross-sectional view illustrating the internal configuration according to the second embodiment of the collecting mechanism.

According to the present embodiment, out of the wall faces forming the second blowing port 1701, an upstream side wall face end portion 1801*a* on the upstream side of the conveying direction of the discharged medium 1702 is at a position father away from the discharged medium 1702 than a downstream side wall face end portion 1802*a*, as illustrated in FIG. 21.

That is to say, opposing wall faces of the second blowing port 1701 in the conveying direction T are formed by a wall portion (second wall portion) 1801 on the upstream side in the conveying direction T, and a wall portion (first wall portion) 1802 on the downstream side. In the first embodiment, the upstream side wall face end portion 1801*a* that is a lower end face of the wall portion 1801 and the downstream side wall face end portion 1802*a* that is a lower end face of the wall portion 1802 are at substantially the same height from the conveyance region of the discharged medium 1702. Accordingly, in the first embodiment, the outlets of the first blowing port 1700 and the second blowing port 1701 are at substantially the same height from the conveyance region of the discharged medium 1702 as the inlet of the suction port 1703. Conversely, in the second embodiment, the height of the upstream side wall face end portion 1801*a* from the conveyance region of the discharged medium 1702 is higher than that of the downstream side wall face end portion 1802*a*. Thus, according to the second embodiment, the height of the outlet of the second blowing port 1701 from the conveyance region of the discharged medium 1702 is higher than that of the outlet of the first blowing port 1700 and the inlet of the suction port 1703.

Now, the distance between the upstream side wall face end portion 1801*a* of the second blowing port 1701 and the discharged medium 1702 will be represented by a, the opening width of the second blowing port 1701 as to the conveying direction T by D, the conveying speed of the discharged medium by V, and the average windspeed of the airflow blown out from the second blowing port 1701 by U. In this case, the distance α needs to be at least the same as or longer than a value obtained by dividing the product of D and U by V and multiplying by 4, i.e., 4×D×U/V. Further, the distance α is more suitably not more than a value obtained by dividing the product of D and U by V and multiplying by 20, i.e., the same as 20×D×U/V or shorter. This has been found through numerical value calculation by the finite volume method carried out by the present inventors. The mechanism thereof will be described below.

First, the air blown out from the second blowing port 1701 is generally what is commonly known as a potential core region to around a distance 4×D in the blowing direction from the upstream side wall face end portion 1801*a*, and hardly spreads to the surroundings at all. That is to say, the windspeed of air and width of the flow of air exiting the blowing port are maintained as far as this region, and blown out. Thereafter, the speed of the air that is blown out decays generally in inverse proportion to the distance of the path over which the air has flowed from the upstream side wall face end portion 1801*a*. Now, in order to keep the air blown out from the second blowing port 1701 from cutting off the airflow flowing along the discharged medium 1702 accompanying the conveyance of the discharged medium 1702 and reaching the surface of the discharged medium 1702, and swirling up ink mist M, the windspeed needs to be reduced. Specifically, there is a need for the windspeed to have decreased to at least the same level or below the relative movement speed (conveying speed) V of the discharged medium 1702 as to the recording head 30. Accordingly, the distance α from the upstream side wall face end portion 1801*a* of the second blowing port 1701 to the discharged medium 1702 needs to be at least the length 4×D×U/V or more.

Figure 22:
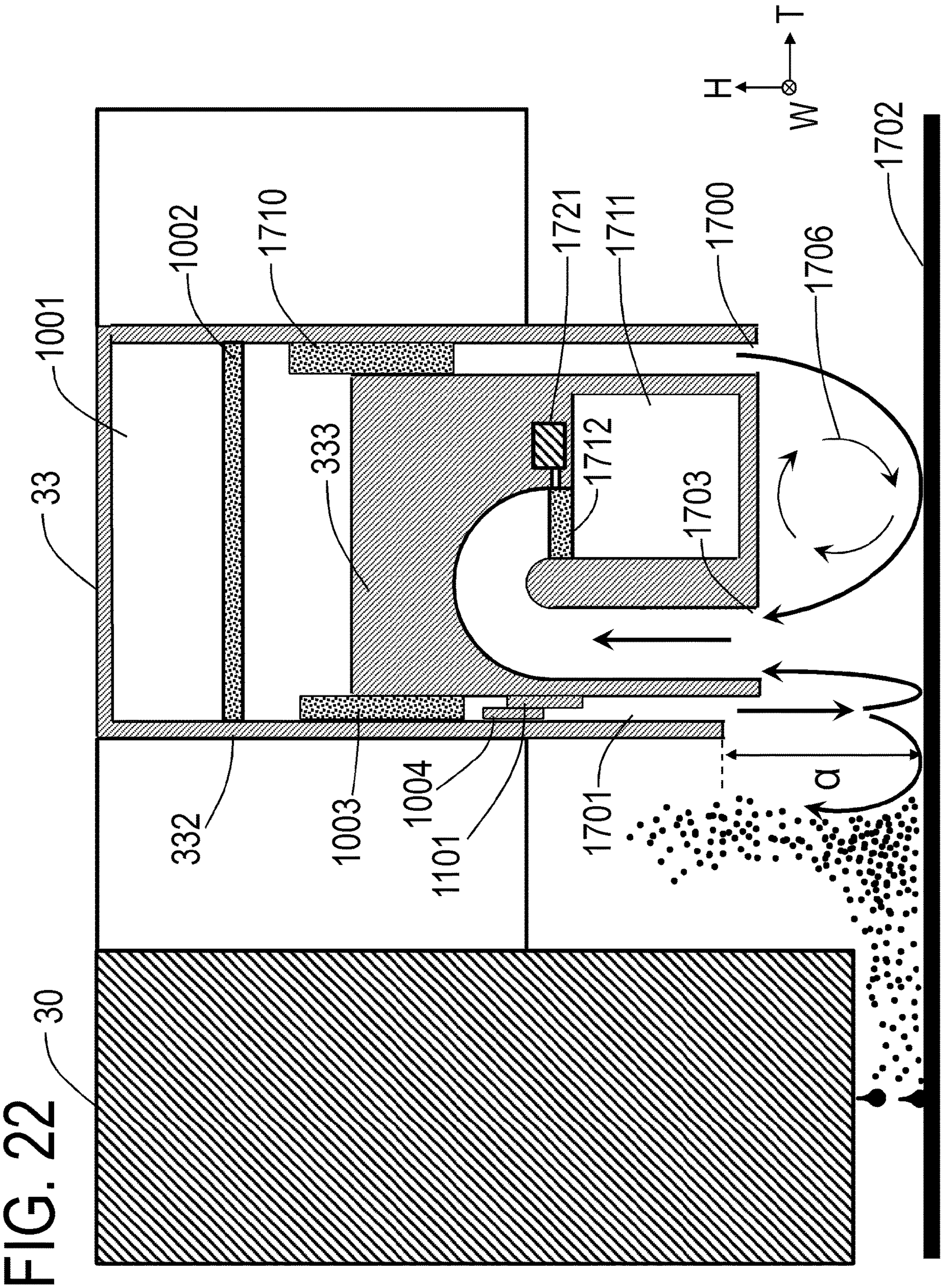
FIG. 22 is a configuration example of the collecting mechanism in a case in which blowing air amount is great.

FIG. 22 is a schematic cross-sectional view of inside of a mechanism in Comparative Example 2, in a case in which the distance a from the upstream side wall face end portion 1801*a* of the second blowing port 1701 to the discharged medium 1702 is shorter than 4×D×U/V. In this case, the air blown out from the second blowing port 1701 might reach the discharged medium 1702 and swirl up ink mist M before reaching the suction port 1703.

The mechanism regarding the reason why the upper limit of the distance α between the upstream side wall face end portion 1801*a* and the discharged medium 1702 is preferably no more than 20×D×U/V will be described with reference to FIG. 23.

Air blown out from the second blowing port 1701 generally reaches a region that is commonly called a fully developed region, beyond a distance around 20×D in the blowing direction from the upstream side wall face end portion 1801*a*, and the flow of air that is blown out broadly disperses. At this time, the center flow speed of the air flow becomes markedly smaller as compared with the airflow that flows along with the conveying of the discharged medium 1702, flowing following the surface of the discharged medium 1702. Hence, an airflow 2000 that has broadly dispersed from the second blowing port 1701 toward the suction port 1703 gradually comes to no longer serve as a stably sufficient air barrier layer with respect to the ink mist M, and the effects of suppressing adhesion of the ink mist M to the wall faces of the collecting mechanism weaken. A threshold value for sufficient effects thereof is around roughly 20×D×U/V.

Accordingly, in a case in which increasing the volume of air blown out from the first blowing port 1700 is desired, the appropriate amount of the volume of air blown out from the second blowing port 1701 increases. According to the configuration of the present form, in this case as well, the windspeed of the air blown out from the second blowing port 1701 does not rise to an extent of reaching the discharged medium 1702 and swirling up the ink mist M, and the ink mist M can be collected in a stable manner.

A specific example to which the present invention is suitably applied will be described below, which falls under a case in which increasing the volume of air blown out from the first blowing port 1700 is desired. In particular, in a case in which the ink mist being suctioned originates from ink having a nature of readily becoming fixed from coagulation or the like through drying or chemical reaction, or the like, the suction uniformization member 1712 and the exhaust buffer chamber 1711 within the inner housing 333 need to be kept clean. A configuration may be made in which the unit 1721 serving as a cleansing liquid supply portion that supplies a cleansing liquid for cleansing to the suction uniformization member 1712 is provided and cleaning is performed. Thus, a collecting mechanism is realized in which high reliability is maintained long-term. In this case, the cleansing liquid reaches the exhaust buffer chamber 1711 while being mixed with the suctioned air, and accordingly the temperature around the exhaust buffer chamber 1711 tends to fall due to heat vaporization. As a result, vapor of ink solvent condenses in the vicinity of a collecting mechanism bottom portion 1803 illustrated in FIG. 21 more readily. The first blowing port 1700 is farther away from the suction port 1703 than the second blowing port 1701 is, in the conveying direction T of the discharged medium 1702, and the opposing face facing the conveyance region is formed between the suction port 1703 and the first blowing port 1700, extending along the conveying direction T. Condensation from vapor of ink solvent and so forth readily occurs at the collecting mechanism bottom portion 1803, which is this opposing face. There is a need to increase the flow rate of air heading from the first blowing port 1700 toward the suction port 1703 to prevent such condensation from occurring, and accordingly this is an embodiment in which the present invention is suitably applied.

Also, there are cases in which the recording apparatus has heating unit for heating the surface of the discharged medium 1702. In this case, solvents of liquids such as ink droplets discharged from the recording head 30 onto the discharged medium 1702, and also other liquids such as pre-processing liquid and post-processing liquid and so forth coated by coating unit, tend to vaporize more actively due to the heating of the discharged medium 1702. Accordingly, there is a possibility of mist of condensed solvent vapor being generated between the discharged medium 1702 and the collecting mechanism, resulting in liquid condensation thereof on the collecting mechanism bottom portion 1803. Note that unit for heating the discharged medium 1702 may be, for example, a heater, an infrared irradiation device, or a microwave irradiation device. In this case as well, there is a need to increase the flow rate of air heading from the first blowing port 1700 toward the suction port 1703, and accordingly this is an embodiment in which the present invention is suitably applied.

In particular, in a case in which there is a temperature difference between the surface of the discharged medium 1702 and the collecting mechanism bottom portion 1803, and the collecting mechanism bottom portion 1803 has a lower temperature than the surface of the discharged medium 1702, there is a particularly high possibility condensation of vapor of solvent occurring at the collecting mechanism bottom portion 1803. In this case as well, there is a need to increase the flow rate of air heading from the first blowing port 1700 toward the suction port 1703, and accordingly this is an embodiment in which the present invention is markedly suitably applied in particular.

Figure 23:
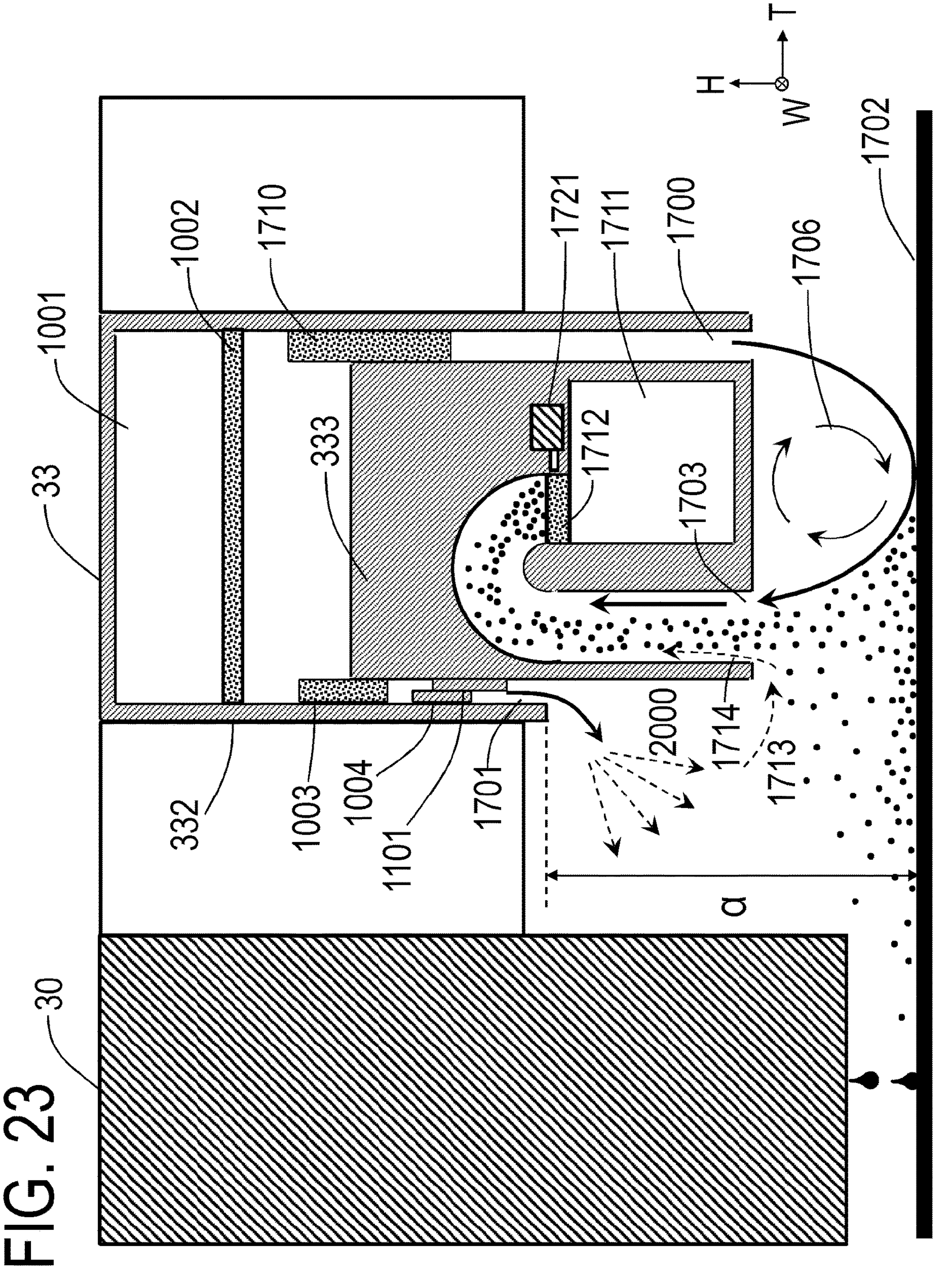
FIG. 23 is a cross-sectional view illustrating an internal configuration according to a first modification of the second embodiment of the collecting mechanism.

The configuration illustrated in FIG. 23 is a first modification of the second embodiment of the present invention serving as a modification with respect to the collecting mechanism. FIG. 23 is a cross-sectional view of inside of a mechanism in a form in the first modification of the second embodiment in a case in which the distance α between the upstream side wall face end portion 1801*a* of the second blowing port 1701 and the discharged medium 1702 exceeds 20×D×U/V, and schematically illustrates the way in which air flows.

In such a form, the laminar flows 1713 and 1714 following wall faces of the collecting mechanism 33, such as the downstream side wall face end portion 1802*a* of the second blowing port 1701, the upstream side wall face 1705 on the upstream side of the suction port 1703, and so forth, are only slightly formed, as described earlier. Accordingly, adherence of the ink mist M to the downstream side wall face end portion 1802*a* of the second blowing port 1701, the upstream side wall face 1705 on the upstream side of the suction port 1703 in the conveying direction, and so forth, is more likely, and accordingly effects are inferior as compared to the form illustrated in FIG. 20.

However, even the airflow 2000 that has broadly dispersed does have a certain function of an air barrier with respect to the wall faces of the collecting mechanism 33, such as the downstream side wall face end portion 1802*a* of the second blowing port 1701, the upstream side wall face 1705 on the upstream side of the suction port 1703 in the conveying direction, and so forth. Accordingly, this is an embodiment that can be sufficiently put to practical use in a recording apparatus or the like in which little ink mist is generated.

In order to confirm the effects of the present embodiment, the present inventors created a model of an ink jet recording apparatus of the form described below, and performed verification. The form of the model was opening width D of 1.5 mm, average windspeed U of 0.4 m/s, and conveying speed V of discharged medium of 0.3 m. Also, the flow rate of air blown out from the first blowing port was five times by volume the flow rate of air blown out from the second blowing port, and an amount of air roughly equivalent to the total of the flow rate of air blown out from the first blowing port and the flow rate of air blown out from the second blowing port was suctioned in by the suction port. Also, out of the wall faces forming the second blowing port 1701, the upstream side wall face end portion 1801*a* on the upstream side in the conveying direction of the discharged medium is at a position 5 mm further away from the surface of the discharged medium 1702 than the downstream side wall face end portion 1802*a*, and the distance a was 9 mm, which is within the valid range of the present embodiment. Also, the temperature of the discharged medium 1702 was maintained at roughly 60° C. and the temperature of the collecting mechanism bottom portion 1803 was maintained at roughly 50° C., thereby creating a state in which the temperature of the collecting mechanism was around 10° C. lower than that of the discharged medium 1702. As a result, confirmation was made that there was no condensation of solvent of the ink on the collecting mechanism, and also the ink mist was collected through the suction port without adhesion to the periphery of the suction port, thereby verifying he effects of the present invention.

Third Embodiment

Figure 24:
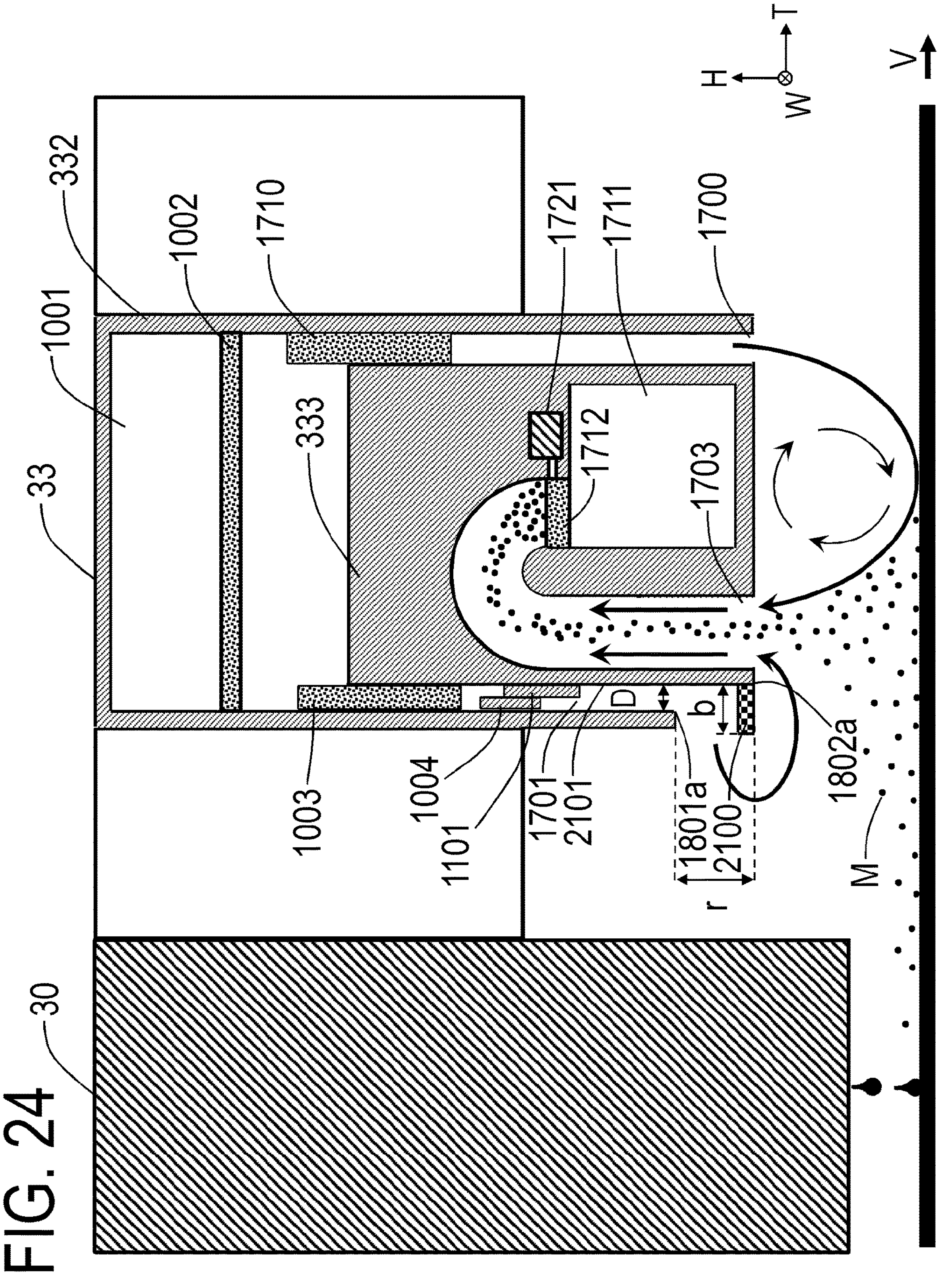
FIG. 24 is a cross-sectional view illustrating an internal configuration according to a third embodiment of the collecting mechanism.

Detailed Description Relating to Third Embodiment in Case of Applying to Collecting Mechanism FIG. 24 is a schematic cross-sectional view of inside of a mechanism according to a preferred third embodiment in a case of applying the present invention to the collecting mechanism. A feature of the third embodiment is that a restricting portion is provided that restricts the flow of the airflow, so that the air blown out from the second blowing port 1701 makes a temporary detour in a direction opposite to the conveying direction of the discharged medium 1702, and thereafter is suctioned into the suction port 1703. Note that in the following description, description of matters in the third embodiment that are in common with the above embodiments will be omitted. The configuration of the third embodiment is the same as the above embodiments where no description in given in particular below.

As illustrated in FIG. 24, a protrusion 2100 serving as a restricting portion is provided within a range of a downstream side wall face 2101 of the second blowing port 1701 that is closer to the discharged medium 1702 than the upstream side wall face end portion 1801*a* of the second blowing port 1701, i.e., the range indicated by r in FIG. 24. The protrusion 2100 is provided protruding toward the upstream side of the conveying direction of the discharged medium 1702 over the entire region of the lower end portion of the downstream side wall face 2101 in the width direction W. A width (height of protrusion) b of the protrusion 2100 is more preferably longer than the opening width D, since the airflow blown out from the second blowing port 1701 toward the upstream side can be guided in a surer manner. That is to say, the protrusion 2100 can restrict the airflow from the second blowing port 1701 from linearly flowing toward the discharged medium 1702 in a sure manner. Note that the range r is set so as to enable the airflow blown out from the second blowing port 1701 to be controlled in a desired direction, a desired air quantity, and so forth, by the protrusion 2100. Although the protrusion 2100 is provided at the lower end portion of the downstream side wall face 2101 in the present embodiment, a configuration may be made in which the protrusion 2100 is provided at a position further upward from the lower end portion.

In the present embodiment, the direction of flow of the airflow is guided to the upstream side in the conveying direction by the protrusion 2100 provided at the lower end portion of the downstream side wall face 2101. Accordingly, even in cases in which the windspeed of the air blown out from the second blowing port 1701 is fast enough that it would reach the discharged medium 1702 had it been blown in a direction toward the discharged medium 1702, the air makes a temporary detour to the upstream side, and then heads toward the suction port 1703. Accordingly, the laminar flows 1713 and 1714 serving as air barriers for the wall faces of the collecting mechanism 33 are formed without reaching the discharged medium 1702 and without swirling up mist.

According to the present embodiment, the volume of air blown out from the first blowing port 1700 and the volume of air blown out from the second blowing port 1701 can be set to an appropriate range in various cases, as described so far. An example is a case in which an increase in the total amount of the flow rates of air blown out from the first blowing port 1700 and from the second blowing port 1701 is desired. Another example is a case in which the distance α according to the first embodiment cannot be configured within the valid range according to the second embodiment due to considerations of surrounding space, due to the windspeed of air from the second blowing port 1701 being great in cases where the opening width D of the second blowing port 1701 cannot be set to a large value, and so forth. It was found that in such cases as well, the volumes of air of the first blowing port 1700 and the second blowing port 1701 could be set to appropriate ranges, and the ink mist M could be collected without the ink mist M adhering to the wall faces making up the suction port 1703.

Figure 25:
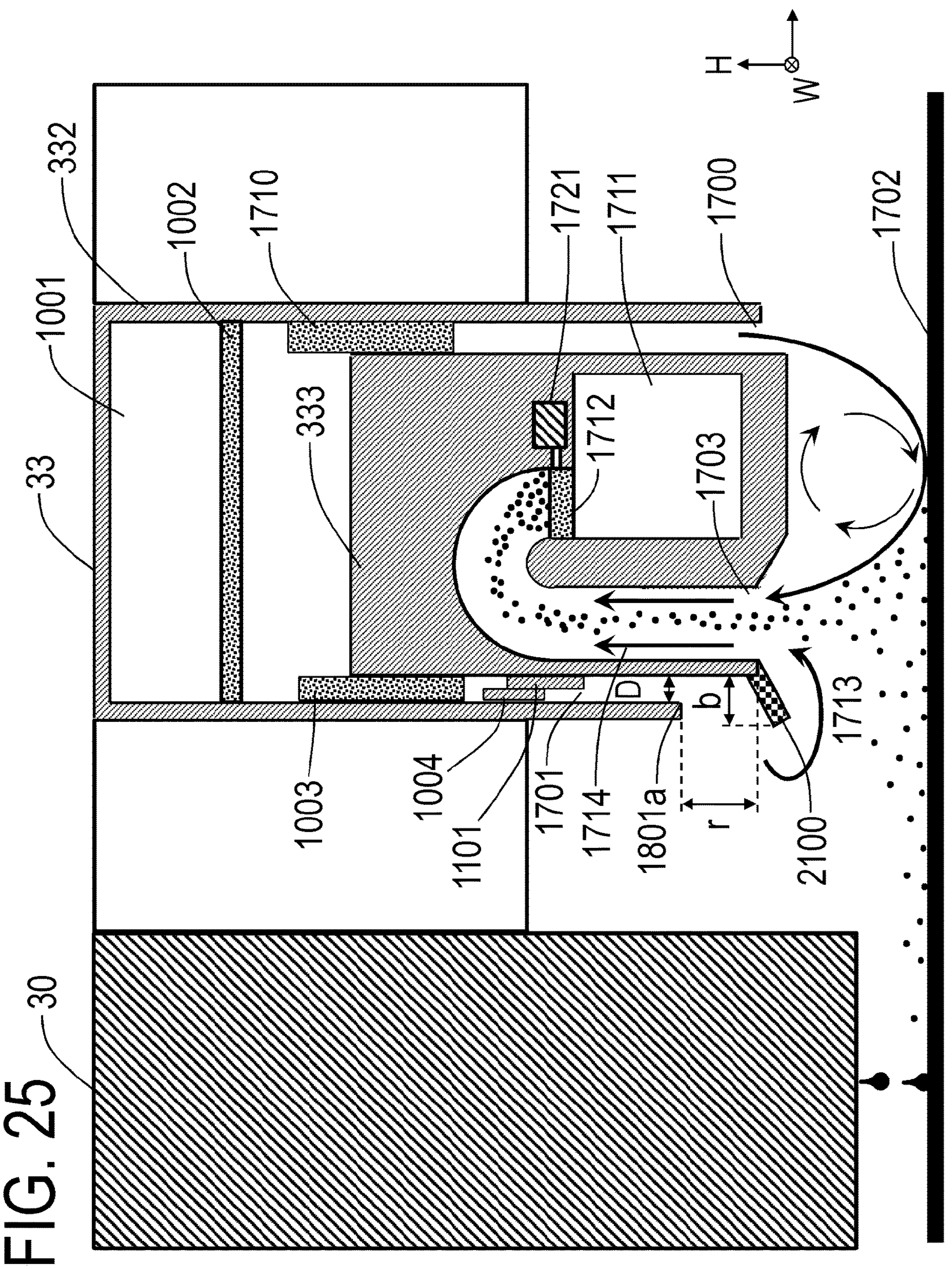
FIG. 25 is a cross-sectional view illustrating an internal configuration according to a first modification of the third embodiment of the collecting mechanism.
Figure 26:
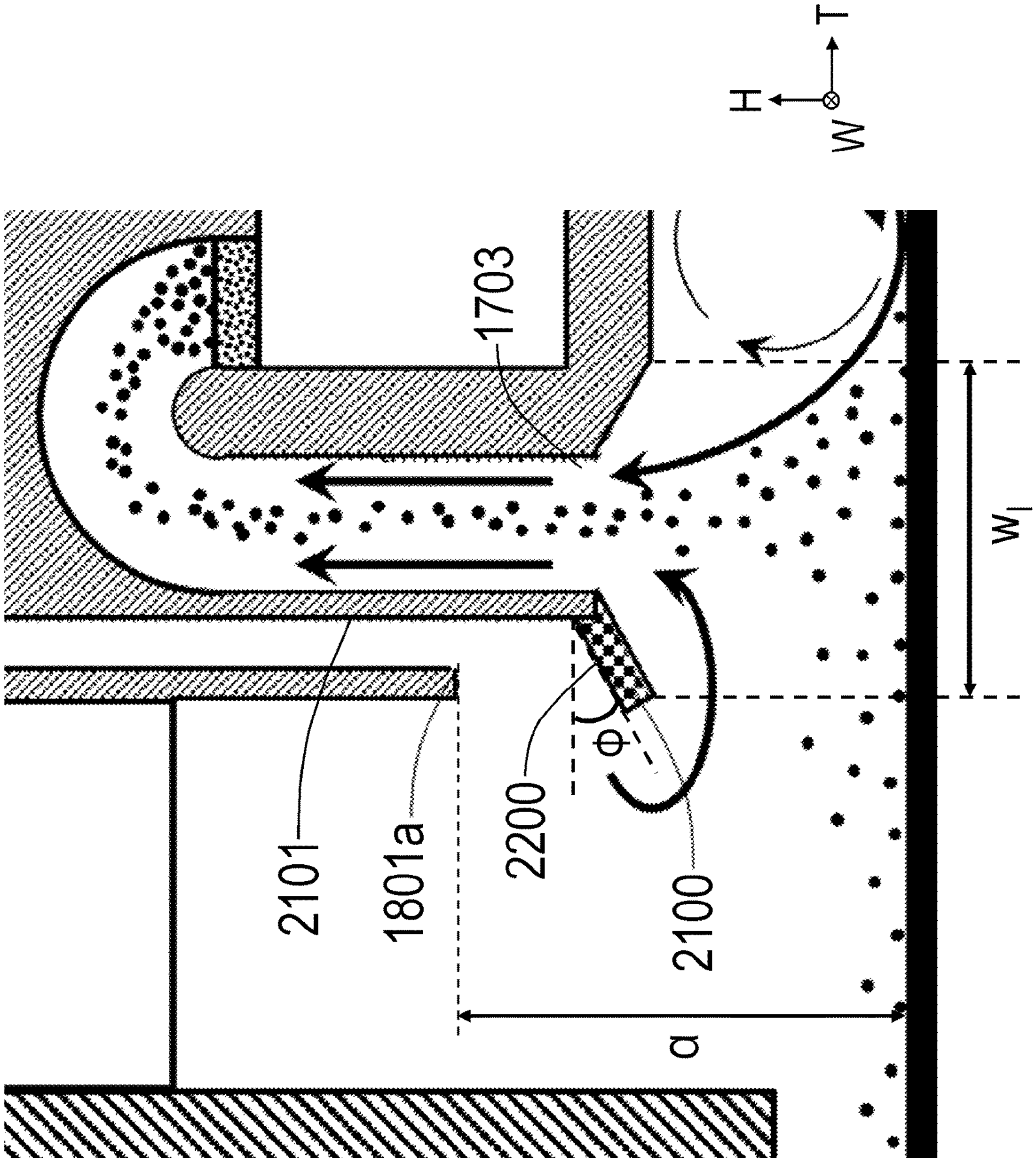
FIG. 26 is a cross-sectional view illustrating the internal configuration according to the first modification of the third embodiment of the collecting mechanism.

FIGS. 25 and 26 illustrate a first modification of the third embodiment of the collecting mechanism. FIG. 25 is a schematic cross-sectional view of inside of a mechanism of a form of the first modification of the third embodiment. FIG. 26 is an enlarged view of the vicinity of the second blowing port 1701 out of the configuration illustrated in FIG. 25. The protrusion 2100 serving as a restricting portion is provided within a range of the downstream side wall face 2101 of the second blowing port 1701 that is closer to the surface of the discharged medium 1702 than the upstream side wall face end portion 1801*a* of the second blowing port 1701, i.e., within the range indicated by r in FIG. 25.

The point that differs from the shape in the vicinity of the second blowing port 1701 in the form in FIG. 24 is the point that the protrusion 2100 is inclined such that the farther toward the upstream side in the conveying direction T, the closer the protrusion 2100 is to the conveyance region of the discharged medium 1702. That is to say, a face 2200 of the protrusion 2100 facing the second blowing port 1701 is disposed with an acute angle Φ as to a relative movement direction of the discharged medium 1702 beneath the collecting mechanism. In the present modification as well, the air blown out from the second blowing port 1701 is blown out toward the upstream side in the relative movement direction of the discharged medium 1702 as viewed from the recording head 30.

In the present modification, the protrusion 2100 is formed by bending a plate material making up the downstream side wall face 2101 of the second blowing port 1701 to the upstream side, for example, and is a suitable embodiment in a case in which having a substantially broader opening width $w_1$ of the suction port 1703 is desirable.

The airflow blown out from the second blowing port 1701 has a speed component perpendicular to the discharged medium 1702. Accordingly, the distance a in FIG. 21, i.e., the distance from the upstream side wall face end portion 1801*a* of the second blowing port 1701 to the surface of the discharged medium 1702 is restricted to a range in which ink mist is not swirled up, by the same mechanism as the mechanism described in the second embodiment. That is to say, the distance α is required to be no less than 4×D×Uz/V, as described in the second embodiment, with respect to a speed component Uz in a perpendicular direction as to the surface of the discharged medium 1702, out of the average flow speed of the airflow blown out from the second blowing port 1701. Note that Uz is expressed as the product of the sine of Φ and U, using the average flow speed U of the airflow blown out from the second blowing port 1701 and the angle Φ illustrated in FIG. 26.

Figure 27:
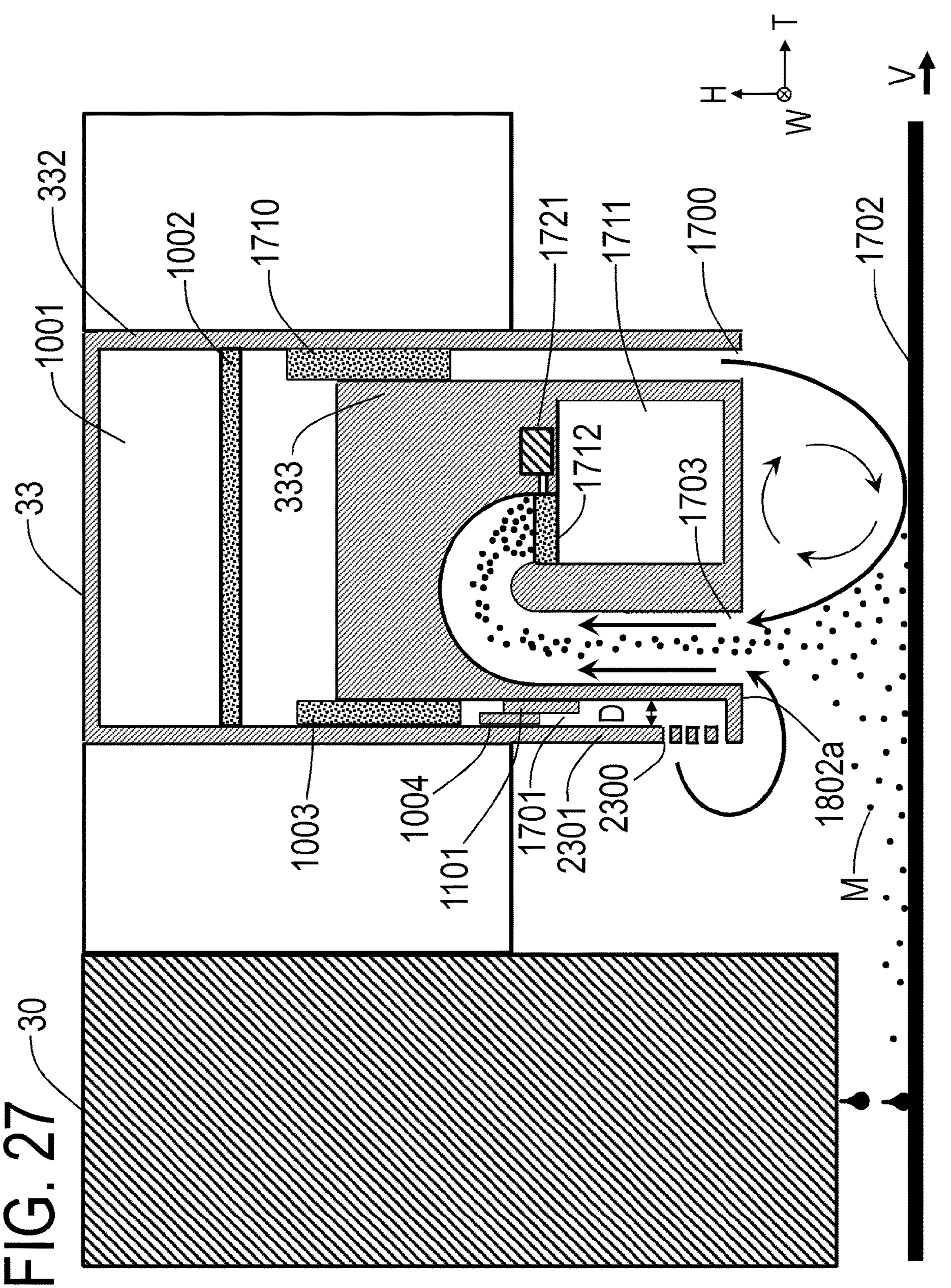
FIG. 27 is a cross-sectional view illustrating an internal configuration according to a second modification of the third embodiment of the collecting mechanism.

FIG. 27 is a schematic cross-sectional view of a configuration inside of a mechanism according to a form of a second modification of the third embodiment of the collecting mechanism. In the present form, a blowing opening 2300 formed of a hole that is slit-like in the longitudinal direction of the collecting mechanism, or a plurality of holes, is provided to a wall face 2301 at the farthest upstream side of the outer housing 332 of the collecting mechanism, in the conveying direction T of the discharged medium 1702, opening toward the upstream side in the conveying direction. These substantially act as the second blowing port 1701. In a case of making up a blowing port group equivalent to the second blowing port 1701 by a plurality of holes, an arrangement in which the intervals between holes are minimized, so as to be a mesh-like form, is suitable. Such a configuration facilitates the air blown out from the blowing port group equivalent to the second blowing port 1701 to become roughly uniform in the longitudinal direction by the time of reaching the suction port 1703.

Figure 28:
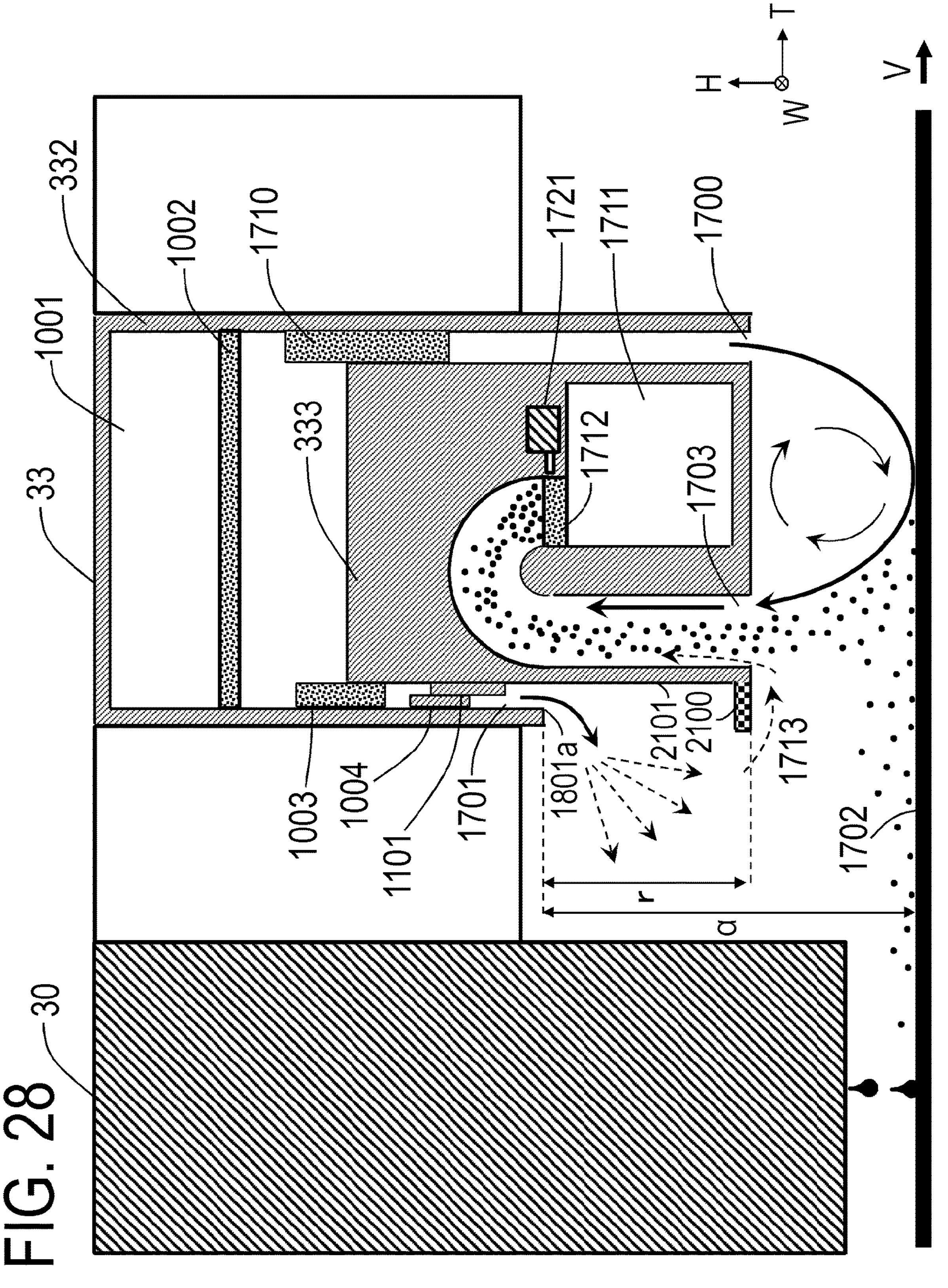
FIG. 28 is a cross-sectional view illustrating an internal configuration according to a third modification of the third embodiment of the collecting mechanism.

FIG. 28 is a schematic cross-sectional view of a configuration inside of a mechanism according to a form of a third modification of the third embodiment of the collecting mechanism, as an embodiment of the present invention. In the present form, the form illustrated in FIG. 23 has the protrusion 2100 within a range (range r) of the downstream side wall face 2101 of the second blowing port 1701 that is closer to the discharged medium 1702 than the upstream side wall face end portion 1801*a* of the second blowing port 1701, in the same way as in the form illustrated in FIG. 24. The protrusion 2100 protrudes toward the upstream side in the conveying direction of the discharged medium 1702. In the same way as the form in FIG. 23, this form is also an embodiment that can be sufficiently put to practical use in an ink jet recording apparatus or the like in which little ink mist is generated, and can manifest the effects of the present invention.

Figure 29:
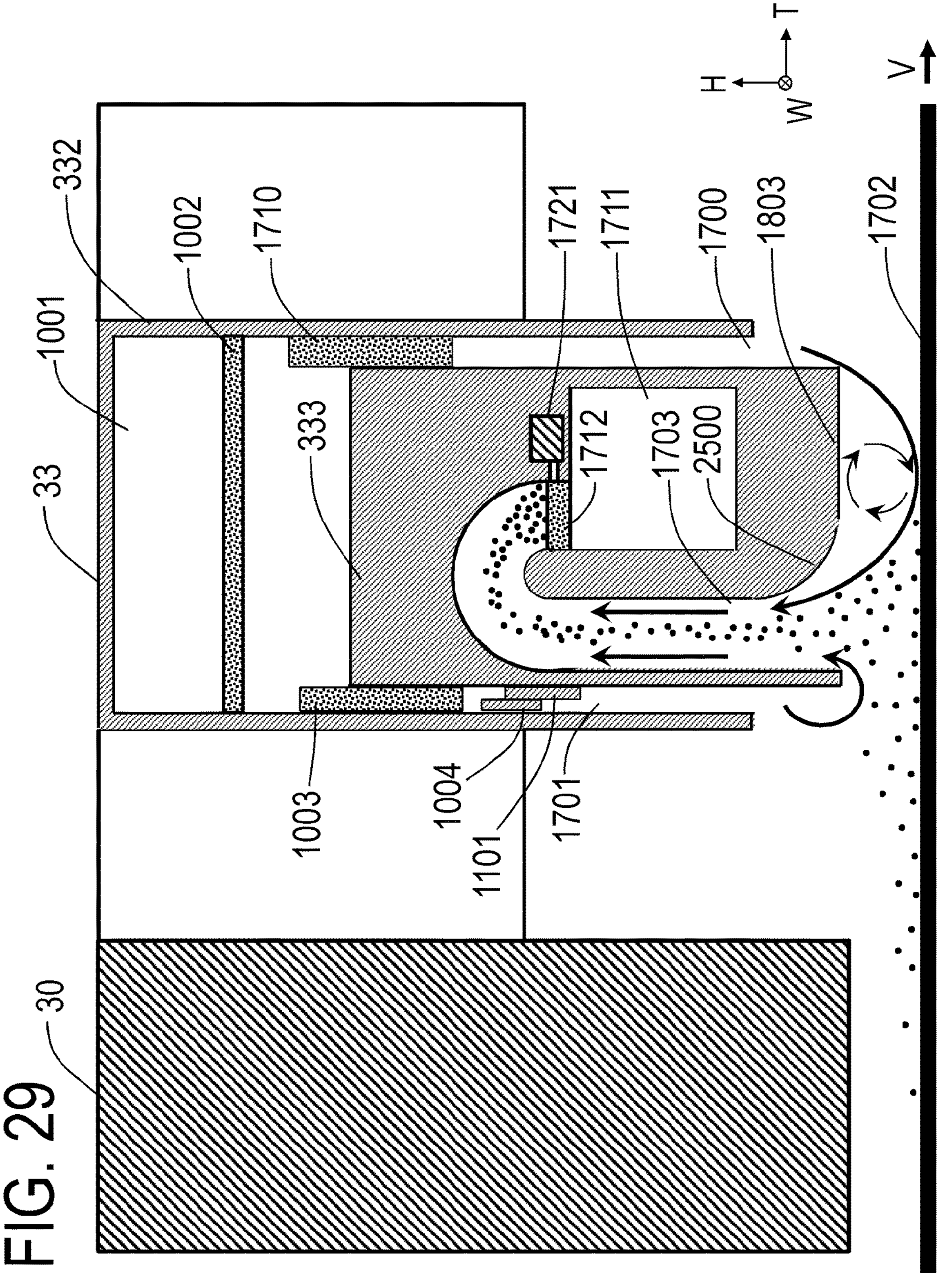
FIG. 29 is a cross-sectional view of a fourth embodiment of the collecting mechanism.

FIG. 29 illustrates a fourth embodiment of the collecting mechanism, as an embodiment of the present invention. The present form is a form in which the collecting mechanism bottom portion 1803 is provided with a curved portion 2500 so that upon reaching the suction port 1703, the airflow blown out from the first blowing port 1700 is suctioned by the suction port 1703 smoothly along the collecting mechanism bottom portion 1803. The curved portion 2500 is inclined curved such that the upstream side thereof in the conveying direction T, which is the side that the collecting mechanism bottom portion 1803 is adjacent to the suction port 1703, is higher from the conveyance region of the discharged medium 1702 the closer to the suction port 1703. In the present form, the flow of air blown out from the first blowing port 1700 and reaching the suction port 1703 flows without being impeded by the wall face of the collecting mechanism 33, and accordingly does not induce turbulence in the airflow, and accordingly is a more preferable embodiment of the present invention.

Although collecting of mist and vapor in an ink jet recording apparatus that records images has been described in the above embodiments, the present invention is not limited to this. The present invention can be broadly applied to collecting of mist and collecting of solvent vapor in recording apparatuses provided with an ink jet head used for purposes other than recording images.

Other Examples in which Configuration of Present Embodiment is Effective

There are cases in which, in a recording apparatus or the like of a system in which a discharged medium is heated, cooling of the discharged medium by wind is necessary, and there are cases therein in which a mechanism for blowing the wind uniformly against the discharged medium is necessary. The configuration of the present invention is effective in such cases as well.

Also, there are cases in which recording apparatuses are provided with a mechanism for cleansing the discharged medium and units accessory thereto, depending on the purpose of the prompting drying of the surface of the discharged medium or the printing process thereof. In such apparatuses, there are cases in which there is a need to dry or blow away the cleansing liquid. In such cases where a substantially uniform airflow is necessary, the present invention operates effectively.

Also, in recording apparatuses of a system of printing directly on paper or the like, there are cases in which paper dust is swirled up to a recording head, obstructing discharge of ink droplets and diminishing image quality. There are recording apparatuses that have a mechanism for blowing an airflow against paper before the paper enters a recording region. Applying the present invention to such an apparatus enables the paper dust to be effectively removed with a small volume of air due to making the windspeed of the airflow being blown to be uniform.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-107922, filed on Jun. 29, 2021, which is hereby incorporated by reference herein in its entirety.

What is claimed is:

1. A recording apparatus comprising:

a recording head that discharges a liquid;

a conveyance portion that conveys a discharged medium so as to pass a position facing the recording head;

a supply portion for supplying an airflow;

a plurality of blowing ports, each being formed in a slit-like form following a width direction orthogonal to a conveying direction of the discharged medium, for blowing out the airflow supplied from the supply portion, the blowing port being formed with a channel, through which the airflow flows, extending in a direction substantially perpendicular to a conveyance region of the discharged medium, from an inlet side at which the airflow is introduced, to an outlet side, wherein a supporting member is provided on the inlet side of the blowing port to support, in the conveying direction, between opposing wall faces of the blowing port that face each other in the conveying direction, while allowing passage of the airflow;

a suction port that opens facing the conveyance region, for suctioning air in a direction away from the conveyance region; and a collecting portion that collects, at a deep side of the suction port, mist or vapor that is generated by discharging the liquid and that is included in the air suctioned in, wherein the plurality of blowing ports comprises (1) a first blowing port that is provided adjacent to the suction port on a downstream side in the conveying direction and (2) a second blowing port that is provided adjacent to the suction port on an upstream side in the conveying direction, and that is adjacent to the recording head on the downstream side in the conveying direction, wherein the second blowing port includes a narrow portion that partially narrows a width of the channel in the conveying direction of the channel, farther on the outlet side than the supporting member of the wall faces forming the channel, and wherein a first volume of air blown out from the first blowing port is greater than a second volume of air blown out from the second blowing port and is a volume of air not more than ten times the second volume of air.

2. The recording apparatus according to claim 1, wherein the first volume of air is at least three times and not more than seven times the second volume of air.

3. The recording apparatus according to claim 1, wherein the first blowing port and the second blowing port are each provided, with the outlets thereof opening facing the conveyance region of the discharged medium.

4. The recording apparatus according to claim 1, further comprising an opposing face that extends between the suction port and the first blowing port to follow the conveying direction, and that faces the conveyance region, wherein the first blowing port is provided further away from the suction port than the second blowing port is, in the conveying direction.

5. The recording apparatus according to claim 4, wherein the opposing face is inclined such that an upstream side thereof in the conveying direction adjacent to the suction port is higher from the conveyance region as the upstream side is closer to the suction port.

6. The recording apparatus according to claim 1, wherein the first blowing port is a blowing port for blowing out air to guide air blown out from the second blowing port to the suction port, and wherein the second blowing port is a blowing port for blowing out air to guide air containing the mist or the vapor to the suction port.

7. The recording apparatus according to claim 1, wherein heights of an outlet of the first blowing port, an outlet of the second blowing port, and an inlet of the suction port relative to the conveyance region are substantially the same.

8. The recording apparatus according to claim 1, wherein a height of an outlet of the second blowing port relative to the conveyance region is higher than a height of an inlet of the suction port.

9. The recording apparatus according to claim 8, further comprising:

a first wall portion that forms, out of the opposing wall faces of the second blowing port, a wall face on the downstream side in the conveying direction; and a second wall portion that forms, out of the opposing wall faces of the second blowing port, a wall face on the upstream side in the conveying direction, wherein a height of a lower end face, which faces the conveyance region, of the second wall portion is higher from the conveyance region than a height of a lower end face, which faces the conveyance region, of the first wall portion.

10. The recording apparatus according to claim 9, wherein in a case where (1) D represents an opening width of the second blowing port, which is a distance in the conveying direction between the first wall portion and het second wall portion, (2) U represents an average windspeed of the airflow blown out from the second blowing port, (3) V represents a conveying speed of the discharged medium as to the recording head, and (4) $\alpha$ represents a distance in a perpendicular direction as to the conveying direction between the lower end face of the second wall portion and the discharged medium facing the lower end face in the perpendicular direction, the following condition is satisfied:

$\alpha$ is not less than a value obtained by dividing products of D and U by V and multiplying by 4.

11. The recording apparatus according to claim 10, wherein $\alpha$ is not more than a value obtained by dividing products of D and U by V and multiplying by 20.

12. The recording apparatus according to claim 9, further comprising:

a restricting portion that restricts a flow of the airflow blown out from the second blowing port, so that the airflow blown out from the second blowing port makes a detour in a direction opposite to the conveying direction, and thereafter is suctioned into the suction port.

13. The recording apparatus according to claim 12, wherein the restricting portion is a protrusion protruding toward the upstream side in the conveying direction from a lower end portion of the first wall portion.

14. The recording apparatus according to claim 13, wherein a protrusion height of the protrusion from the first wall portion in a direction following the conveying direction is longer than a distance between the first wall portion and the second wall portion in the conveying direction.

15. The recording apparatus according to claim 13, wherein the protrusion is inclined to be closer to the conveyance region further toward the upstream side in the conveying direction.

16. The recording apparatus according to claim 1, wherein the outlet of the first blowing port is provided so as to open, with the outlet facing the conveyance region of the discharged medium, and wherein the outlet of the second blowing port is provided so as to open toward the upstream side in the conveying direction.

17. The recording apparatus according to claim 1, further comprising:

a cleansing liquid supply portion that supplies a cleansing liquid to the collecting portion; and a venting mechanism that vents to outside the cleansing liquid supplied to the collecting portion, along with the air suctioned into the collecting portion through the suction port.

18. The recording apparatus according to claim 1, further comprising a heating unit for heating the discharged medium.

19. The recording apparatus according to claim 1, further comprising a collecting mechanism that includes, on the downstream side of the recording head in the conveying direction, the blowing port, the suction port, and the collecting portion, wherein a temperature of the discharged medium while the recording head is discharging liquid to the discharged medium is higher than a temperature of a face, which faces the discharged medium, of the collecting mechanism.

20. The recording apparatus according to claim 1, wherein the narrow portion partially narrows the width of the channel in the conveying direction of the channel to not more than half of the width in a region where the narrow portion is not provided.

21. The recording apparatus according to claim 1, wherein the narrow portion is provided away from the supporting member on a downstream side of the channel, and also away from an outlet of the channel on an upstream side of the channel.

22. The recording apparatus according to claim 1, wherein the narrow portion is provided over an entire region of the blowing port in the width direction.

23. The recording apparatus according to claim 1, wherein the narrow portion is provided on, out of the opposing wall faces, a wall face on an upstream side in the conveying direction.

24. The recording apparatus according to claim 23, wherein the blowing port further includes a second narrow portion that partially narrows the width of the channel in the conveying direction of the channel, the second narrow portion being provided on, out of the opposing wall faces, a wall face on a downstream side in the conveying direction, farther on the outlet side than a first narrow portion, which is the narrow portion.

25. The recording apparatus according to claim 24, wherein the second narrow portion is provided away from an outlet of the channel on an upstream side of the channel.

26. The recording apparatus according to claim 24, wherein the second narrow portion is provided away from the first narrow portion on a downstream side of the channel.

27. The recording apparatus according to claim 24, wherein the first narrow portion and the second narrow portion have a portion overlapping each other as viewed from a substantially perpendicular direction relative to the conveyance region.

28. The recording apparatus according to claim 24, wherein the first narrow portion and the second narrow portion have an abutting portion partially abutting each other in the conveying direction.

29. The recording apparatus according to claim 28, wherein the first narrow portion and the second narrow portion have the abutting portion in plurality, the abutting portions being provided equidistantly in the width direction.

30. A recording apparatus comprising:

a recording head that discharges a liquid;

a conveyance portion that conveys a discharged medium so as to pass a position facing the recording head;

a supply portion for supplying an airflow;

a plurality of blowing ports, each being formed in a slit-like form following a width direction orthogonal to a conveying direction of the discharged medium, for blowing out the airflow supplied from the supply portion, the blowing port being formed with a channel, through which the airflow flows, extending in a direction perpendicular to a conveyance region of the discharged medium, from an inlet side at which the airflow is introduced, to an outlet side, wherein a supporting member is provided on the inlet side of the blowing port to support, in the conveying direction, between opposing wall faces of the blowing port that face each other in the conveying direction, while allowing passage of the airflow;

a suction port that opens facing the conveyance region, for suctioning air in a direction away from the conveyance region; and a collecting portion that collects, at a deep side of the suction port, mist or vapor that is generated by discharging the liquid and that is included in the air suctioned in, wherein the plurality of blowing ports comprises (1) a first blowing port that is provided adjacent to the suction port on a downstream side in the conveying direction and (2) a second blowing port that is provided adjacent to the suction port on an upstream side in the conveying direction, and that is adjacent to the recording head on the downstream side in the conveying direction, wherein the second blowing port includes a narrow portion that partially narrows a width of the channel in the conveying direction of the channel, farther on the outlet side than the supporting member of the wall faces forming the channel, and wherein a first volume of air blown out from the first blowing port is greater than a second volume of air blown out from the second blowing port and is a volume of air not more than ten times the second volume of air.

* * * * *